(12) United States Patent
Ishigaki et al.

(10) Patent No.: US 11,054,241 B2
(45) Date of Patent: Jul. 6, 2021

(54) THREE-DIMENSIONAL MEASUREMENT DEVICE

(71) Applicant: CKD Corporation, Aichi (JP)

(72) Inventors: Hiroyuki Ishigaki, Aichi (JP); Takahiro Mamiya, Aichi (JP)

(73) Assignee: CKD CORPORATION, Aichi (JP)

(*) Notice: Subject to any disclaimer, the term of this patent is extended or adjusted under 35 U.S.C. 154(b) by 0 days.

(21) Appl. No.: 16/363,975

(22) Filed: Mar. 25, 2019

(65) Prior Publication Data

US 2019/0219379 A1  Jul. 18, 2019

Related U.S. Application Data

(63) Continuation of application No. PCT/JP2017/015696, filed on Apr. 19, 2017.

(30) Foreign Application Priority Data

Sep. 28, 2016  (JP) .............................. JP2016-189281

(51) Int. Cl.
*G01B 9/02* (2006.01)
*G01B 11/00* (2006.01)
*G01B 11/24* (2006.01)

(52) U.S. Cl.
CPC ............ *G01B 9/02011* (2013.01); *G01B 9/02* (2013.01); *G01B 9/0201* (2013.01); *G01B 11/00* (2013.01); *G01B 2290/70* (2013.01)

(58) Field of Classification Search
CPC ...... G01B 11/24; G01B 2290/45; G01B 9/02; G01B 9/02081; G01B 2290/70;
(Continued)

(56) References Cited

U.S. PATENT DOCUMENTS 8,279,446 B2 * 10/2012 Ignatovich ......... G01B 9/02007
356/479
10,495,438 B2 * 12/2019 Ishigaki ................. G01B 11/24
(Continued)

FOREIGN PATENT DOCUMENTS

JP  H08-094317 A  4/1996
JP  2000-074618 A  3/2000
(Continued)

OTHER PUBLICATIONS

Notification Concerning Transmittal of International Preliminary Report on Patentability for corresponding International Application No. PCT/JP2017/015696, dated Apr. 11, 2019 (1 page).
(Continued)

*Primary Examiner* — Violeta A Prieto
(74) *Attorney, Agent, or Firm* — Osha Bergman Watanabe & Burton LLP

(57) ABSTRACT

A three-dimensional measurement device includes: an optical system that splits incident light into two lights and radiates lights to a measurement object and to a reference surface, and recombines the two lights to emit combined light; a first irradiator that emits first light including first polarized light and entering a first surface; a second irradiator that emits second light including second polarized light and entering a second surface; a first imaging system to which the first output light enters wherein the first output light is emitted from the first surface when the first light enters the first surface; a second imaging system to which the second output light enters wherein the second output light is emitted from the second surface when the second light enters the second surface; and an image processor that performs three-dimensional measurement based on interference fringe images obtained by the first and second imaging systems.

42 Claims, 12 Drawing Sheets

(58) Field of Classification Search
CPC .......... G01B 9/02011; G01B 9/02007; G01B 9/02027; G02B 6/2746; G02B 2006/12157; G01J 2009/0261
See application file for complete search history.

(56) References Cited

U.S. PATENT DOCUMENTS

| | | | |
|---|---|---|---|
| 10,704,888 B2* | 7/2020 | Ishigaki | G01B 9/0203 |
| 2009/0174920 A1* | 7/2009 | Jeong | G11B 7/0938 |
| | | | 359/31 |
| 2012/0013913 A1* | 1/2012 | Ignatovich | G01B 9/02007 |
| | | | 356/479 |
| 2013/0107277 A1* | 5/2013 | Hirose | G01B 9/02007 |
| | | | 356/512 |
| 2013/0194582 A1* | 8/2013 | Tokimitsu | G01B 9/02002 |
| | | | 356/498 |
| 2017/0038192 A1* | 2/2017 | Chen | G01S 17/36 |
| 2018/0106590 A1* | 4/2018 | Ishigaki | G01B 9/02057 |
| 2019/0094016 A1* | 3/2019 | Ishigaki | G01B 9/02087 |
| 2019/0101380 A1* | 4/2019 | Abdulhalim | G01B 9/02001 |
| 2019/0178625 A1* | 6/2019 | Ishigaki | G01B 11/2545 |

FOREIGN PATENT DOCUMENTS

| | | |
|---|---|---|
| JP | 2002-202108 A | 7/2002 |
| JP | 2010-112768 A | 5/2010 |
| JP | 2010-164389 A | 7/2010 |

OTHER PUBLICATIONS

Notification of Transmittal of Translation of the International Preliminary Report on Patentability for corresponding International Application No. PCT/JP2017/015696, dated Apr. 11, 2019 (1 page).
International Preliminary Report on Patentability for corresponding International Application No. PCT/JP2017/015696, dated Apr. 2, 2019 (9 page).
International Search Report for corresponding International Application No. PCT/JP2017/015696, dated Jul. 25, 2017 (5 pages).

\* cited by examiner

THREE-DIMENSIONAL MEASUREMENT DEVICE

BACKGROUND

Technical Field

The present invention relates to a three-dimensional measurement device configured to measure the shape of a measurement object.

Description of Related Art

A three-dimensional measurement device using an interferometer has been conventionally known as the three-dimensional measurement device configured to measure the shape of a measurement object.

In such a three-dimensional measurement device, half (for example, 750 nm) the wavelength of the measurement light (for example, 1500 nm) is a measurement range (dynamic range) that allows for measurement.

In the case of a measurement object that has a height difference equal to or greater than half the wavelength of the measurement light, this provides an insufficient measurement range and is likely to fail in appropriately measuring the shape of the measurement object. The longer wavelength of the measurement light, however, reduces the resolution and is likely to decrease the measurement accuracy.

By taking into account the foregoing, in order to ensure sufficient measurement range, a recently proposed three-dimensional measurement device is configured to perform measurement by using two different lights having different wavelengths (for example, as described in Patent Literature 1).

This three-dimensional measurement device causes combined light of first wavelength light and second wavelength light to enter an interference optical system (for example, a polarizing beam splitter) and causes interfering light emitted from the interference optical system to be subjected to wavelength separation by a predetermined optical separation unit (for example, a dichroic mirror), so as to obtain interfering light with regard to the first wavelength light and interfering light with regard to the second wavelength light. The shape of a measurement object is then measured, based on interference fringe images obtained by individually taking images of the interfering lights with regard to the respective wavelength lights.

CITATION LIST

Patent Literature

PTL 1: JP 2010-164389A

In order to expand the measurement range in three-dimensional measurement by using two different lights having different wavelengths, there is a need to decrease the wavelength difference between the two different lights. The closer wavelengths of the two different lights provide the wider measurement range.

The closer wavelengths of the two different lights, however, causes difficulty in appropriately separating the wavelengths of the two different lights.

In other words, in three-dimensional measurement using two different lights having a small wavelength difference, there is a need to take an image of the interfering light with regard to the first wavelength light and an image of the interfering light with regard to the second wavelength light at different timings. This is likely to decrease the measurement efficiency.

For example, in three-dimensional measurement using the phase-shift method, when phases are changed in four different levels, there is a need to obtain four different image data. Accordingly, in the case of using two different lights, a required imaging time is for four imaging processes at different timings, i.e., a total of eight imaging processes.

SUMMARY

A three-dimensional measurement device according to one or more embodiments uses lights having different wavelengths to expand the measurement range and to improve the measurement efficiency.

Embodiments of the present invention are described. Functions and advantageous effects according to one or more embodiments are also described as appropriate.

A three-dimensional measurement device according to one or more embodiments comprises a predetermined optical system (specific optical system) configured to split predetermined incident light into two lights, to radiate one of the two lights as measurement light to a measurement object and the other of the two lights as reference light to a reference surface, and to recombine the two lights to combined light and emit the combined light; a first irradiation unit configured to emit first light that includes predetermined polarized light and that enters a first input-output element of the predetermined optical system; a second irradiation unit configured to emit second light that includes predetermined polarized light and that enters a second input-output element of the predetermined optical system; a first imaging unit configured such that output light with regard to the first light, which is emitted (coaxially with the incident first light) from the first input-output element when the first light enters the first input-output element of the predetermined optical system, enters; a second imaging unit configured such that output light with regard to the second light, which is emitted (coaxially with the incident second light) from the second input-output element when the second light enters the second input-output element of the predetermined optical system, enters; and an image processor configured to perform three-dimensional measurement of the measurement object, based on interference fringe images taken and obtained by the first imaging unit and the second imaging unit.

The "output light with regard to the first light" output from the "predetermined optical system (specific optical system)" includes "combined light of the reference light and the measurement light with regard to the first light or interfering light by interference of the combined light", and the "output light with regard to the second light" includes "combined light of the reference light and the measurement light with regard to the second light or interfering light by interference of the combined light". The same applies hereinafter.

The "predetermined optical system" accordingly includes not only "an optical system that causes interference of the reference light and the measurement light inside thereof and outputs the reference light and the measurement light as interfering lights" but "an optical system that outputs the reference light and the measurement light as simple combined light without causing interference of the reference light and the measurement light inside thereof". When the "output light" output from the "predetermined optical system" is "combined light", "interfering light" is to be obtained by means of a predetermined interfering unit in a stage at least prior to imaging by an "imaging unit", in order to take "interference fringe images".

Accordingly, an optical system configured to split predetermined incident light into two lights, to radiate one of the lights as measurement light to a measurement object and the other of the lights as reference light to a reference surface, and to recombine the two lights to combined light and emit the combined light for the purpose of causing interference of lights (taking interference fringe images) may be called "interference optical system". Accordingly, in one or more embodiments, the "predetermined optical system (specific optical system)" may be regarded as "interference optical system".

The configuration of one or more embodiments causes the "first light" and the "second light" to respectively enter different positions ("first input-output element" and "second input-output element) of the predetermined optical system and thereby causes the "first light" and the "second light" to be separately emitted from different positions ("first input-output element" and "second input-output element) of the predetermined optical system without interfering with each other. There is accordingly no need to separate the light emitted from the predetermined optical system into the "first light" and the "second light" by using a predetermined separation unit.

This configuration enables two different polarized lights having wavelengths close to each other, to be used as polarized light included in the "first light" and as polarized light included in the "second light". As a result, this configuration uses the two different polarized lights having the wavelengths close to each other, to further expand the measurement range in three-dimensional measurement.

The "first light" emitted from the "first irradiation unit" may be any light including at least the "predetermined polarized light" and may be light (for example, "non-polarized light" or "circularly polarized light") including another extra component that is to be subsequently cut in the "predetermined optical system", in one or more embodiments.

Similarly, the "second light" emitted from the "second irradiation unit" may be any light including at least the "predetermined polarized light" and may be light (for example, "non-polarized light" or "circularly polarized light") including another extra component that is to be subsequently cut in the "predetermined optical system".

Additionally, the configuration of one or more embodiments enables imaging of the output light with regard to the first light and imaging of the output light with regard to the second light to be performed simultaneously. This shortens the total imaging time and improves the measurement efficiency.

A configuration that uses a plurality of interference optical systems (interferometer modules) to measure a measurement object may be employed as a configuration that uses a plurality of lights. This configuration, however, uses a different reference surface as the standard for each interference optical system and causes the plurality of lights to have different optical path intervals that respectively give optical path differences between the reference light and the measurement light. This is likely to decrease the measurement accuracy. Additionally, it is difficult to make the optical path lengths of the plurality of interference optical systems precisely equal to one another, and an operation for such adjustment also has extreme difficulty.

The configuration of one or more embodiments, on the other hand, uses two lights for one interference optical system (predetermined optical system) including one reference surface as the standard and accordingly causes the two lights to have an identical optical path interval that gives an optical path difference between the reference light and the measurement light. As a result, this configuration prevents various troubles caused by providing a plurality of interference optical systems.

Furthermore, the configuration of one or more embodiments causes the output light with regard to the first light that enters the first input-output element of the predetermined optical system to be output from the same position, i.e., from the first input-output element and causes the output light with regard to the second light that enters the second input-output element to be output from the same position, i.e., from the second input-output element.

This configuration does not need to provide any means for changing the polarizing direction of the polarized light (for example, quarter wave plate) inside of the interference optical system (predetermined optical system). This accordingly simplifies the configuration.

In the three-dimensional measurement device of one or more embodiments, the predetermined optical system may comprise an optical system configured to split predetermined incident light into two polarized lights having polarizing directions that are orthogonal to each other, to radiate one of the polarized lights as the measurement light to the measurement object and the other of the polarized lights as the reference light to the reference surface, and to recombine the two polarized lights to combined light and emit the combined light. The optical system may be configured to split the first light entering the first input-output element into the reference light that is polarized light having a first polarizing direction (for example, P-polarized light) and the measurement light that is polarized light having a second polarizing direction (for example, S-polarized light), and the optical system may be configured to split the second light entering the second input-output element the reference light that is polarized light having the second polarizing direction and the measurement light that is polarized light having the first polarizing direction.

The configuration of one or more embodiments causes the "first light" and the "second light" to enter different positions ("first input-output element" and "second input-output element") of the predetermined optical system. This causes the reference light and the measurement light with regard to the "first light" and the reference light and the measurement light with regard to the "second light" to be respectively split into different polarized light components (P-polarized light or S-polarized light). This accordingly enables the "first light" and the "second light" that enter the predetermined optical system to be separately emitted from different positions ("first input-output element" and "second input-output element") of the predetermined optical system without interfering with each other. As a result, this configuration more effectively achieves the functions and the advantageous effects described above.

There is provided a three-dimensional measurement device comprising a polarizing beam splitter configured to have a boundary surface that splits predetermined incident light into two polarized lights having polarizing directions that are orthogonal to each other, to radiate one of the split polarized lights as measurement light to a measurement object and the other of the split polarized lights as reference light to a reference surface, and to recombine the two split polarized lights to combined light and emit the combined light; a first irradiation unit configured to emit first light that includes predetermined polarized light and that enters a first surface of the polarizing beam splitter serving as a first input-output element, out of the first surface and a second surface of the polarizing beam splitter that are adjacent to each other across the boundary surface; a second irradiation unit configured to emit second light that includes predetermined polarized light and that enters the second surface of the polarizing beam splitter serving as a second input-output element; a first imaging unit configured such that output light with regard to the first light, which is emitted (coaxially with the incident first light) from the first surface when the first light enters the first surface of the polarizing beam splitter, enters; a second imaging unit configured such that output light with regard to the second light, which is emitted (coaxially with the incident second light) from the second surface when the second light enters the second surface of the polarizing beam splitter, enters; and an image processor configured to perform three-dimensional measurement of the measurement object, based on interference fringe images taken and obtained by the first imaging unit and the second imaging unit.

The "polarizing beam splitter" has the boundary surface that serves to transmit polarized light having a first polarizing direction (for example, P-polarized light) and to reflect polarized light having a second polarizing direction (for example, S-polarized light). Accordingly, the first light entering the first surface of the polarizing beam splitter is split into, for example, reference light that is the polarized light having the first polarizing direction (for example, P-polarized light) and measurement light that is the polarized light having the second polarizing direction (for example, S-polarized light). The second light entering the second surface of the polarizing beam splitter is split into, for example, reference light that is the polarized light having the second polarizing direction (for example, S-polarized light) and measurement light that is the polarized light having the first polarizing direction (for example, P-polarized light).

The configuration of one or more embodiments causes the "first light" and the "second light" to enter different positions ("first surface" and "second surface") of the polarizing beam splitter. This causes the reference light and the measurement light with regard to the "first light" and the reference light and the measurement light with regard to the "second light" to be respectively split into different polarized light components (P-polarized light or S-polarized light). This accordingly enables the "first light" and the "second light" to be separately emitted from different positions ("first surface" and "second surface") of the polarizing beam splitter without interfering with each other.

One or more embodiments can implement the configuration of the embodiments described above by the relatively simple configuration based on the principle of the Michelson interferometer.

The three-dimensional measurement device of one or more embodiments may further comprise a first light guiding unit configured to cause at least part of the first light emitted from the first irradiation unit to enter the first input-output element and to cause at least part of the output light with regard to the first light emitted from the first input-output element to enter the first imaging unit; and a second light guiding unit configured to cause at least part of the second light emitted from the second irradiation unit to enter the second input-output element and to cause at least part of the output light with regard to the second light emitted from the second input-output element to enter the second imaging unit.

One or more embodiments can implement the configuration of the embodiments described above by the relatively simple configuration.

One exemplary configuration may "comprise a first non-polarizing beam splitter (for example, a half mirror) configured to transmit part of the first light emitted from the first irradiation unit and reflect remaining part of the first light, to cause transmitted light or reflected light of the first light to enter the first input-output element, to transmit part of output light with regard to the first light emitted from the first input-output element and reflect remaining part of the output light, and to cause transmitted light or reflected light of the output light with regard to the first light to enter the first imaging unit; and a second non-polarizing beam splitter (for example, a half mirror) configured to transmit part of the second light emitted from the second irradiation unit and reflect remaining part of the second light, to cause transmitted light or reflected light of the second light to enter the second input-output element, to transmit part of output light with regard to the second light emitted from the second input-output element and reflect remaining part of the output light, and to cause transmitted light or reflected light of the output light with regard to the second light to enter the second imaging unit.

In the three-dimensional measurement device of one or more embodiments, each of the irradiation units may comprise a light isolator configured to transmit only light in one direction out of the light emitted from a predetermined light emitter included in the irradiation unit and to block light in a reverse direction.

In the case where a non-polarizing beam splitter is provided as the light guiding unit of one or more embodiments, the non-polarizing beam splitter serves to transmit part of the light emitted from the input-output element and to reflect remaining part of the light. While one of the transmitted light and the reflected light of this light enters the imaging unit, the other of the transmitted light and the reflected light that does not enter the imaging unit travels toward the irradiation unit. The other light entering a light emitter (for example, a light source) is likely to damage the light emitter or destabilize the operation of the light emitter.

The configuration of one or more embodiments, on the other hand, includes the light isolators to prevent damage and destabilization of the light emitter.

In the three-dimensional measurement device of one or more embodiments, the first irradiation unit may comprise a first wavelength light emitter configured to emit first wavelength light that includes polarized light of a first wavelength (for example, 491 nm) and/or a second wavelength light emitter configured to emit second wavelength light that includes polarized light of a second wavelength (for example, 540 nm), and is configured to emit the first light including the polarized light of the first wavelength and/or the polarized light of the second wavelength. The second irradiation unit may comprise a third wavelength light emitter configured to emit third wavelength light that includes polarized light of a third wavelength (for example, 488 nm) and/or a fourth wavelength light emitter configured to emit fourth wavelength light that includes polarized light of a fourth wavelength (for example, 532 nm), and is configured to emit the second light including the polarized light of the third wavelength and/or the polarized light of the fourth wavelength. The first imaging unit may comprise a first wavelength light imaging unit configured to take an image of output light with regard to the polarized light of the first wavelength, which is included in the output light with regard to the first light emitted from the first input-output element when the first light including the polarized light of the first wavelength enters the first input-output element; and/or a second wavelength light imaging unit configured to take an image of output light with regard to the polarized light of the second wavelength, which is included in the output light with regard to the first light emitted from the first input-output element when the first light including the polarized light of the second wavelength enters the first input-output element. The second imaging unit may comprise a third wavelength light imaging unit configured to take an image of output light with regard to the polarized light of the third wavelength, which is included in the output light with regard to the second light emitted from the second input-output element when the second light including the polarized light of the third wavelength enters the second input-output element; and/or a fourth wavelength light imaging unit configured to take an image of output light with regard to the polarized light of the fourth wavelength, which is included in the output light with regard to the second light emitted from the second input-output element when the second light including the polarized light of the fourth wavelength enters the second input-output element.

The "output light with regard to the polarized light of the first wavelength" included in the "output light with regard to the first light" includes "combined light of the reference light and the measurement light with regard to the polarized light of the first wavelength or interfering light by interference of the combined light", and the "output light with regard to the polarized light of the second wavelength" includes "combined light of the reference light and the measurement light with regard to the polarized light of the second wavelength or interfering light by interference of the combined light".

Similarly, the "output light with regard to the polarized light of the third wavelength" included in the "output light with regard to the second light" includes "combined light of the reference light and the measurement light with regard to the polarized light of the third wavelength or interfering light by interference of the combined light", and the "output light with regard to the polarized light of the fourth wavelength" includes "combined light of the reference light and the measurement light with regard to the polarized light of the fourth wavelength or interfering light by interference of the combined light".

The "first wavelength light" emitted from the "first wavelength light emitter" may be any light including at least the "polarized light of the first wavelength" and may be light including another extra component. The "second wavelength light" emitted from the "second wavelength light emitter" may be any light including at least the "polarized light of the second wavelength" and may be light including another extra component.

Similarly, the "third wavelength light" emitted from the "third wavelength light emitter" may be any light including at least the "polarized light of the third wavelength" and may be light including another extra component. The "fourth wavelength light" emitted from the "fourth wavelength light emitter" may be any light including at least the "polarized light of the fourth wavelength" and may be light including another extra component.

The configuration of one or more embodiments causes the "first light" (the "polarized light of the first wavelength" and/or the "polarized light of the second wavelength") and the "second light" (the "polarized light of the third wavelength" and/or the "polarized light of the fourth wavelength") to respectively enter different positions ("first input-output element" and "second input-output element") of the predetermined optical system (for example, a polarizing beam splitter). This causes the "first light" and the "second light" to be separately emitted from different positions ("first input-output element" and "second input-output element) of the predetermined optical system (for example, the polarizing beam splitter) without interfering with each other This configuration enables two different polarized lights having wavelengths close to each other, to be used as polarized light included in the "first light" (the "polarized light of the first wavelength" and/or the "polarized light of the second wavelength") and as polarized light included in the "second light" (the "polarized light of the third wavelength" and/or the "polarized light of the fourth wavelength"). As a result, this configuration uses the two different polarized lights having the wavelengths close to each other, to further expand the measurement range in three-dimensional measurement. Especially, the configuration of one or more embodiments uses four different lights of different wavelengths at most. This remarkably expands the measurement range.

Additionally, the configuration of one or more embodiments enables imaging of the output light with regard to the first light ("output light with regard to the polarized light of the first wavelength" and/or "output light with regard to the polarized light of the second wavelength") and imaging of the output light with regard to the second light ("output light with regard to the polarized light of the third wavelength" and/or "output light with regard to the polarized light of the fourth wavelength") to be performed individually and simultaneously. As a result, this shortens the total imaging time and improves the measurement efficiency. Especially, the configuration of one or more embodiments enables imaging of the output lights with regard to the four different polarized lights at most to be performed individually and simultaneously. This remarkably improves the measurement efficiency and the like.

Furthermore, the configuration of one or more embodiments enables measurement using two different polarized lights, for example, the "polarized light of the first wavelength" and the "polarized light of the third wavelength" and measurement using two different polarized lights, for example, the "polarized light of the second wavelength" and the "polarized light of the fourth wavelength" to be changed over according to the type of the measurement object. Accordingly, the configuration of one or more embodiments uses two different polarized lights having wavelengths close to each other to expand the measurement range, while changing over the type (wavelength) of the light according to the type of the measurement object. As a result, this improves the convenience and the versatility.

For example, a measurement object such as a wafer substrate, for which red color light is not suitable, may be subjected to measurement using two different polarized lights, the "polarized light of the first wavelength" and the "polarized light of the third wavelength" (for example, two blue color lights of 491 nm and 488 nm). A measurement object such as copper, for which blue color light is not suitable, may be subjected to measurement using two different polarized lights, the "polarized light of the second wavelength" and the "polarized light of the fourth wavelength" (for example, two green color lights of 540 nm and 532 nm). The wavelengths of the respective polarized lights are not limited to the above example, but polarized lights of other wavelengths may be employed.

In the three-dimensional measurement device of one or more embodiments, the first irradiation unit may comprise a first combining unit configured to combine the first wavelength light emitted from the first wavelength light emitter and the second wavelength light emitted from the second wavelength light emitter, as the first light. The second irradiation unit may comprise a second combining unit configured to combine the third wavelength light emitted from the third wavelength light emitter and the fourth wavelength light emitted from the fourth wavelength light emitter, as the second light. The first imaging unit may comprise a first separation unit configured to separate the output light with regard to the first light emitted from the first input-output element into the output light with regard to the polarized light of the first wavelength and the output light with regard to the polarized light of the second wavelength, when the first light including the polarized light of the first wavelength and the polarized light of the second wavelength is emitted from the first irradiation unit. The second imaging unit may comprise a second separation unit configured to separate the output light with regard to the second light emitted from the second input-output element into the output light with regard to the polarized light of the third wavelength and the output light with regard to the polarized light of the fourth wavelength, when the second light including the polarized light of the third wavelength and the polarized light of the fourth wavelength is emitted from the second irradiation unit.

The configuration of one or more embodiments causes the combined light of the first wavelength light and the second wavelength light to enter a predetermined optical system (for example, a polarizing beam splitter). The output light emitted from the predetermined optical system is subjected to wavelength separation by means of a separation unit (for example, a dichroic mirror). Accordingly, this configuration obtains output light with regard to the polarized light of the first wavelength and output light with regard to the polarized light of the second wavelength.

Similarly, the configuration of one or more embodiments causes the combined light of the third wavelength light and the fourth wavelength light to enter the predetermined optical system (for example, the polarizing beam splitter). The output light emitted from the predetermined optical system is subjected to wavelength separation by means of the separation unit (for example, the dichroic mirror). Accordingly, this configuration obtains output light with regard to the polarized light of the third wavelength and output light with regard to the polarized light of the fourth wavelength.

As a result, this allows a conventionally used interference optical system (predetermined optical system) to be used and accordingly simplifies the configuration. Additionally, the configuration of one or more embodiments may also use at most four different lights simultaneously. This further expands the measurement range and further improves the measurement efficiency.

Accordingly, in the case where the "polarized light of the first wavelength" and the "polarized light of the second wavelength" are combined by the first combining unit, the "polarized light of the first wavelength" and the "polarized light of the second wavelength" included in the "first light" are polarized lights having separate wavelengths to such a degree as to be separable by the first separation unit (for example, a dichroic mirror), according to one or more embodiments. Similarly, in the case where the "polarized light of the third wavelength" and the "polarized light of the fourth wavelength" are combined by the second combining unit, the "polarized light of the third wavelength" and the "polarized light of the fourth wavelength" included in the "second light" are polarized lights having separate wavelengths to such a degree as to be separable by the second separation unit (for example, a dichroic mirror), according to one or more embodiments.

In the three-dimensional measurement device of one or more embodiments, when the measurement object is arranged to be flush with the reference surface, a polarizing direction of polarized light included in the first light that enters the first input-output element (for example, "polarized light of a first wavelength" and/or "polarized light of a second wavelength") may be identical with a polarizing direction of polarized light included in the output light with regard to the first light that is emitted from the first input-output element (for example, "polarized light of the first wavelength" and/or "polarized light of the second wavelength"), and a polarizing direction of polarized light included in the second light that enters the second input-output element (for example, "polarized light of a third wavelength" and/or "polarized light of a fourth wavelength") may be identical with a polarizing direction of polarized light included in the output light with regard to the second light that is mitted from the second input-output element (for example, "polarized light of the third wavelength" and/or "polarized light of the fourth wavelength").

The configuration of one or more embodiments more effectively achieves the functions and the advantageous effects described above.

In the three-dimensional measurement device of one or more embodiments, when an incident direction of the first light that enters the first input-output element is aligned with an incident direction of the second light that enters the second input-output element on a plane including both the incident directions, a polarizing direction of polarized light included in the first light (for example, "polarized light of a first wavelength" and/or "polarized light of a second wavelength") may differ from a polarizing direction of polarized light included in the second light (for example, "polarized light of a third wavelength" and/or "polarized light of a fourth wavelength") by 90 degrees.

The configuration of one or more embodiments more effectively achieves the functions and the advantageous effects described above.

In the three-dimensional measurement device of one or more embodiments, polarized light included in the first light (for example, "polarized light of a first wavelength" and/or "polarized light of a second wavelength") or measurement light or reference light thereof and polarized light included in the second light (for example, "polarized light of a third wavelength" and/or "polarized light of a fourth wavelength") or measurement light or reference light thereof that travel in an identical direction on an identical axis line (for example, toward the measurement object or toward the reference surface) may have polarizing directions that different from each other by 90 degrees.

The three-dimensional measurement device of one or more embodiments may further comprise a phase shift unit configured to give a relative phase difference between the reference light and the measurement light. The image processor may be configured to perform three-dimensional measurement of the measurement object by a phase shift method, based on taken and obtained multiple different interference fringe images of the output light that is subjected to multiple (for example, three or four) phase shifts by the phase shift unit.

In a conventional three-dimensional measurement device using the phase shift method, there is a need to change the phase, for example, in four different levels or in three different levels and take corresponding four or three different interference fringe images. When two different lights having a small wavelength difference are used with a view to expanding the measurement range, a required imaging time is accordingly for four imaging processes (or for three imaging processes) at different timings, i.e., a total of eight imaging processes (or a total of six imaging processes).

The configuration of one or more embodiments, on the other hand, enables imaging of the output light with regard to the first light and imaging of the output light with regard to the second light to be performed simultaneously. Accordingly, a total of eight (or six) interference fringe images with regard to the two different lights can be obtained in an imaging time for four imaging processes (or for three imaging processes). As a result, this shortens the total imaging time and improves the measurement efficiency.

Especially, the configuration of one or more embodiments enables imaging of the "output light with regard to the polarized light of the first wavelength" and/or the "output light with regard to the polarized light of the second wavelength" included in the output light with regard to the first light and imaging of the "output light with regard to the polarized light of the third wavelength" and/or the "output light with regard to the polarized light of the fourth wavelength included in the output light with regard to the second light to be performed individually and simultaneously. Accordingly, this obtains, for example, a total of sixteen (four by four) interference fringe images with regard to four different lights at most in an imaging time for four imaging processes.

The three-dimensional measurement device of one or more embodiments may further comprise a spectroscopic unit configured to split the output light into a plurality of split lights; and a filter unit configured as the phase shift unit to give respectively different phase differences to at least a required number of (for example, three or four) split lights that are required for measurement by the phase shift method, out of the plurality of split lights that are split by the spectroscopic unit. The imaging unit may be configured to simultaneously take images of at least the plurality of split lights that are transmitted through the filter unit.

The above phase shift unit may be configured to move, for example, the reference surface along the optical axis and thereby physically change the optical path length. This configuration, however, takes a considerable time to obtain all the interference fringe images required for measurement. This not only increases the measurement time but is likely to decrease the measurement accuracy due to the effects of, for example, fluctuation of the air and vibration.

The configuration of one or more embodiments, on the other hand, enables all the interference fringe images required for measurement to be obtained simultaneously. For example, this configuration enables a total of eight (or a total of six) interference fringe images with regard to two different lights to be obtained simultaneously. Especially, the configuration of one or more embodiments enables a total of sixteen (four by four) interference fringe images with regard to four different lights at most to be obtained simultaneously. As a result, this improves the measurement accuracy and significantly shortens the total imaging time, thus achieving remarkable improvement of the measurement efficiency.

The "spectroscopic unit" may be, for example, a "spectroscopic unit configured to split incident light into four lights having equal optical path lengths and having optical paths that are arrayed in matrix on a plane perpendicular to the traveling direction of light". One example is a configuration of one or more embodiments described below.

In the three-dimensional measurement device of one or more embodiments, the spectroscopic unit may comprise a first optical member (first Koester prism) that is a triangular prism having a triangular sectional shape along a first plane and includes a first splitting unit (first half mirror) arranged along a plane that goes through a line of intersection between a first surface and a second surface out of three surfaces along a direction perpendicular to the first plane and that is orthogonal to a third surface; and a second optical member (second Koester prism) that is a triangular prism having a triangular sectional shape along a second plane orthogonal to the first plane and includes a second splitting unit (second half mirror) arranged along a plane that goes through a line of intersection between a first surface and a second surface out of three surfaces along a direction perpendicular to the second plane and that is orthogonal to a third surface.

The third surface of the first optical member may be arranged to be opposed to the first surface of the second optical member, such that light (vertically) entering the first surface of the first optical member is split in two directions by the first splitting unit, wherein split light reflected by the first splitting unit is reflected at the first surface toward the third surface, and split light transmitted through the first splitting unit is reflected at the second surface toward the third surface, so that two parallel split lights are emitted from the third surface, and such that the two split lights emitted from the third surface of the first optical member (vertically) enter the first surface of the second optical member, and each of the two split lights is split in two directions by the second splitting unit, wherein two split lights reflected by the second splitting unit are respectively reflected at the first surface toward the third surface, and two split lights transmitted through the second splitting unit are respectively reflected at the second surface toward the third surface, so that four parallel split lights are emitted from the third surface.

The configuration of one or more embodiments enables light emitted from the predetermined optical system (interference optical system) to be split into four lights arrayed in two by two matrix. In a configuration of taking images of a plurality of split lights simultaneously by one single imaging element like one or more embodiments described below, divisional areas determined by dividing the imaging region of the imaging element in matrix of four equal areas may thus be respectively allocated to the four split lights. This configuration accordingly ensures the effective use of the imaging region of the imaging element. For example, when the imaging region of a general imaging element having an aspect ratio of 4 to 3 is divided into four equal areas, the respective divisional areas have the same aspect ratio of 4 to 3. This makes a wider range in each divisional area usable and thereby further improves the measurement accuracy.

Using diffraction grating as the spectroscopic unit is likely to reduce the resolution. The configuration of one or more embodiments, however, splits one light into two parallel lights and further splits each of the two parallel lights into two parallel lights, so as to split one light into four parallel lights. This configuration suppresses reduction of the resolution.

Additionally, one or more embodiments employ the optical member having the above configuration (Koester prism) as the means for splitting one light into two parallel lights, so that the two split lights have optically identical optical path lengths. As a result, there is no need to provide an optical path adjusting unit to adjust the optical path lengths of the two split lights. This configuration reduces the total number of components and achieves, for example, the simplified configuration and downsizing of the device.

The configuration that the third surface of the first optical member is in contact with the first surface of the second optical member causes the light to travel only in the optical member and is not exposed to the air until one light entering the spectroscopic unit is emitted as four split lights. This configuration reduces the effects of, for example, fluctuation of the air.

In the three-dimensional measurement device of one or more embodiments, each of the imaging units may be configured to simultaneously take images of at least the plurality of split lights that are transmitted through the filter unit, by means of a single imaging element.

A configuration of taking images of a plurality of split lights simultaneously may use a plurality of cameras (imaging elements) to take images of the respective split lights. This configuration is, however, likely to cause a measurement error due to, for example, the difference of the respective cameras (imaging elements).

The configuration of one or more embodiments, on the other hand, simultaneously takes images of a plurality of split lights by one single imaging element. This reduces the possibility of a measurement error or the like and improves the measurement accuracy.

In the three-dimensional measurement device of one or more embodiments, the measurement object may be either solder paste printed on a printed circuit board or a solder bump formed on a wafer substrate.

The configuration of one or more embodiments allows for, for example, height measurement of solder paste printed on the printed circuit board or a solder bump formed on a wafer substrate. This configuration accordingly enables the quality of the solder paste or the quality of the solder bump to be determined, based on the measurement value in inspection of the solder paste or the solder bump. This accordingly allows for quality judgement with the high accuracy in this inspection by providing the functions and the advantageous effects described above. As a result, this improves the inspection accuracy of a solder printing inspection device or a solder bump inspection device.

DETAILED DESCRIPTION OF EMBODIMENTS

Figure 1:
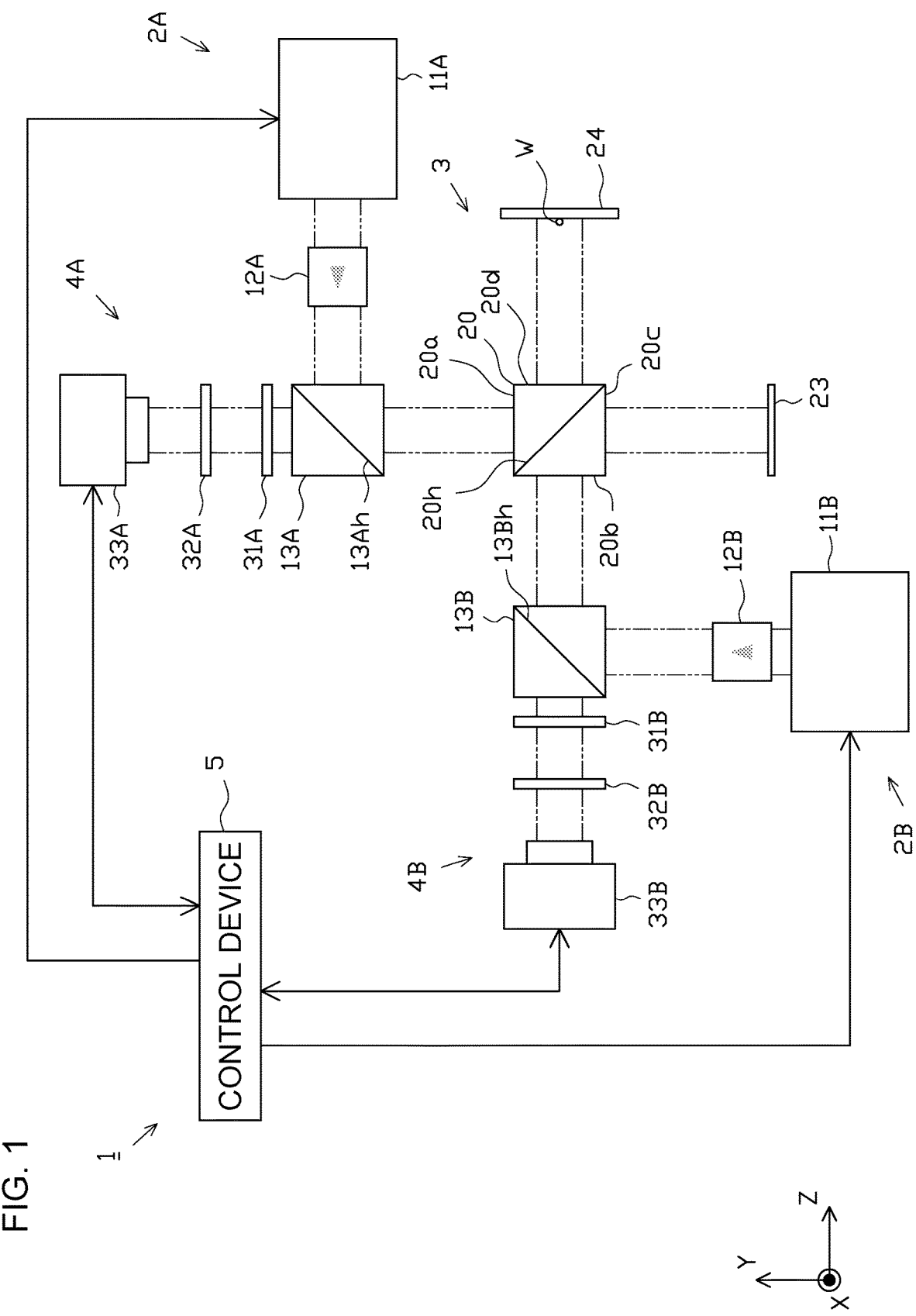
FIG. 1 is a schematic configuration diagram illustrating a three-dimensional measurement device according to one or more embodiments.
Figure 2:
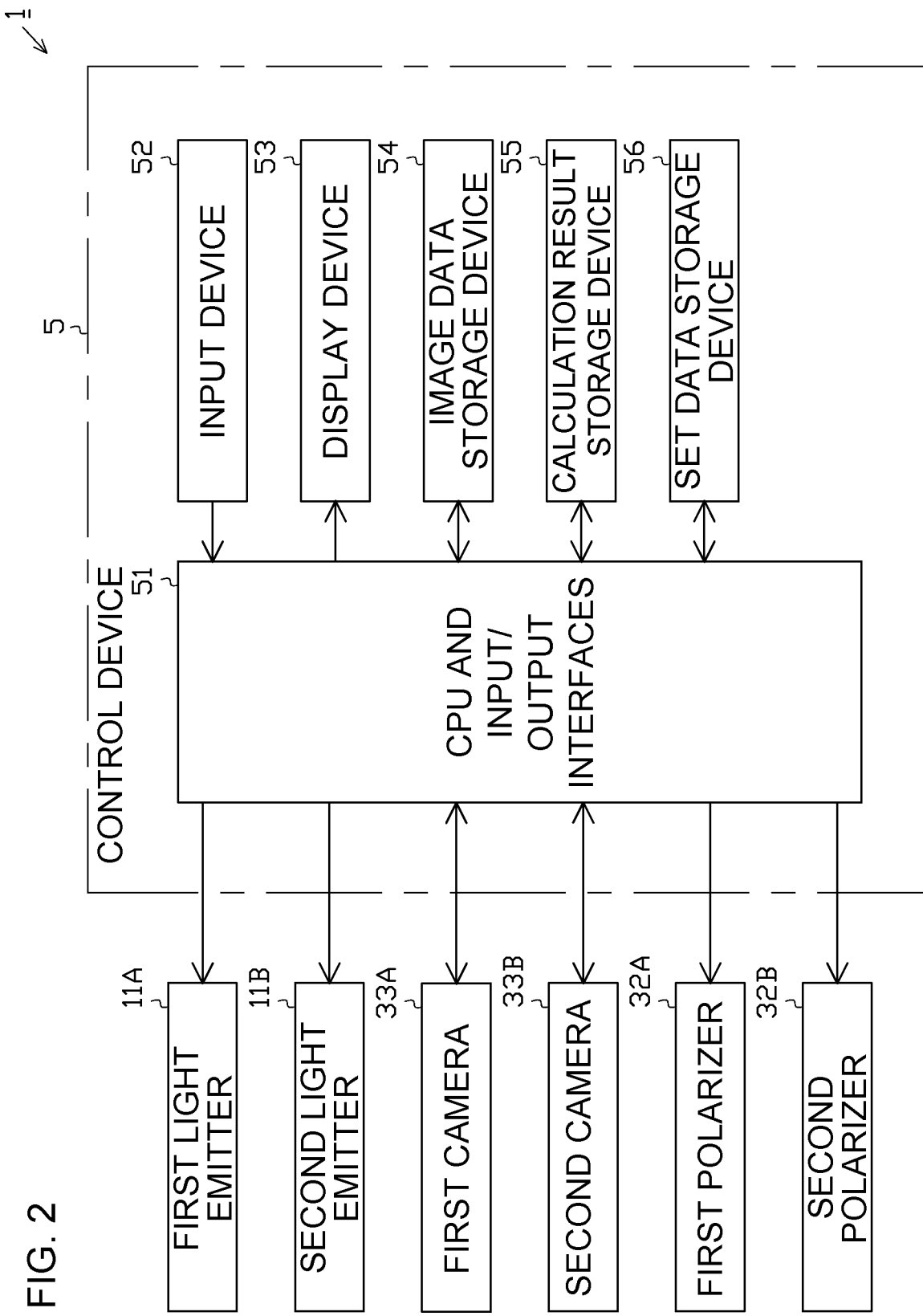
FIG. 2 is a block diagram illustrating the electrical configuration of the three-dimensional measurement device according to one or more embodiments.

The following describes one or more embodiments of a three-dimensional measurement device with reference to the drawings. FIG. 1 is a diagram illustrating the schematic configuration of a three-dimensional measurement device 1 according to one or more embodiments. FIG. 2 is a block diagram illustrating the electrical configuration of the three-dimensional measurement device 1. In the description below, as a matter of convenience, a front-back direction of the sheet surface of FIG. 1 is called "X-axis direction", a top-bottom direction of the sheet surface is called "Y-axis direction" and a left-right direction of the sheet surface is called "Z-axis direction".

The three-dimensional measurement device 1 is configured based on the principle of a Michelson interferometer and includes two projection optical systems 2A and 2B (first projection optical system 2A and second projection optical system 2B) configured to emit predetermined lights, an interference optical system 3 in which the lights respectively emitted from the projection optical systems 2A and 2B enter, two imaging systems 4A and 4B (first imaging system 4A and second imaging system 4B) in which the lights emitted from the interference optical system 3 enter, and a control device 5 configured to execute various controls, image processing, calculations and the like involved in the projection optical systems 2A and 2B, the interference optical system 3, the imaging systems 4A and 4B and the like.

The "control device 5" is configured as the "image processor" according to one or more embodiments, and the "interference optical system 3" is configured as the "predetermined optical system (specific optical system)" according to one or more embodiments. In one or more embodiments of the present invention, the "interference optical system" denotes an optical system configured to split predetermined incident light into two lights (measurement light and reference light), provide the two lights with an optical path difference, recombine the two lights and output the combined light, for the purpose of causing interference of light (taking an interference fringe image). In other words, the "interference optical system" denotes not only an optical system that internally causes interference of two lights (measurement light and reference light) and outputs the interfering light but an optical system that simply combines two lights (measurement light and reference light) and outputs the combined light without internally causing interference of the two lights. Accordingly, as described later, when two lights (measurement light and reference light) are output as the combined light without interference from the "interference optical system", interfering light is obtained by means of a predetermined interfering unit in at least a stage prior to imaging (for example, inside of the imaging system).

The configuration of the two projection optical systems 2A and 2B (first projection optical system 2A and second projection optical system 2B) is described first in detail. The first projection optical system 2A includes, for example, a first light emitter 11A, a first light isolator 12A and a first non-polarizing beam splitter 13A. The "first light emitter 11A" and the "first light isolator 12A" constitute the "first irradiation unit (first irradiator)" according to one or more embodiments.

Although not being illustrated, the first light emitter 11A includes, for example, a laser light source configured to output linearly polarized light of a specific wavelength $\lambda_1$; a beam expander configured to expand the linearly polarized light output from the laser light source and emit the expanded light as parallel light; a polarizer configured to adjust the intensity; and a half wave plate configured to adjust the polarizing direction.

According to the configuration of one or more embodiments, linearly polarized light of the wavelength $\lambda_1$ (for example, $\lambda_1=1500$ nm) having a polarizing direction that is a direction inclined at 45 degrees to the X-axis direction and the Y-axis direction is emitted leftward in the Z-axis direction from the first light emitter 11A. Hereinafter the light of the wavelength $\lambda_1$ emitted from the first light emitter 11A is called "first light".

The first light isolator 12A is an optical element configured to transmit only a light traveling in one direction (leftward in the Z-axis direction according to one or more embodiments) but block a light traveling in a reverse direction (rightward in the Z-axis direction according to one or more embodiments). This configuration allows for transmission of only the first light emitted from the first light emitter 11A and thereby prevents damage and destabilization of the first light emitter 11A by return light.

The first non-polarizing beam splitter 13A is a cube-shaped known optical member configured by joining right angle prisms (triangular prisms having a bottom face in an isosceles right triangle shape: the same applies hereinafter) together to be integrated, and its joint surface 13Ah is coated with, for example, a metal film. The "first non-polarizing beam splitter 13A" constitutes the "first light guiding unit" according to one or more embodiments.

The non-polarizing beam splitter is configured to split the incident light including the polarization state into a transmitted light and a reflected light at a predetermined ratio. The same applies hereinafter. According to one or more embodiments, a half mirror having a 1:1 split ratio is employed as the non-polarizing beam splitter. More specifically, the half mirror splits the incident light to provide a P-polarized light component and an S-polarized light component of the transmitted light and a P-polarized light component and an S-polarized light component of the reflected light all at identical rates and provide the respective polarization states of the transmitted light and the reflected light that are identical with the polarization state of the incident light.

According to one or more embodiments, linearly polarized light having a polarizing direction that is a direction parallel to the sheet surface of FIG. 1 (Y-axis direction or Z-axis direction) is called P-polarized light (P-polarized light component). Linearly polarized light having a polarizing direction that is the X-axis direction perpendicular to the sheet surface of FIG. 1 is called S-polarized light (S-polarized light component). The "P-polarized light" corresponds to the "polarized light having the first polarizing direction". The "S-polarized light" corresponds to the "polarized light having the second polarizing direction".

The first non-polarizing beam splitter 13A is arranged such that one of two surfaces adjoining to each other across the joint surface 13Ah is perpendicular to the Y-axis direction and the other of the two surfaces is perpendicular to the Z-axis direction. In other words, the joint surface 13Ah of the first non-polarizing beam splitter 13A is arranged to be inclined at 45 degrees to the Y-axis direction and the Z-axis direction. More specifically, the first non-polarizing beam splitter 13A is arranged to transmit part (half) of the first light that enters leftward in the Z-axis direction from the first light emitter 11A via the first light isolator 12A, leftward in the Z-axis direction and reflect the remaining part (remaining half) of the first light downward in the Y-axis direction.

Like the first projection optical system 2A described above, the second projection optical system 2B includes, for example, a second light emitter 11B, a second light isolator 12B and a second non-polarizing beam splitter 13B. The "second light emitter 11B" and the "second light isolator 12B" constitute the "second irradiation unit (second irradiator)" according to one or more embodiments.

Like the first light emitter 11A described above, the second light emitter 11B includes, for example, a laser light source configured to output linearly polarized light of a specific wavelength $\lambda_2$; a beam expander configured to expand the linearly polarized light output from the laser light source and emit the expanded light as parallel light; a polarizer configured to adjust the intensity; and a half wave plate configured to adjust the polarizing direction.

According to the configuration of one or more embodiments, linearly polarized light of the wavelength $\lambda_2$ (for example, 72=1503 nm) having a polarizing direction that is a direction inclined at 45 degrees to the X-axis direction and the Z-axis direction is emitted upward in the Y-axis direction from the second light emitter 11B. Hereinafter the light of the wavelength $\lambda_2$ emitted from the second light emitter 11B is called "second light".

Like the first light isolator 12A, the second light isolator 12B is an optical element configured to transmit only a light traveling in one direction (upward in the Y-axis direction according to one or more embodiments) but block a light traveling in a reverse direction (downward in the Y-axis direction according to one or more embodiments). This configuration allows for transmission of only the second light emitted from the second light emitter 11B and thereby prevents damage and destabilization of the second light emitter 11B by return light.

Like the first non-polarizing beam splitter 13A, the second non-polarizing beam splitter 13B is a cube-shaped known optical member configured by joining right angle prisms together to be integrated, and its joint surface 13Bh is coated with, for example, a metal film. The "second non-polarizing beam splitter 13B" constitutes the "second light guiding unit" according to one or more embodiments.

The second non-polarizing beam splitter 13B is arranged such that one of two surfaces adjoining to each other across the joint surface 13Bh is perpendicular to the Y-axis direction and the other of the two surfaces is perpendicular to the Z-axis direction. In other words, the joint surface 13Bh of the second non-polarizing beam splitter 13B is arranged to be inclined at 45 degrees to the Y-axis direction and the Z-axis direction. More specifically, the second non-polarizing beam splitter 13B is arranged to transmit part (half) of the second light that enters upward in the Y-axis direction from the second light emitter 11B via the second light isolator 12B, upward in the Y-axis direction and reflect the remaining part (remaining half) of the second light rightward in the Z-axis direction.

The following describes the configuration of the interference optical system 3 in detail. The interference optical system 3 includes, for example, a polarizing beam splitter (PBS) 20, a reference surface 23, and a placement structure 24.

The polarizing beam splitter 20 is a cube-shaped known optical member configured by joining right angle prisms together to be integrated, and its joint surface (boundary surface) 20h is coated with, for example, a dielectric multilayer film.

The polarizing beam splitter 20 is configured to split a linearly polarized incident light into two polarized light components (P-polarized light component and S-polarized light component) having polarizing directions perpendicular to each other. According to one or more embodiments, the polarizing beam splitter 20 is configured to transmit the P-polarized light component and reflect the S-polarized light component. The polarizing beam splitter 20 of one or more embodiments accordingly serves to split a predetermined incident light into two lights (measurement light and reference light) and to recombine the two lights.

The polarizing beam splitter 20 is arranged such that one of two surfaces adjoining to each other across the joint surface 20h is perpendicular to the Y-axis direction and the other of the two surfaces is perpendicular to the Z-axis direction. In other words, the joint surface 20h of the polarizing beam splitter 20 is arranged to be inclined at 45 degrees to the Y-axis direction and the Z-axis direction.

More specifically, a first surface (upper side face in the Y-axis direction) 20a of the polarizing beam splitter 20, which the first light reflected downward in the Y-axis direction from the first non-polarizing beam splitter 13A enters, and a third surface (lower side face in the Y-axis direction) 20c opposed to the first surface 20a are arranged to be perpendicular to the Y-axis direction. The "first surface 20a of the polarizing beam splitter 20" corresponds to the "first input-output element" according to one or more embodiments.

A second surface (left side face in the Z-axis direction) 20b of the polarizing beam splitter 20, which is a surface adjoining to the first surface 20a across the joint surface 20h and which the second light reflected rightward in the Z-axis direction from the second non-polarizing beam splitter 13B enters, and a fourth surface (right side face in the Z-axis direction) 20d opposed to the second surface 20b are arranged to be perpendicular to the Z-axis direction. The "second surface 20b of the polarizing beam splitter 20" corresponds to the "second input-output element" according to one or more embodiments.

The reference surface 23 is arranged to be opposed in the Y-axis direction to the third surface 20c of the polarizing beam splitter 20. The linearly polarized light (reference light) emitted from the third surface 20c of the polarizing beam splitter 20 is radiated to the reference surface 23. The reference light reflected by the reference surface 23 reenters the third surface 20c of the polarizing beam splitter 20.

The placement structure 24 is arranged to be opposed in the Z-axis direction to the fourth surface 20d of the polarizing beam splitter 20. The linearly polarized light (measurement light) emitted from the fourth surface 20d of the polarizing beam splitter 20 is radiated to a work W as a measurement object placed on the placement structure 24. The measurement light reflected by the work W reenters the fourth surface 20d of the polarizing beam splitter 20.

The following describes the configuration of the two imaging systems 4A and 4B (first imaging system 4A and second imaging system 4B) in detail. The "first imaging system 4A" constitutes the "first imaging unit" and the "second imaging system 4B" constitutes the "second imaging unit" according to one or more embodiments.

The first imaging system 4A includes, for example, a quarter wave plate 31A, a first polarizer 32A and a first camera 33A.

The quarter wave plate 31A is configured to respectively convert the linearly polarized lights (reference light component and measurement light component of the first light) transmitted upward in the Y-axis direction through the first non-polarizing beam splitter 13A, into circularly polarized lights.

The first polarizer 32A is configured to selectively transmit the respective components of the first light converted into the circularly polarized lights by the quarter wave plate 31A. This configuration causes interference of the reference light component and the measurement light component of the first light having different rotating directions, with regard to a specific phase. The "first polarizer 32A" constitutes the "phase shift unit" and the "interfering unit" according to one or more embodiments.

The first polarizer 32A according to one or more embodiments is configured to be rotatable about the Y-axis direction as the axial center and is controlled to change its transmission axis direction by 45 degrees each. More specifically, the transmission axis direction is changed to "0 degree", "45 degrees", "90 degrees" and "135 degrees" relative to the X-axis direction.

This configuration causes interference of the reference light component and the measurement light component of the first light transmitted through the first polarizer 32A, in four different phases. This accordingly generates interfering lights having phases that are different from one another by 90 degrees. More specifically, this generates an interfering light having a phase of "0 degree", an interfering light having a phase of "90 degrees", an interfering light having a phase of "180 degrees" and an interfering light having a phase of "270 degrees".

The first camera 33A has a known configuration including a lens, an imaging element and the like. According to one or more embodiments, a CCD area sensor is employed as the imaging element of the first camera 33A. The imaging element is, however, not limited to these embodiments. For example, a CMOS area sensor may be employed as the imaging element.

Image data taken by the first camera 33A are converted into digital signals inside of the first camera 33A and are input in the form of digital signals into the control device 5 (image data storage device 54).

More specifically, an interference fringe image having the phase of "0 degree", an interference fringe image having the phase of "90 degrees", an interference fringe image having the phase of "180 degrees" and an interference fringe image having the phase of "270 degrees" with regard to the first light are taken by the first camera 33A.

Like the first imaging system 4A, the second imaging system 4B includes, for example, a quarter wave plate 31B, a second polarizer 32B and a second camera 33B.

The quarter wave plate 31B is configured to respectively convert the linearly polarized lights (reference light component and measurement light component of the second light)

transmitted leftward in the Z-axis direction through the second non-polarizing beam splitter 13B, into circularly polarized lights.

Like the first polarizer 32A, the second polarizer 32B is configured to selectively transmit the respective components of the second light converted into the circularly polarized lights by the quarter wave plate 31B. This configuration causes interference of the reference light component and the measurement light component of the second light having different rotating directions, with regard to a specific phase. The "second polarizer 32B" constitutes the "phase shift unit" and the "interfering unit" according to one or more embodiments.

The second polarizer 32B according to one or more embodiments is configured to be rotatable about the Z-axis direction as the axial center and is controlled to change its transmission axis direction by 45 degrees each. More specifically, the transmission axis direction is changed to "0 degree", "45 degrees", "90 degrees" and "135 degrees" relative to the Y-axis direction.

This configuration causes interference of the reference light component and the measurement light component of the second light transmitted through the second polarizer 32B, in four different phases. This accordingly generates interfering lights having phases that are different from one another by 90 degrees. More specifically, this generates an interfering light having a phase of "0 degree", an interfering light having a phase of "90 degrees", an interfering light having a phase of "180 degrees" and an interfering light having a phase of "270 degrees".

Like the first camera 33A, the second camera 33B has a known configuration including a lens, an imaging element and the like. According to one or more embodiments, like the first camera 33A, a CCD area sensor is employed as the imaging element of the second camera 33B. The imaging element is, however, not limited to these embodiments. For example, a CMOS area sensor may be employed as the imaging element.

Like the first camera 33A, image data taken by the second camera 33B are converted into digital signals inside of the second camera 33B and are input in the form of digital signals into the control device 5 (image data storage device 54).

More specifically, an interference fringe image having the phase of "0 degree", an interference fringe image having the phase of "90 degrees", an interference fringe image having the phase of "180 degrees" and an interference fringe image having the phase of "270 degrees" with regard to the second light are taken by the second camera 33B.

The following describes the electrical configuration of the control device 5. As shown in FIG. 2, the control device 5 includes CPU and input/output interfaces 51 configured to control the entire three-dimensional measurement device 1, an input device 52 configured by a keyboard and a mouse or by a touch panel as the "input unit", a display device 53 configured as the "display unit" including a display screen such as a liquid crystal screen, an image data storage device 54 configured to successively store the image data taken and obtained by the cameras 33A and 33B and the like, a calculation result storage device 55 configured to store results of various calculations, and a set data storage device 56 configured to store various information in advance. These devices 52 to 56 are electrically connected with the CPU and input/output interfaces 51.

The following describes the functions of the three-dimensional measurement device 1. Radiation of the first light and radiation of the second light are performed simultaneously according to one or more embodiments as described later. The optical path of the first light and the optical path of the second light partly overlap each other. For the better understanding, the optical path of the first light and the optical path of the second light are illustrated in different drawings and are described individually.

Figure 3:
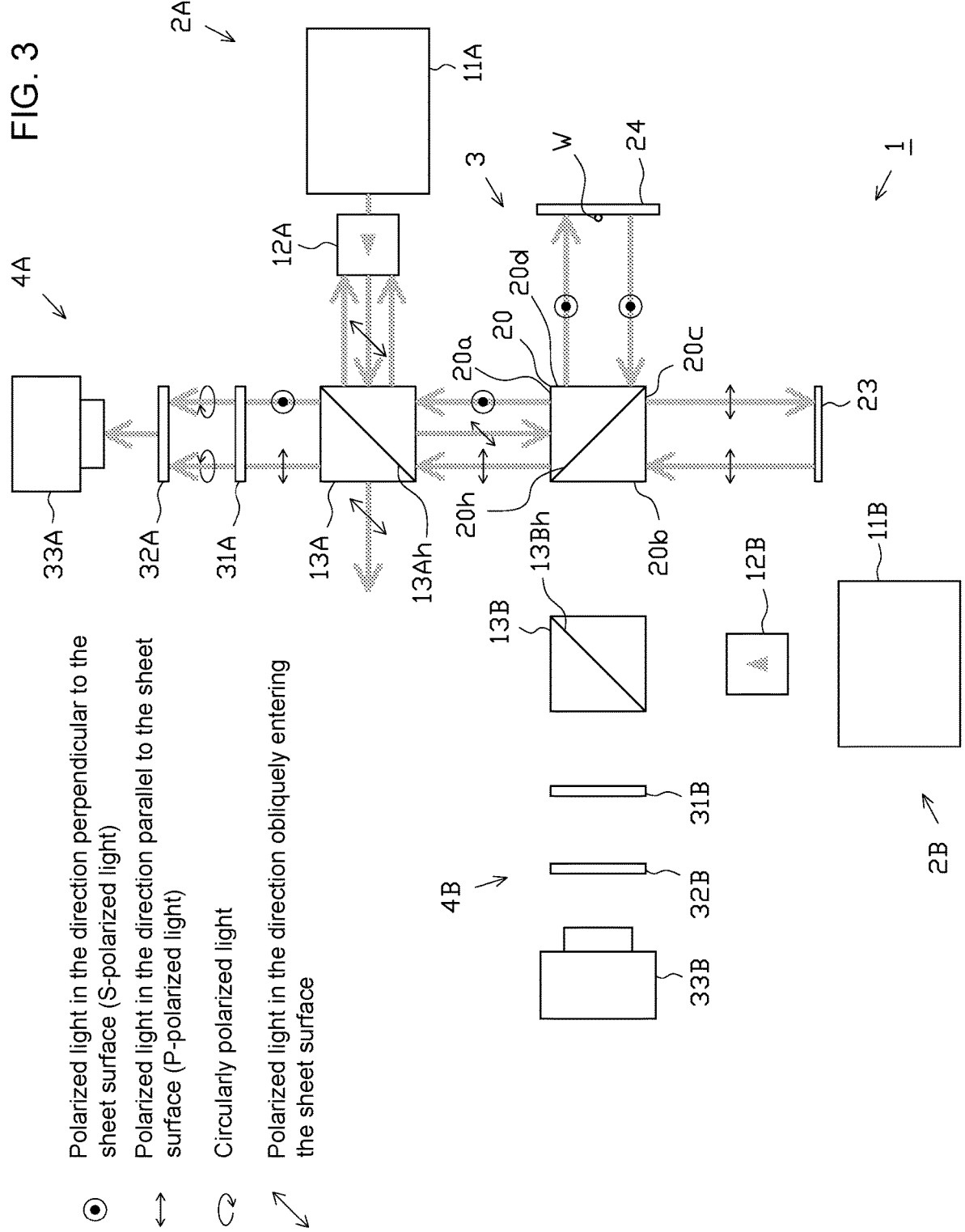
FIG. 3 is an optical path diagram illustrating an optical path of a first light according to one or more embodiments.

The optical path of the first light is described first with reference to FIG. 3. As shown in FIG. 3, the first light of the wavelength $\lambda_1$ (linearly polarized light having the polarizing direction that is the direction inclined at 45 degrees to the X-axis direction and the Y-axis direction) is emitted leftward in the Z-axis direction from the first light emitter 11A.

The first light emitted from the first light emitter 11A passes through the first light isolator 12A and enters the first non-polarizing beam splitter 13A. Part of the first light entering the first non-polarizing beam splitter 13A is transmitted leftward in the Z-axis direction, while the remaining part is reflected downward in the Y-axis direction.

The first light reflected downward in the Y-axis direction (linearly polarized light having the polarizing direction that is the direction inclined at 45 degrees to the X-axis direction and the Z-axis direction) enters the first surface 20a of the polarizing beam splitter 20. The first light transmitted leftward in the Z-axis direction, on the other hand, does not enter any optical system or the like but is left as waste light.

This waste light may be used for measurement of the wavelength or for measurement of the light power as appropriate. This stabilizes the light source and thereby improves the measurement accuracy.

With regard to the first light entering the first surface 20a of the polarizing beam splitter 20 downward in the Y-axis direction, its P-polarized light component is transmitted downward in the Y-axis direction and is emitted from the third surface 20c as the reference light, while its S-polarized light component is reflected rightward in the Z-axis direction and is emitted from the fourth surface 20d as the measurement light.

The reference light (P-polarized light) of the first light emitted from the third surface 20c of the polarizing beam splitter 20 is reflected by the reference surface 23. The reference light (P-polarized light) of the first light then reenters the third surface 20c of the polarizing beam splitter 20.

The measurement light (S-polarized light) of the first light emitted from the fourth surface 20d of the polarizing beam splitter 20 is, on the other hand, reflected by the work W. The measurement light (S-polarized light) of the first light then reenters the fourth surface 20d of the polarizing beam splitter 20.

The reference light (P-polarized light) of the first light reentering the third surface 20c of the polarizing beam splitter 20 is transmitted upward in the Y-axis direction through the joint surface 20h, while the measurement light (5-polarized light) of the first light reentering the fourth surface 20d is reflected upward in the Y-axis direction by the joint surface 20h. The combined light generated by recombining the reference light and the measurement light of the first light with each other is then emitted as the output light from the first surface 20a of the polarizing beam splitter 20.

The combined light (reference light and measurement light) of the first light emitted from the first surface 20a of the polarizing beam splitter 20 enters the first non-polarizing beam splitter 13A. Part of the combined light of the first light entering the first non-polarizing beam splitter 13A upward in the Y-axis direction is transmitted upward in the Y-axis direction, while the remaining part is reflected rightward in the Z-axis direction. The combined light (reference light and measurement light) transmitted upward in the Y-axis direction enters the first imaging system 4A. The combined light reflected rightward in the Z-axis direction is, on the other hand, blocked by the first light isolator 12A to be left as waste light.

With regard to the combined light (reference light and measurement light) of the first light entering the first imaging system 4A, the quarter wave plate 31A converts the reference light component (P-polarized light component) into clockwise circularly polarized light, while converting the measurement light component (S-polarized light component) into counterclockwise circularly polarized light. The counterclockwise circularly polarized light and the clockwise circularly polarized light have different rotating directions and accordingly do not interfere with each other.

The combined light of the first light subsequently passes through the first polarizer 32A, so that its reference light component and its measurement light component interfere with each other in a phase corresponding to the angle of the first polarizer 32A. An image of this interfering light of the first light is then taken by the first camera 33A.

Figure 4:
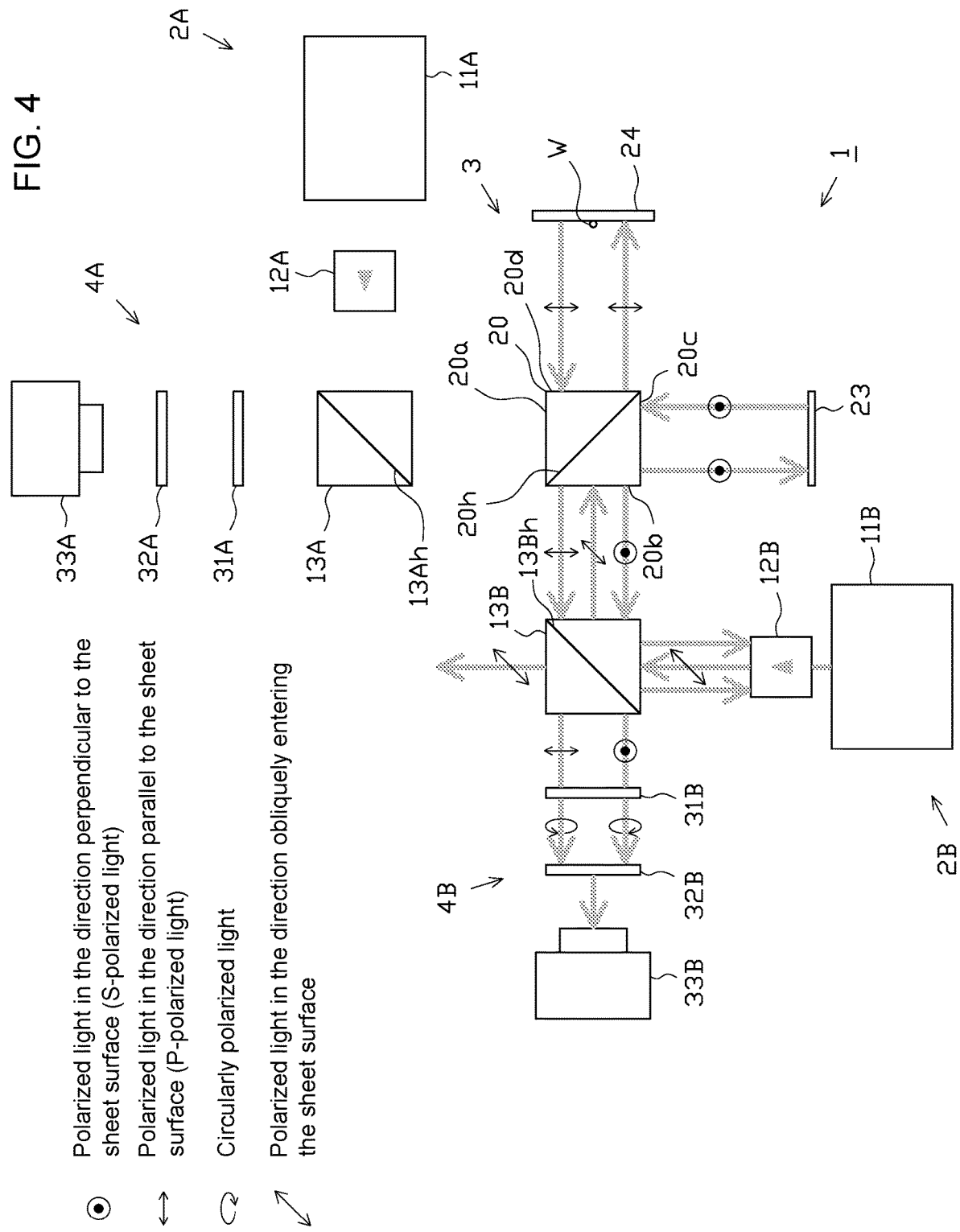
FIG. 4 is an optical path diagram illustrating an optical path of a second light according to one or more embodiments.

The optical path of the second light is then described with reference to FIG. 4. As shown in FIG. 4, the second light of the wavelength $\lambda_2$ (linearly polarized light having the polarizing direction that is the direction inclined at 45 degrees to the X-axis direction and the Z-axis direction) is emitted upward in the Y-axis direction from the second light emitter 11B.

The second light emitted from the second light emitter 11B passes through the second light isolator 12B and enters the second non-polarizing beam splitter 13B. Part of the second light entering the second non-polarizing beam splitter 13B is transmitted upward in the Y-axis direction, while the remaining part is reflected rightward in the Z-axis direction.

The second light reflected rightward in the Z-axis direction (linearly polarized light having the polarizing direction that is the direction inclined at 45 degrees relative to the X-axis direction and the Y-axis direction) enters the second surface 20b of the polarizing beam splitter 20. The second light transmitted upward in the Y-axis direction, on the other hand, does not enter any optical system or the like but is left as waste light.

This waste light may be used for measurement of the wavelength or for measurement of the light power as appropriate. This stabilizes the light source and thereby improves the measurement accuracy.

With regard to the second light entering the second surface 20b of the polarizing beam splitter 20 rightward in the Z-axis direction, its S-polarized light component is reflected downward in the Y-axis direction and is emitted from the third surface 20c as the reference light, while its P-polarized light component is transmitted rightward in the Z-axis direction and is emitted from the fourth surface 20d as the measurement light.

The reference light (S-polarized light) of the second light emitted from the third surface 20c of the polarizing beam splitter 20 is reflected by the reference surface 23. The reference light (S-polarized light) of the second light then reenters the third surface 20c of the polarizing beam splitter 20.

The measurement light (P-polarized light) of the second light emitted from the fourth surface 20d of the polarizing beam splitter 20 is reflected by the work W. The measurement light (P-polarized light) of the second light then reenters the fourth surface 20d of the polarizing beam splitter 20.

The reference light (S-polarized light) of the second light reentering the third surface 20c of the polarizing beam splitter 20 is reflected leftward in the Z-axis direction by the joint surface 20h, while the measurement light (P-polarized light) of the second light reentering the fourth surface 20d is transmitted leftward in the Z-axis direction through the joint surface 20h. The combined light generated by recombining the reference light and the measurement light of the second light with each other is then emitted as the output light from the second surface 20b of the polarizing beam splitter 20.

The combined light (reference light and measurement light) of the second light emitted from the second surface 20b of the polarizing beam splitter 20 enters the second non-polarizing beam splitter 13B. Part of the combined light of the second light entering the second non-polarizing beam splitter 13B leftward in the Z-axis direction is transmitted leftward in the Z-axis direction, while the remaining part is reflected downward in the Y-axis direction. The combined light (reference light and measurement light) transmitted leftward in the Z-axis direction enters the second imaging system 4B. The combined light reflected downward in the Y-axis direction is, on the other hand, blocked by the second light isolator 12B to be left as waste light.

With regard to the combined light (reference light and measurement light) of the second light entering the second imaging system 4B, the quarter wave plate 31B converts the reference light component (S-polarized light component) into counterclockwise circularly polarized light, while converting the measurement light component (P-polarized light component) into clockwise circularly polarized light. The counterclockwise circularly polarized light and the clockwise circularly polarized light have different rotating directions and accordingly do not interfere with each other.

The combined light of the second light subsequently passes through the second polarizer 32B, so that its reference light component and its measurement light component interfere with each other in a phase corresponding to the angle of the second polarizer 32B. An image of this interfering light of the second light is then taken by the second camera 33B.

The following describes a procedure of shape measurement process executed by the control device 5 in detail. After the work W is placed on the placement structure 24, the control device 5 sets the transmission axis direction of the first polarizer 32A of the first imaging system 4A at a predetermined reference position (for example, "0 degree"), while setting the transmission axis direction of the second polarizer 32B of the second imaging system 4B at a predetermined reference position (for example, "0 degree").

The control device 5 subsequently causes the first light to be radiated from the first projection optical system 2A and simultaneously causes the second light to be radiated from the second projection optical system 2B. As a result, the combined light (reference light and measurement light) of the first light is emitted from the first surface 20a of the polarizing beam splitter 20 of the interference optical system 3, and simultaneously the combined light (reference light and measurement light) of the second light is emitted from the second surface 20b of the polarizing beam splitter 20.

An image of the combined light of the first light emitted from the first surface 20a of the polarizing beam splitter 20 is taken by the first imaging system 4A, and simultaneously an image of the combined light of the second light emitted from the second surface 20b of the polarizing beam splitter 20 is taken by the second imaging system 4B.

The transmission axis direction of the first polarizer 32A and the transmission axis direction of the second polarizer 32B are both set to "0 degree", so that an interference fringe image of the first light in a phase of "0 degree" is taken by the first camera 33A, and an interference fringe image of the second light in a phase of "0 degree" is taken by the second camera 33B.

Image data taken and obtained by the respective cameras 33A and 33B are then output to the control device 5. The control device 5 stores the input image data into the image data storage device 54.

The control device 5 subsequently executes a changeover process of the first polarizer 32A of the first imaging system 4A and the second polarizer 32B of the second imaging system 4B. More specifically, the first polarizer 32A and the second polarizer 32B are respectively rotated and shifted to a position having the transmission axis direction set at "45 degrees".

On completion of the changeover process, the control device 5 executes a second imaging process in a similar manner to the series of first imaging process described above. More specifically, the control device 5 causes the first light to be radiated from the first projection optical system 2A and simultaneously causes the second light to be radiated from the second projection optical system 2B. The control device 5 subsequently causes an image of the combined light of the first light emitted from the first surface 20a of the polarizing beam splitter 20 to be taken by the first imaging system 4A and simultaneously causes an image of the combined light of the second light emitted from the second surface 20b of the polarizing beam splitter 20 to be taken by the second imaging system 4B. The control device 5 accordingly obtains an interference fringe image of the first light in a phase of "90 degree" and an interference fringe image of the second light in a phase of "90 degree".

After that, two more imaging processes similar to the first imaging process and the second imaging process described above are performed. More specifically, a third imaging process is performed with setting the transmission axis directions of the first polarizer 32A and the second polarizer 32B at "90 degrees", so as to obtain an interference fringe image of the first light in a phase of "180 degree" and an interference fringe image of the second light in a phase of "180 degree".

A fourth imaging process is then performed with setting the transmission axis directions of the first polarizer 32A and the second polarizer 32B at "135 degrees", so as to obtain an interference fringe image of the first light in a phase of "270 degree" and an interference fringe image of the second light in a phase of "270 degree".

All the image data required for three-dimensional measurement (total of eight different interference fringe image data including four different interference fringe image data with regard to the first light and four different interference fringe image data with regard to the second light) are obtained by performing the four imaging processes as described above.

The control device 5 subsequently measures the surface shape of the work W by a phase shift method, based on the four different interference fringe image data with regard to the first light and the four different interference fringe image data with regard to the second light stored in the image data storage device 54. More specifically, the control device 5 calculates height information at respective positions on the surface of the work W.

The principle of height measurement by a general phase shift method is described first. Interference fringe intensities of four different interference fringe image data of predetermined light (first light or second light) at an identical coordinate position (x,y), i.e., luminances $I_1(x,y)$, $I_2(x,y)$, $I_3(x,y)$ and $I_4(x,y)$, are expressed by relational expressions of [Math. 1] given below:

$$I_1(x,y)=B(x,y)+A(x,y)\cos[\Delta\phi(x,y)]$$

$$I_2(x,y)=B(x,y)+A(x,y)\cos[\Delta\phi(x,y)+90°]$$

$$I_3(x,y)=B(x,y)+A(x,y)\cos[\Delta\phi(x,y)+180°]$$

$$I_4(x,y)=B(x,y)+A(x,y)\cos[\Delta\phi(x,y)+270°] \quad \text{[Math. 1]}$$

Herein $\Delta\phi(x,y)$ denotes a phase difference based on the optical path difference between the measurement light and the reference light at the coordinates (x,y). $A(x,y)$ denotes an amplitude of the interfering light, and $B(x,y)$ denotes a bias. The reference light is, however, uniform. From this viewpoint as the basis, $\Delta\phi(x,y)$ denotes a "phase of the measurement light", and $A(x,y)$ denotes an "amplitude of the measurement light".

Accordingly, the phase $\Delta\phi(x,y)$ of the measurement light is determined by a relational expression of [Math. 2] given below, based on the relational expressions of [Math. 1] given above:

$$\Delta\phi(x, y) = \arctan\frac{I_4(x, y) - I_2(x, y)}{I_1(x, y) - I_3(, y)} \quad \text{[Math. 2]}$$

The amplitude $A(x,y)$ of the measurement light is determined by a relational expression of [Math. 3] given below, based on the relational expressions of [Math. 1] given above:

$$A(x,y)=\tfrac{1}{2}\times\sqrt{\{I_1(x,y)-I_3(x,y)\}^2+\{I_4(x,y)-I_2(x,y)\}^2} \quad \text{[Math. 3]}$$

A complex amplitude $E_o(x,y)$ on an imaging element surface is then calculated from the above phase $\Delta\phi(x,y)$ and amplitude $A(x,y)$ according to a relational expression of [Math. 4] given below, where i denotes an imaginary unit.

$$E_0(x,y)=A(x,y)e^{i\phi(x,y)} \quad \text{[Math. 4]}$$

A complex amplitude $E_o(\xi,\eta)$ at coordinates $(\xi,\eta)$ on a surface of the work W is subsequently calculated, based on the complex amplitude $E_o(x,y)$.

The above complex amplitude $E_o(x,y)$ is subjected to Fresnel transform as shown by [Math. 5] given below, where $\lambda$, denotes a wavelength:

$$E_0(x, y) = \frac{1}{\lambda}\int_{-\infty}^{\infty}\int_{-\infty}^{\infty} E_0(\xi, \eta)\frac{\exp\left(-i\frac{2\pi}{\lambda}\sqrt{d^2+(\xi-x)^2+(\eta-y)^2}\right)}{\sqrt{d^2+(\xi-x)^2+(\eta-y)^2}}d\xi d\eta =$$

$$\mathcal{F}^{-1}\{\mathcal{F}(E_0(\xi,\eta))\cdot\mathcal{F}(g(\xi,\eta,x,y))\}$$

$$g(\xi, \eta, x, y) = \frac{i}{\lambda}\frac{\exp\left(-i\frac{2\pi}{\lambda}\sqrt{d^2+(\xi-x)^2+(\eta-y)^2}\right)}{\sqrt{d^2+(\xi-x)^2+(\eta-y)^2}}$$

[Math. 5]

$\mathcal{F}$ : Fourier Transform $\mathcal{F}^{-1}$: Inverse Fourier Transform

[Math. 6] given below is obtained by solving this expression with respect to Eo(ξ,η):

$$E_0(\xi, \eta) = \mathcal{F}^{-1}\left\{\frac{\mathcal{F}(E_0(x, y))}{\mathcal{F}(g(\xi, \eta, x, y))}\right\}$$ [Math. 6]

A phase φ(ξ,η) of the measurement light and an amplitude A(ξ,η) of the measurement light are then calculated from the obtained complex amplitude Eo(ξ,η) according to a relational expression of [Math. 7] given below:

$$E_0(\xi,\eta) = A(\xi,\eta)e^{i\phi(\xi,\eta)}$$ [Math. 7]

The phase φ(ξ,η) of the measurement light is determined according to a relational expression of [Math. 8] given below:

$$\phi(\xi, \eta) = \arctan\frac{\text{Im}[E_0(\xi, \eta)]}{\text{Re}[E_0(\xi, \eta)]}$$ [Math. 8]

The amplitude A(ξ,η) of the measurement light is determined according to a relational expression of [Math. 9] given below:

$$A(\xi,\eta) = \sqrt{(\text{Re}[E_0(\xi,\eta)])^2 + (\text{Im}[E_0(\xi,\eta)])^2}$$ [Math. 9]

Height information z(ξ,η) representing a concavo-convex shape on the surface of the work W in a three-dimensional manner is then calculated by a phase-height conversion process.

The height information z(ξ,η) is calculated according to a relational expression of [Math. 10] given below:

$$Z(\xi, \eta) = \frac{1}{2}\phi(\xi, \eta)\frac{\lambda}{2\pi}$$ [Math. 10]

The following describes the principle of a two-wavelength phase shift method using two different lights having different wavelengths. Using the two different lights having different wavelengths expands the measurement range. This principle is also applicable to the case of using three different lights or four different lights.

Measurement using two different lights having two different wavelengths (wavelengths $\lambda_1$ and $\lambda_2$) is equivalent to measurement using a light of a combined wavelength $\lambda_0$. Its measurement range is expanded to $\lambda_0/2$. The combined wavelength $\lambda_0$ is expressed by Equation (M1) given below:

$$\lambda_0 = (\lambda_1 \times \lambda_2)/(\lambda_2 - \lambda_1)$$ (M1)

where $\lambda_2 > \lambda_1$.

For example, when $\lambda_1 = 1500$ nm and $\lambda_2 = 1503$ nm, $\lambda_0 = 751.500$ μm according to Equation (M1) given above, and the measurement range is $\lambda_0/2 = 375.750$ μm.

In the two-wavelength phase shift method, a phase $\phi_1(\xi,\eta)$ of the measurement light of the first light at coordinates (ξ,η) on the surface of the work W is calculated (as shown by [Math. 8] given above), based on the luminances $I_1(x,y)$, $I_2(x,y)$, $I_3(x,y)$ and $I_4(x,y)$ of the four different interference fringe image data of the first light having the wavelength $\lambda_1$ (as shown by [Math. 1] given above).

In measurement with regard to the first light, height information z(ξ,η) at the coordinates (ξ,η) is expressed by Equation (M2) given below:

$$z(\xi, \eta) = d_1(\xi, \eta)/2$$ (M2)
$$= [\lambda_1 \times \phi_1(\xi, \eta)/4\pi] + [m_1(\xi, \eta) \times \lambda_1/2]$$

where $d_1(\xi,\eta)$ denotes an optical path difference between the measurement light and the reference light of the first light, and $m_1(\xi,\eta)$ denotes a fringe order of the first light.

The phase $\phi_1(\xi,\eta)$ is accordingly expressed by Equation (M2') given below:

$$\phi_1(\xi,\eta) = (4\pi/\lambda_1) \times z(\xi,\eta) \cdot 2\pi m_1(\xi,\eta)$$ (M2')

Similarly, a phase $\phi_2(\xi,\eta)$ of the measurement light of the second light at the coordinates (ξ,η) on the surface of the work W is calculated (as shown by [Math. 8] given above), based on the luminances $I_1(x,y)$, $I_2(x,y)$, $I_3(x,y)$ and $I_4(x,y)$ of the four different interference fringe image data of the second light having the wavelength $\lambda_2$ (as shown by [Math. 1] given above).

In measurement with regard to the second light, height information z(ξ,η) at the coordinates (ξ,η) is expressed by Equation (M3) given below:

$$z(\xi, \eta) = d_2(\xi, \eta)/2$$ (M3)
$$= [\lambda_2 \times \phi_2(\xi, \eta)/4\pi] + [m_2(\xi, \eta) \times \lambda_2/2]$$

where $d_2(\xi,\eta)$ denotes an optical path difference between the measurement light and the reference light of the second light, and $m_2(\xi,\eta)$ denotes a fringe order of the second light.

The phase $\phi_2(\xi,\eta)$ is accordingly expressed by Equation (M3') given below:

$$\phi_2(\xi,\eta) = (4\pi/\lambda_2) \times z(\xi,\eta) - 2\pi m_2(\xi,\eta)$$ (M3')

Subsequently the fringe order $m_1(\xi,\eta)$ of the first light having the wavelength $\lambda_1$ or the fringe order $m_2(\xi,\eta)$ of the second light having the wavelength $\lambda_2$ is determined. The fringe orders $m_1$ and $m_2$ may be determined, based on an optical path difference Δd and a wavelength difference Δλ of the two different lights (having the wavelengths $\lambda_1$ and $\lambda_2$). The optical path difference Δd and the wavelength difference Δλ are respectively expressed by Equations (M4) and (M5) given below:

$$\Delta d = (\lambda_1 \times \phi_1 - \lambda_2 \times \phi_2)/2\pi$$ (M4)

$$\Delta \lambda = \lambda_2 - \lambda_1$$ (M5)

where $\lambda_2 > \lambda_1$.

In the measurement range of the combined wavelength $\lambda_0$ of the two wavelengths, the relationship between the fringe orders $m_1$ and $m_2$ is classified into the following three cases. Different computation expressions are employed to determine the fringe orders $m_1(\xi,\eta)$ and $m_2(\xi,\eta)$ in the respective cases. The following describes a technique of determining, for example, the fringe order $m_1(\xi,\eta)$. A similar technique may be employed to determine the fringe order $m_2(\xi,\eta)$.

For example, in the case of "$\phi_1 - \phi_2 > -\pi$", "$m_1 - m_2 = -1$". In this case, $m_1$ is expressed by Equation (M6) given below:

$$m_1 = (\Delta d/\Delta \lambda) - (\lambda_2/\Delta \lambda)$$ (M6)
$$= (\lambda_1 \times \phi_1 - \lambda_2 \times \phi_2)/2\pi(\lambda_2 - \lambda_1) - \lambda_2/(\lambda_2 - \lambda_1)$$

In the case of "$-\pi > \phi_1 - \phi_2 > \pi$", "$m_1 - m_2 = 0$". In this case, $m_1$ is expressed by Equation (M7) given below:

$$m_1 = \Delta d / \Delta \lambda \qquad (M7)$$
$$= (\lambda_1 \times \phi_1 - \lambda_2 \times \phi_2) / 2\pi(\lambda_2 - \lambda_1)$$

In the case of "$\phi_1 - \phi_2 < \pi$", "$m_1 - m_2 = +1$". In this case, $m_1$ is expressed by Equation (M8) given below:

$$m_1 = (\Delta d / \Delta \lambda) - (\lambda_2 / \Delta \lambda) \qquad (M8)$$
$$= (\lambda_1 \times \phi_1 - \lambda_2 \times \phi_2) / 2\pi(\lambda_2 - \lambda_1) - \lambda_2 / (\lambda_2 - \lambda_1)$$

The height information $z(\xi,\eta)$ is obtained according to Equation (M2) or (M3) given above, based on the fringe order $m_1(\xi,\eta)$ or $m^2(\xi,\eta)$ thus obtained. The measurement results (height information) of the work W thus determined are stored in the calculation result storage device 55 of the control device 5.

As described above in detail, one or more embodiments are configured to cause the first light having the wavelength $\lambda_1$ to enter the first surface 20a of the polarizing beam splitter 20 and cause the second light having the wavelength $\lambda_2$ to enter the second surface 20b of the polarizing beam splitter 20. This respectively splits the reference light and the measurement light of the first light and the reference light and the measurement light of the second light into different polarized light components (P-polarized light and S-polarized light). The first light and the second light entering the polarizing beam splitter 20 accordingly do not interfere with each other but are separately emitted from the polarizing beam splitter 20. In other words, there is no need to separate the light emitted from the polarizing beam splitter 20 into the first light and the second light by means of a predetermined separation unit.

As a result, two different lights having wavelengths close to each other may be used as the first light and the second light. This further expands the measurement range in three-dimensional measurement. Additionally, this configuration enables imaging of the output light with regard to the first light to be performed simultaneously with imaging of the output light with regard to the second light. This accordingly shortens the total imaging time and enhances the measurement efficiency.

Moreover, one or more embodiments are configured to use two different lights for one interference optical system 3 including one reference surface 23 as the basis, so that the two different lights have an identical optical path interval which provides the optical path difference between the reference light and the measurement light. Compared with a configuration using two interference optical systems (interferometer modules), this configuration enhances the measurement accuracy and eliminates the need for a complicated operation to make the optical path lengths of the two interference optical systems exactly equal to each other.

Furthermore, one or more embodiments are configured to cause the output light of the first light that enters the first surface 20a of the polarizing beam splitter 20 to be output from the same position, i.e., from the first surface 20a and cause the output light of the second light that enters the second surface 20b of the polarizing beam splitter 20 to be output from the same position, i.e., from the second surface 20b.

This does not require any means for changing the polarizing direction of polarized light (for example, a quarter wave plate) to be provided inside of the interference optical system 3 and thereby simplifies the configuration.

The following describes one or more embodiments with reference to the drawings. The like components to those of the aforementioned embodiments are expressed by the like reference signs, and their detailed description is omitted. One or more embodiments differ from the aforementioned embodiments by the configuration involved in the first imaging system 4A and the second imaging system 4B.

According to one or more embodiments, the first imaging system 4A includes a spectral optical system 125 as the spectroscopic unit configured to split the combined light (reference light component and measurement light component) of the first light transmitted through the quarter wave plate 31A into four lights, and a filter unit 126 as the filter unit configured to allow for selective transmission of predetermined components of the four lights emitted from the spectral optical system 125, in place of the first polarizer 32A. The first imaging system 4A is configured to take images of the four lights transmitted through the filter unit 126 simultaneously by the first camera 33A.

Like the first imaging system 4A, the second imaging system 4B includes a spectral optical system 125 as the spectroscopic unit configured to split the combined light (reference light component and measurement light component) of the second light transmitted through the quarter wave plate 31B into four lights, and a filter unit 126 as the filter unit configured to allow for selective transmission of predetermined components of the four lights emitted from the spectral optical system 125, in place of the second polarizer 32B. The second imaging system 4B is configured to take images of the four lights transmitted through the filter unit 126 simultaneously by the second camera 33B.

The spectral optical system 125 and the filter unit 126 used in the first imaging system 4A and those used in the second imaging system 4B according to one or more embodiments have identical configurations. The following accordingly describes the second imaging system 4B as an example with reference to FIG. 5.

According to one or more embodiments, the optical axis direction of the second camera 33B is set parallel to the incident direction (traveling direction) of combined light L0 of the second light entering the second imaging system 4B. In other words, according to one or more embodiments, the optical axis direction of the second camera 33B is set along the Z-axis direction that is the incident direction of the combined light L0 of the first light.

The spectral optical system 125 is configured as one optical member integrated by combining four non-polarizing-type optical members (prisms).

More specifically, the spectral optical system 125 is configured by arranging a first prism 131, a second prism 132, a third prism 133 and a fourth prism 134 sequentially from the side near to the interference optical system 3 along the traveling direction (leftward in the Z-axis direction) of the combined light L0, which enters from the second non-polarizing beam splitter 13B.

Each of the above prisms 131 to 134 is made of an optical material (for example, glass or acrylic resin) having a predetermined refractive index higher than the refractive index of the air. The optical path length of light that travels in each of the prisms 131 to 134 is thus optically longer than the optical path length of light that travels in the air. For example, all the four prisms 131 to 134 may be made of an identical material, or at least one of the prisms 131 to 134 may be made of a different material. The material of each of the prisms 131 to 134 may be selected arbitrarily as long as the material satisfies the functions of the spectral optical system 125 described later.

The first prism 131 is a quadrangular prism that has a parallelogram shape in the front view (Z-Y plane) and that is extended along the X-axis direction. Hereinafter the "first prism 131" is called "first rhombic prism 131".

The first rhombic prism 131 is arranged such that, out of its rectangular four surfaces along the X-axis direction, a surface 131a located on the right side in the Z-axis direction that is the interference optical system 3-side (hereinafter called "incident surface 131a) and a surface 131b located on the left side in the Z-axis direction (hereinafter called "emission surface 131b") are respectively orthogonal to the Z-axis direction and such that a surface 131c located on the lower side in the Y-axis direction and a surface 131d located on the upper side in the Y-axis direction are respectively inclined at 45 degrees to both the Z-axis direction and the Y-axis direction.

A non-polarizing half mirror 141 is provided on the surface 131c located on the lower side in the Y-axis direction out of the two inclined surfaces 131c and 131d, and a non-polarizing total reflection mirror 142 configured to total reflect inward is provided on the surface 131d located on the upper side in the Y-axis direction. Hereinafter the surface 131c provided with the half mirror 141 is called "splitting surface 131c", and the surface 131d provided with the total reflection mirror 142 is called "reflecting surface 131d".

Figure 5:
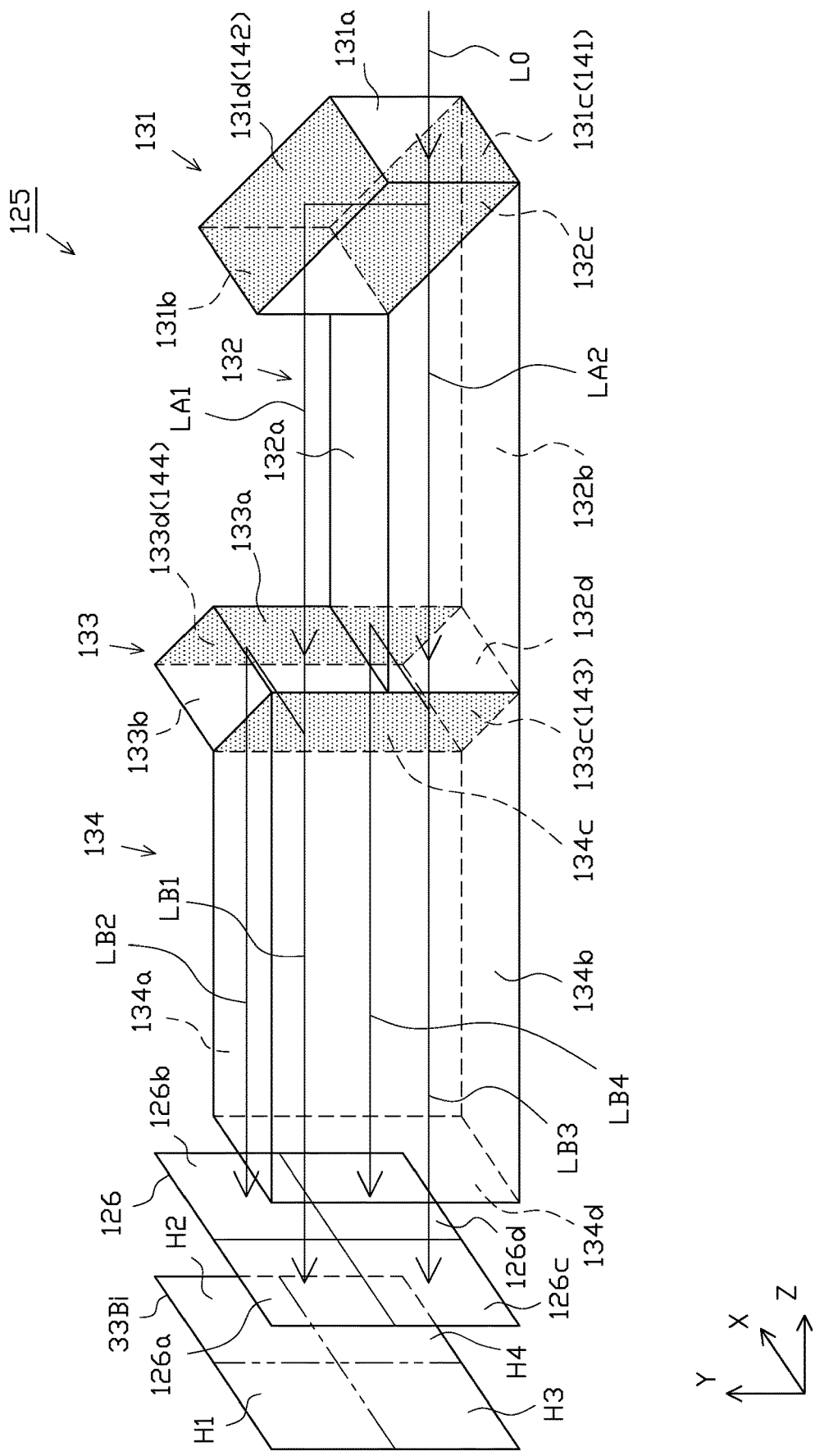
FIG. 5 is a schematic configuration diagram illustrating a spectral optical system and the like according to one or more embodiments.

As a matter of convenience, the regions corresponding to the splitting surface 131c (half mirror 141) and the reflecting surface 131d (total reflection mirror 142) are shown by dotted patterns in FIG. 5.

The second prism 132 is a quadrangular prism that has a trapezoidal shape in the front view (Z-Y plane) and that is extended along the X-axis direction. Hereinafter the "second prism 132" is called "first trapezoidal prism 132".

The first trapezoidal prism 132 is arranged such that, out of its four rectangular surfaces along the X-axis direction, a surface 132a located on the upper side in the Y-axis direction and a surface 132b located on the lower side in the Y-axis direction are respectively orthogonal to the Y-axis direction, such that a surface 132c located on the right side in the Z-axis direction is inclined at 45 degrees to both the Z-axis direction and the Y-axis direction, and such that a surface 132d located on the left side in the Z-axis direction is orthogonal to the Z-axis direction.

The surface 132c located on the right side in the Z-axis direction is placed in close contact with the splitting surface 131c (half mirror 141) of the first rhombic prism 131. Hereinafter the surface 132c located on the right side in the Z-axis direction is called "incident surface 132c", and the surface 132d located on the left side in the Z-axis direction is called "emission surface 132d".

The third prism 133 is a quadrangular prism that has a parallelogram shape in the front view (X-Z plane) and that is extended along the Y-axis direction. Hereinafter the "third prism 133" is called "second rhombic prism 133".

The second rhombic prism 133 is arranged such that, out of its four rectangular surfaces along the Y-axis direction, a surface 133a located on the right side in the Z-axis direction and a surface 133b located on the left side in the Z-axis direction are respectively orthogonal to the Z-axis direction and such that a surface 133c located on the front side in the X-axis direction and a surface 133d located on the back side in the X-axis direction are respectively inclined at 45 degrees to both the Z-axis direction and the X-axis direction.

A non-polarizing half mirror 143 is provided on the surface 133c located on the front side in the X-axis direction out of the two inclined surfaces 133c and 133d, and a non-polarizing total reflection mirror 144 configured to total reflect inward is provided on the surface 133d located on the back side in the X-axis direction. Hereinafter the surface 133c provided with the half mirror 143 is called "splitting surface 133c", and the surface 133d provided with the total reflection mirror 144 is called "reflecting surface 133d".

As a matter of convenience, the regions corresponding to the splitting surface 133c (half mirror 143) and the reflecting surface 133d (total reflection mirror 144) are shown by dotted patterns in FIG. 5.

A lower half in the Y-axis direction of the surface 133a located on the right side in the Z-axis direction of the second rhombic prism 133 is placed in close contact with the emission surface 132d of the first trapezoidal prism 132, and an upper half in the Y-axis direction is opposed to the emission surface 131b of the first rhombic prism 131. Hereinafter the surface 133a located on the right side in the Z-axis direction is called "incident surface 133a", and the surface 133b located on the left side in the Z-axis direction is called "emission surface 133b".

The fourth prism 134 is a quadrangular prism that has a trapezoidal shape in the front view (X-Z plane) and that is extended along the Y-axis direction. Hereinafter the "fourth prism 134" is called "second trapezoidal prism 134".

The second trapezoidal prism 134 is arranged such that, out of its four rectangular surfaces along the Y-axis direction, a surface 134a located on the back side in the X-axis direction and a surface 134b located on the front side in the X-axis direction are respectively orthogonal to the X-axis direction, such that a surface 134c located on the right side in the Z-axis direction is inclined at 45 degrees to both the Z-axis direction and the X-axis direction, and such that a surface 134d located on the left side in the Z-axis direction is orthogonal to the Z-axis direction.

The surface 134c located on the right side in the Z-axis direction is placed in close contact with the splitting surface 133c (half mirror 143) of the second rhombic prism 133. Hereinafter the surface 134c located on the right side in the Z-axis direction is called "incident surface 134c", and the surface 134d located on the left side in the Z-axis direction is called "emission surface 134d".

The emission surface 133b of the second rhombic prism 133 and the emission surface 134d of the second trapezoidal prism 134 are arranged to be respectively opposed to the filter unit 126.

The functions of the spectral optical system 125 are described in detail below with reference to FIG. 5. Combined light L0 transmitted through a quarter wave plate 31B enters the incident surface 131a of the first rhombic prism 131.

The combined light L0 entering the incident surface 131a is split in two different directions by the splitting surface 131c (half mirror 141). More specifically, the combined light L0 is split into a split light LA1 that is reflected upward in the Y-axis direction and a spit light LA2 that is transmitted through the half mirror 141 along the Z-axis direction.

The split light LA1 reflected by the half mirror 141 travels along the Y-axis direction in the first rhombic prism 131, is reflected leftward in the Z-axis direction by the reflecting surface 131d (total reflection mirror 142) and is emitted from the emission surface 131b. The split light LA1 emitted from the emission surface 131a travels in the air along the Z-axis direction and enters the incident surface 133a of the second rhombic prism 133.

The split light LA2 transmitted through the half mirror 141, on the other hand, enters the incident surface 132c of the first trapezoidal prism 132, travels along the Z-axis direction in the first trapezoidal prism 132 and is emitted from the emission surface 132d. The split light LA2 emitted from the emission surface 132d enters the incident surface 133a of the second rhombic prism 133.

According to one or more embodiments, the refractive indexes and the lengths (length in the Z-axis direction or length in the Y-axis direction) of the first rhombic prism 131 and the first trapezoidal prism 132 are set arbitrarily, such that the optical path lengths of both the split lights LA1 and LA2 from the splitting surface 131c of the first rhombic prism 131 to the incident surface 133a of the second rhombic prism 133 are optically identical with each other.

Each of the split lights LA1 and LA2 entering the incident surface 133a of the second rhombic prism 133 is split in two different directions by the splitting surface 133c (half mirror 143). More specifically, one split light LA1 is split into a split light LB1 that is transmitted through the half mirror 143 along the Z-axis direction and a split light LB2 that is reflected backward in the X-axis direction. The other split light LA2 is split into a split light LB3 that is transmitted through the half mirror 143 along the Z-axis direction and a split light LB4 that is reflected backward in the X-axis direction.

The split lights LB2 and LB4 reflected by the half mirror 143 respectively travel along the X-axis direction in the second rhombic prism 133, are reflected leftward in the Z-axis direction by the reflecting surface 133d (total reflection mirror 144) and are emitted from the emission surface 133b. The split lights LB2 and LB4 emitted from the emission surface 133a respectively travel in the air along the Z-axis direction and enter the filter unit 126.

The split lights LB1 and LB3 transmitted through the half mirror 143, on the other hand, enter the incident surface 134c of the second trapezoidal prism 134, travel along the Z-axis direction in the second trapezoidal prism 134 and are emitted from the emission surface 134d. The split lights LB1 and LB3 emitted from the emission surface 134d respectively enter the filter unit 126.

According to one or more embodiments, the refractive indexes and the lengths (length in the Z-axis direction or length in the X-axis direction) of the second rhombic prism 133 and the second trapezoidal prism 134 are set arbitrarily, such that the optical path lengths of the four split lights LB1 to LB4 from the splitting surface 133c of the second rhombic prism 133 to the filter unit 126 are optically identical with each other.

Figure 6:
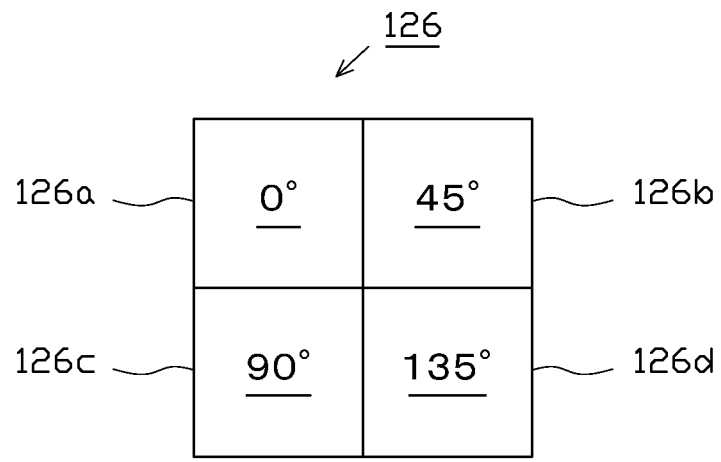
FIG. 6 is a schematic configuration diagram illustrating a filter unit according to one or more embodiments.

The filter unit 126 includes four polarizers 126a, 126b, 126c and 126d that are formed in identical rectangular shapes in the plan view of the X-Y plane and that are arranged in two by two matrix along the X-Y plane (as shown in FIG. 6). FIG. 6 is a plan view illustrating the schematic configuration of the filter unit 126.

The four polarizers 126a to 126d are polarizers respectively having transmission axis directions relative to the Y-axis direction that differ by 45 degrees each. More specifically, the filter unit 126 includes the first polarizer 126a having the transmission axis direction of 0 degree, the second polarizer 126b having the transmission axis direction of 45 degrees, the third polarizer 126c having the transmission axis direction of 90 degrees, and the fourth polarizer 126d having the transmission axis direction of 135 degrees.

The respective polarizers 126a to 126d are arranged such that the four split lights LB1 to LB4 emitted from the spectral optical system 125 enter the respective polarizers 126a to 126d. More specifically, the split light LB1 enters the first polarizer 126a, the split light LB2 enters the second polarizer 126b, the split light LB3 enters the third polarizer 126c, and the split light LB4 enters the fourth polarizer 126d.

The four split lights LB1 to LB4 transmitted through the filter unit 126 are accordingly provided as interfering lights having phases that differ by 90 degrees each. More specifically, the split light LB1 transmitted through the first polarizer 126a is provided as interfering light having the phase of "0 degree"; the split light LB2 transmitted through the second polarizer 126b is provided as interfering light having the phase of "90 degrees"; the split light LB3 transmitted through the third polarizer 126c is provided as interfering light having the phase of "180 degrees"; and the split light LB4 transmitted through the fourth polarizer 126d is provided as interfering light having the phase of "270 degrees". Accordingly, the filter unit 126 is configured as the interfering unit according to one or more embodiments.

Figure 7:
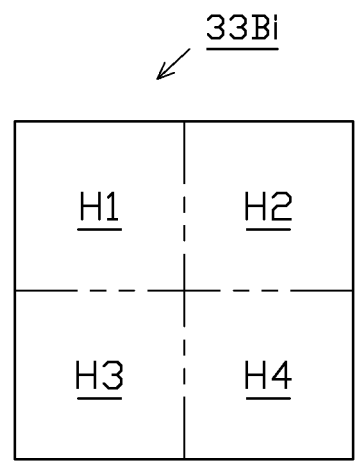
FIG. 7 is a schematic configuration diagram illustrating imaging areas of an imaging element according to one or more embodiments.

An imaging region of an imaging element 33Bi of the second camera 33B according to one or more embodiments is divided into four imaging areas H1, H2, H3 and H4 corresponding to the filter unit 126 (polarizers 126a to 126d). More specifically, the imaging region is divided into four imaging areas H1, H2, H3 and H4 that are in identical rectangular shapes in the plan view of the X-Y plane and are arranged in two by two matrix along the X-Y plane (as shown in FIG. 7). FIG. 7 is a plan view illustrating the schematic configuration of the imaging region of the imaging element 33Bi.

Accordingly, an image of the split light LB1 transmitted through the first polarizer 126a is taken in the first imaging area H1; an image of the split light LB2 transmitted through the second polarizer 126b is taken in the second imaging area 112; an image of the split light LB3 transmitted through the third polarizer 126c is taken in the third imaging area H3; and an image of the split light LB4 transmitted through the fourth polarizer 126d is taken in the fourth imaging area H4.

More specifically, an interference fringe image having the phase of "0 degree" is taken in the first imaging area H1; an interference fringe image having the phase of "90 degrees" is taken in the second imaging area H2; an interference fringe image having the phase of "180 degrees" is taken in the third imaging area H3; and an interference fringe image having the phase of "270 degrees" is taken in the fourth imaging area H4.

Additionally, the image data storage device 54 according to one or more embodiments includes a first image memory configured to store interference fringe image data taken and obtained in the first imaging area H1 of the imaging element 33Bi of the second camera 33B, a second image memory configured to store interference fringe image data taken and obtained in the second imaging area H2, a third image memory configured to store interference fringe image data taken and obtained in the third imaging area H3 and a fourth image memory configured to store interference fringe image data taken and obtained in the fourth imaging area H4.

The following describes the details of a procedure of shape measurement process performed according to one or more embodiments. When the combined light L0 that is output light with regard to the second light enters from the interference optical system 3 into the second imaging system 4B, the combined light L0 travels through the quarter wave plate 31B and is split into the four split lights LB1 to LB4 by the spectral optical system 125.

The images of these four split lights LB1, LB2, LB3 and LB4 are simultaneously taken by the second camera 33B (imaging element 33Bi) respectively via the first polarizer 126a, the second polarizer 126b, the third polarizer 126c and the fourth polarizer 126d.

The second camera 33B outputs the four interference fringe images (four split lights LB1 to LB4) simultaneously taken and obtained in the imaging areas H1 to H4 of the imaging element 33Bi as one image data to the control device 5.

The control device 5 divides the input image data into four interference fringe image data (into ranges corresponding to the imaging areas H1 to H4 of the imaging element 33Bi) and respectively stores the four interference fringe image data into the first to fourth image memories included in the image data storage device 54.

The control device 5 subsequently measures the surface shape of the work W by the phase shift method described above, based on the four interference fringe image data of the first light stored in the first to the fourth image memories with regard to the first camera 33A and the four interference fringe image data of the second light stored in first to fourth image memories with regard to the second camera 33B. This accordingly calculates height information at the respective positions on the surface of the work W.

As described above in detail, in addition to the functions and the advantageous effects described above, one or more embodiments are configured to split the combined light L0 entering from the interference optical system 3 into the four lights LB1 to LB4 arrayed in the matrix and simultaneously take the images of these four lights LB1 to LB4 via the filter unit 126 (four polarizers 126a to 126d) with a single imaging element. The configuration of one or more embodiments subsequently measures the shape of the work W by the phase shift method, based on the respective four interference fringe images taken and obtained by the respective cameras 33A and 33B. As a result, this configuration enhances the measurement accuracy, shortens the measurement time and suppresses size expansion of the device.

Additionally, according to one or more embodiments, the imaging areas H1 to H4 set by dividing the imaging region of the imaging element into a matrix of four equal areas are respectively allocated to the four lights LB1 to LB4. This configuration allows for effective use of the imaging region of the imaging element, compared with, for example, a three-light splitting technique. This accordingly further enhances the measurement accuracy. For example, when an imaging region of a standard imaging element having an aspect ratio of 4 to 3 and is divided into four equal areas, the respective divisional areas have the same aspect ratio of 4 to 3. This makes a wider range in each divisional area usable and thereby further enhances the measurement accuracy.

Using diffraction grating as the spectroscopic unit is likely to reduce the resolution. One or more embodiments, however, employ the spectral optical system 125 configured to split one light L0 into two parallel lights LA1 and LA2 and further split each of the two lights LA1 and LA2 into two parallel lights, so as to provide four parallel lights LB1, LB2, LB3 and LB4. This configuration suppresses reduction of the resolution.

Furthermore, in the spectral optical system 125 according to one or more embodiments, the optical path adjuster configured to adjust the optical path length of one light that travels straight and passes through the rhombic prisms 131 and 133 and the optical path length of the other light that is bent like a crank and passes through the rhombic prisms 131 and 133 (make these optical path lengths optically identical with each other) is implemented by such a relatively simple configuration that the first trapezoidal prisms 132 and 134 are placed on the optical path of one light that travels straight and passes through the rhombic prisms 131 and 133. This achieves simplified configuration.

According to one or more embodiments, the filter unit 126 is comprised of the first polarizer 126a having the transmission angle direction of 0 degree, the second polarizer 126b having the transmission angle direction of 45 degrees, the third polarizer 126c having the transmission angle direction of 90 degrees and the fourth polarizer 126d having the transmission angle direction of 135 degrees. This configuration enables the four interference fringe images having the phases that differ by 90 degrees each to be obtained by one single imaging using one imaging element. As a result, this configuration ensures measurement of the higher accuracy, compared with a configuration of measuring the shape by the phase shift method based on three interference fringe images.

Figure 8:
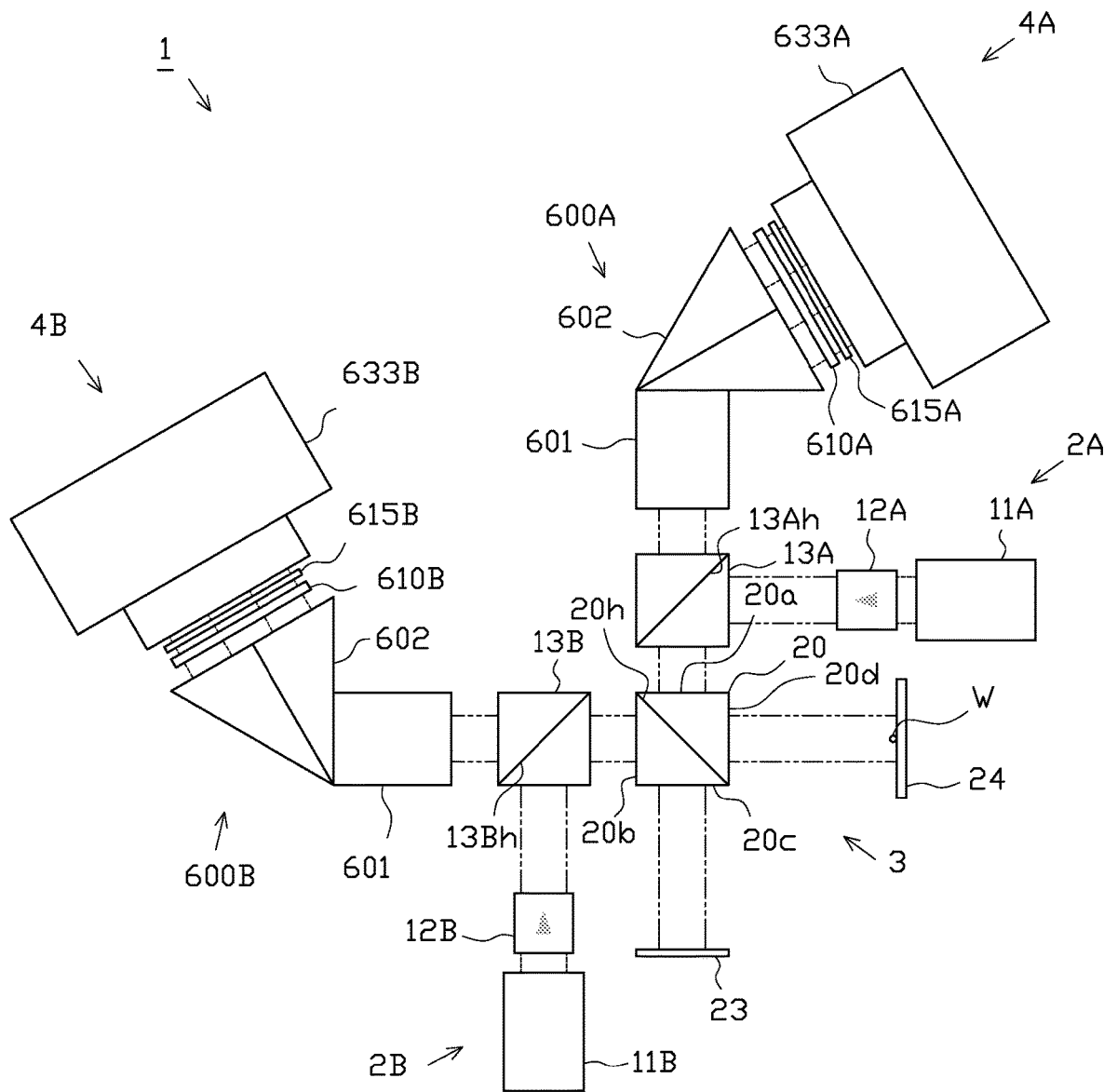
FIG. 8 is a schematic configuration diagram illustrating a three-dimensional measurement device according to one or more embodiments.

The following describes one or more embodiments with reference to the drawings. FIG. 8 is a diagram illustrating the schematic configuration of a three-dimensional measurement device according to one or more embodiments.

One or more embodiments include spectral optical systems different from those of the aforementioned embodiments and have a different configuration involved in the first imaging system 4A and the second imaging system 4B from that of the aforementioned embodiments that employ the optical configuration of the Michelson interferometer. Different components from those of the aforementioned embodiments are described in detail in one or more embodiments. The like components are expressed by the like reference signs, and their detailed description is omitted.

The first imaging system 4A according to one or more embodiments includes a spectral optical system 600A configured as the spectroscopic unit to split the combined light (reference light component and measurement light component) of the first light transmitted through the first non-polarizing beam splitter 13A into four split lights, a quarter wave plate 610A configured to convert each of the four split lights split by the spectral optical system 600A into circularly polarized light, a filter unit 615A configured to selectively transmit predetermined components of the four split lights transmitted through the quarter wave plate 610A, and a camera 633A configured to simultaneously take images of the four split lights transmitted through the filter unit 615A.

The second imaging system 4B according to one or more embodiments includes a spectral optical system 600B configured as the spectroscopic unit to split the combined light (reference light component and measurement light component) of the second light transmitted through the second non-polarizing beam splitter 13B into four split lights, a quarter wave plate 610B configured to convert each of the four split lights split by the spectral optical system 600B into circularly polarized light, a filter unit 615B configured to selectively transmit predetermined components of the four split lights transmitted through the quarter wave plate 610B, and a camera 633B configured to simultaneously take images of the four split lights transmitted through the filter unit 615B.

The "quarter wave plate 610A" and the "quarter wave plate 610B" have similar configurations to those of the "quarter wave plate 31A" and the "quarter wave plate 31B" of the aforementioned embodiments, and their detailed description is omitted. A modified configuration may include quarter wave plates provided individually corresponding to the four split lights.

The "filter unit 615A" and the "filter unit 615B" are configured as the filter unit and the interfering unit of one or more embodiments. The "filter unit 615A" and the "filter unit 615B" have similar configurations to that of the "filter unit 126" of the aforementioned embodiments, and their detailed description is omitted. A modified configuration may include four polarizers (polarizers 126a, 126b, 126c and 126d) that have different transmission axis directions by 45 degrees each and that are provided individually corresponding to the four split lights.

The configuration involved in the "camera 633A", the "camera 633B", the control process with regard to these cameras, the image data storage device 54 and the like is similar to the configuration involved in the "first camera 33A", the "second camera 633B (imaging element 33Bi)" and the like of the aforementioned embodiments, and their detailed description is omitted.

The following describes the configurations of the spectral optical system 600A and the spectral optical system 600B in detail with reference to FIGS. 9 to 12. According to one or more embodiments, the spectral optical system 600A and the spectral optical system 600B have identical configurations.

Figure 9:
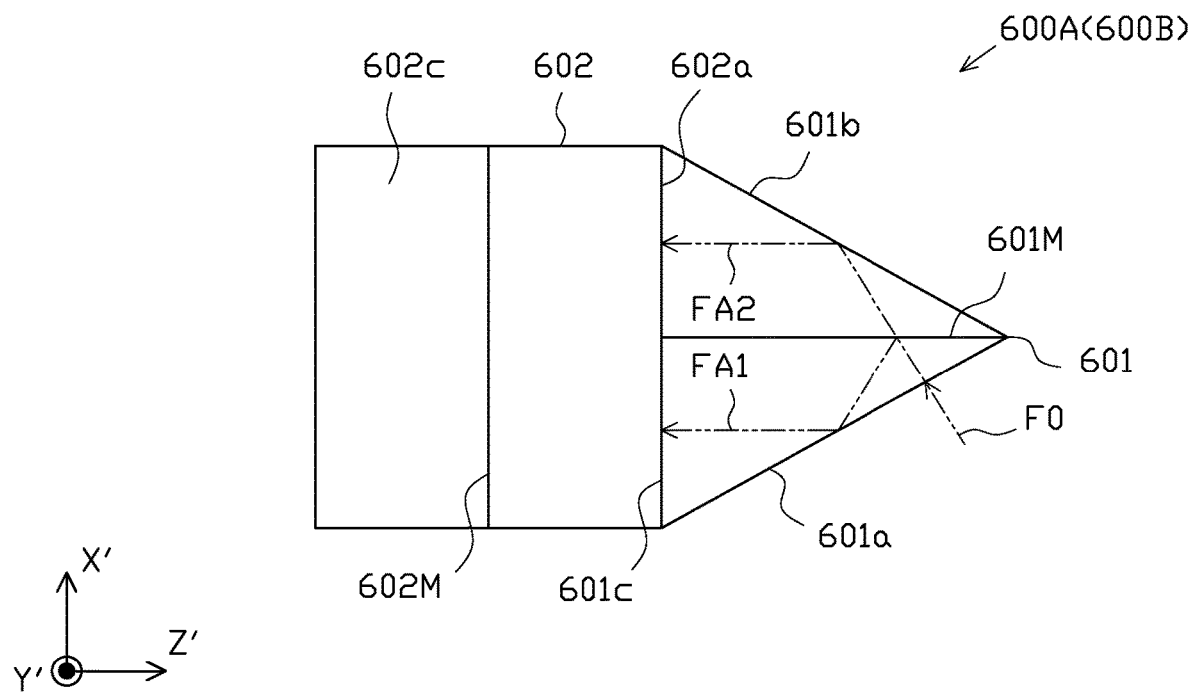
FIG. 9 is a plan view illustrating a spectral optical system according to one or more embodiments.
Figure 15:
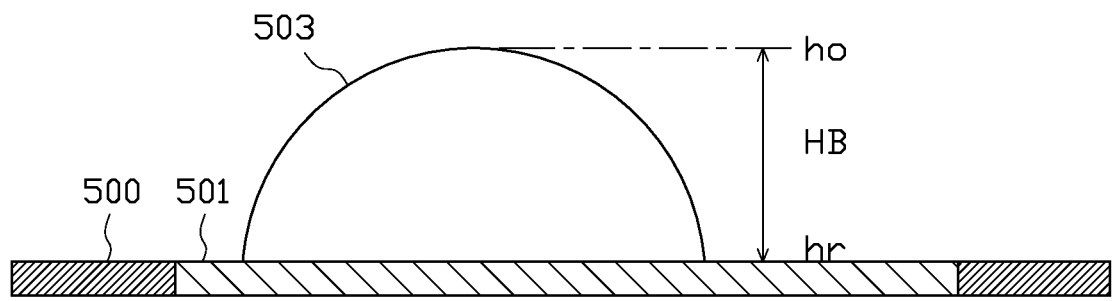
FIG. 15 is a diagram illustrating the principle of height measurement of a solder bump according to one or more embodiments.

In the following description of the spectral optical system 600A (600B) with reference to FIGS. 9 to 12, as a matter of convenience, a top-bottom direction of the sheet surface of FIG. 9 is called "X'-axis direction", a front-back direction of the sheet surface of FIG. 9 is called "Y'-axis direction" and a left-right direction of the sheet surface of FIG. 15 is called "Z'-axis direction". The coordinate system (X', Y', Z') used for describing the spectral optical system 600A (600B) alone is, however, a different coordinate system from the coordinate system (X, Y, Z) used for describing the entire three-dimensional measurement device 1.

The spectral optical system 600A (600B) is one non-polarizing optical member configured by joining two non-polarizing optical members (prisms) together to be integrated.

More specifically, the spectral optical system 600A (600B) includes a first prism 601 configured to split the combined light of the first light (the combined light of the second light) transmitted through the first non-polarizing beam splitter 13A (through the second non-polarizing beam splitter 13B) into two split lights, and a second prism 602 configured to further split each of the two split lights split by the first prism 601 into two split lights and emit a total of four split lights.

The first prism 601 and the second prism 602 are respectively configured by known optical members called Koester prisms. According to one or more embodiments, the "Koester prism" denotes an "optical member of an equilateral triangular prism having an equilateral triangular sectional shape that is configured by joining a pair of optical members (triangular prisms) having a right triangular sectional shape with inner angles of 30 degrees, 60 degrees and 90 degrees, together to be integrated and that is provided with a non-polarizing half mirror on its joint surface". The Koester prism used for the respective prisms 601 and 602 is, however, not limited to these embodiments. Any optical member (Koester prism) that satisfies the functions of the spectral optical system 600A (600B) described later and that is different from that of one or more embodiments, for example, an optical member of non-equilateral triangular prism, may be employed for the respective prisms 601 and 602.

More specifically, the first prism 601 as the first optical member (first Koester prism) is an equilateral triangular prism that is in an equilateral triangular shape in the plan view (X'-Z' plane) and that is extended along the Y'-axis direction (as shown in FIG. 9). The "X'-Z' plane" of one or more embodiments corresponds to the "first plane".

The first prism 601 has three rectangular surfaces along the Y'-axis direction (first surface 601a, second surface 601b and third surface 601c) and is provided with a half mirror 601M formed along a plane that goes through a line of intersection between the first surface 601a and the second surface 601b and is perpendicular to the third surface 601c. The "half mirror 601M" is configured as the "first splitting unit" according to one or more embodiments.

The first prism 601 is arranged such that the third surface 601c is extended along an X'-Y' plane and is perpendicular to the Z'-axis direction and that the half mirror 601M is extended along a Y'-Z' plane and is perpendicular to the X'-axis direction. Accordingly, the first surface 601a and the second surface 601b are respectively arranged to be inclined at 30 degrees or at 60 degrees to the X'-axis direction and the Z'-axis direction.

Figure 10:
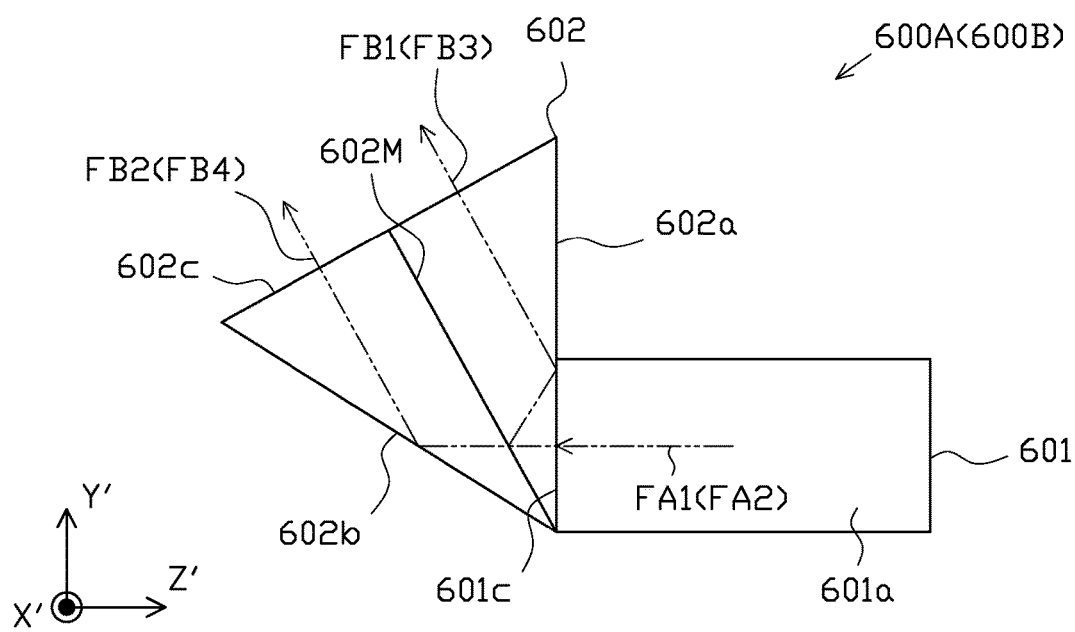
FIG. 10 is a front view illustrating the spectral optical system according to one or more embodiments.

The second prism 602 as the second optical member (second Koester prism) is, on the other hand, an equilateral triangular prism that is in an equilateral triangular shape in the front view (Y'-Z' plane) and that is extended along the X'-axis direction (as shown in FIG. 10). The "Y'-Z' plane" of one or more embodiments corresponds to the "second plane".

The second prism 602 has three rectangular surfaces along the X'-axis direction (first surface 602a, second surface 602b and third surface 602c) and is provided with a half mirror 602M formed along a plane that goes through a line of intersection between the first surface 602a and the second surface 602b and is perpendicular to the third surface 602c. The "half mirror 602M" is configured as the "second splitting unit" according to one or more embodiments.

The second prism 602 is arranged such that the first surface 602a is extended along the X'-Y' plane and is perpendicular to the Z'-axis direction. Accordingly, the second surface 602b, the third surface 602c and the half mirror 602M are respectively arranged to be inclined at 30 degrees or at 60 degrees to the Y'-axis direction and the Z'-axis direction.

The third surface 601c of the first prism 601 and the first surface 602a of the second prism 602 are joined with each other. More specifically, the first prism 601 and the second prism 602 are joined with each other in a direction such that the plane including the half mirror 601M (Y'-Z' plane) is perpendicular to the plane including the half mirror 602M.

Figure 11:
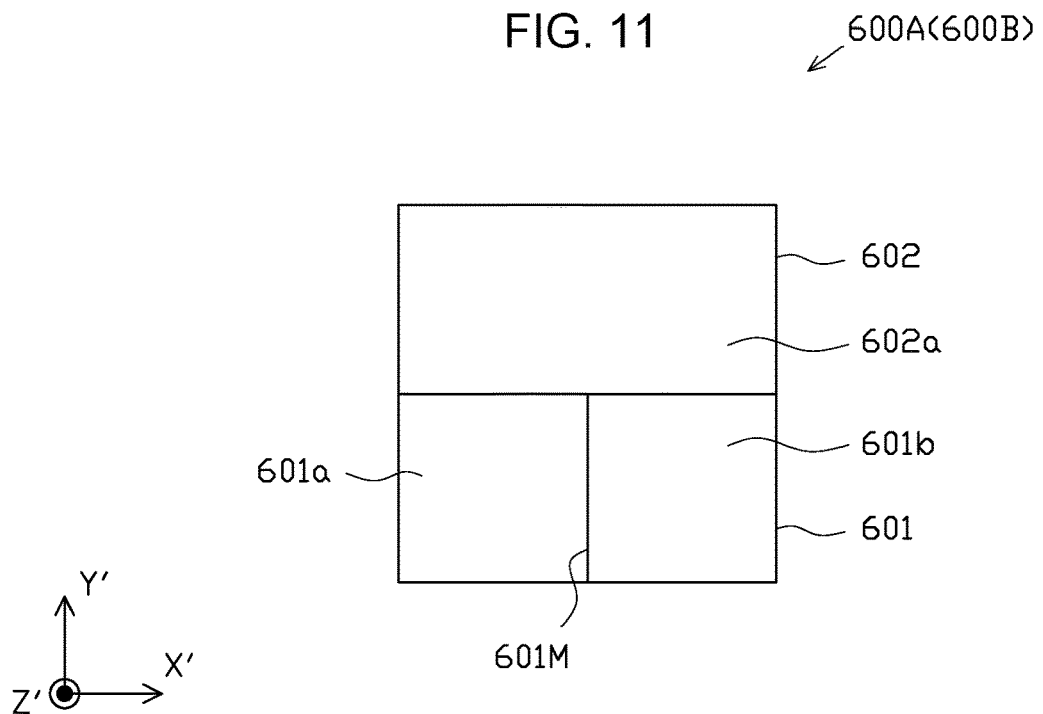
FIG. 11 is a right side view illustrating the spectral optical system according to one or more embodiments.
Figure 12:
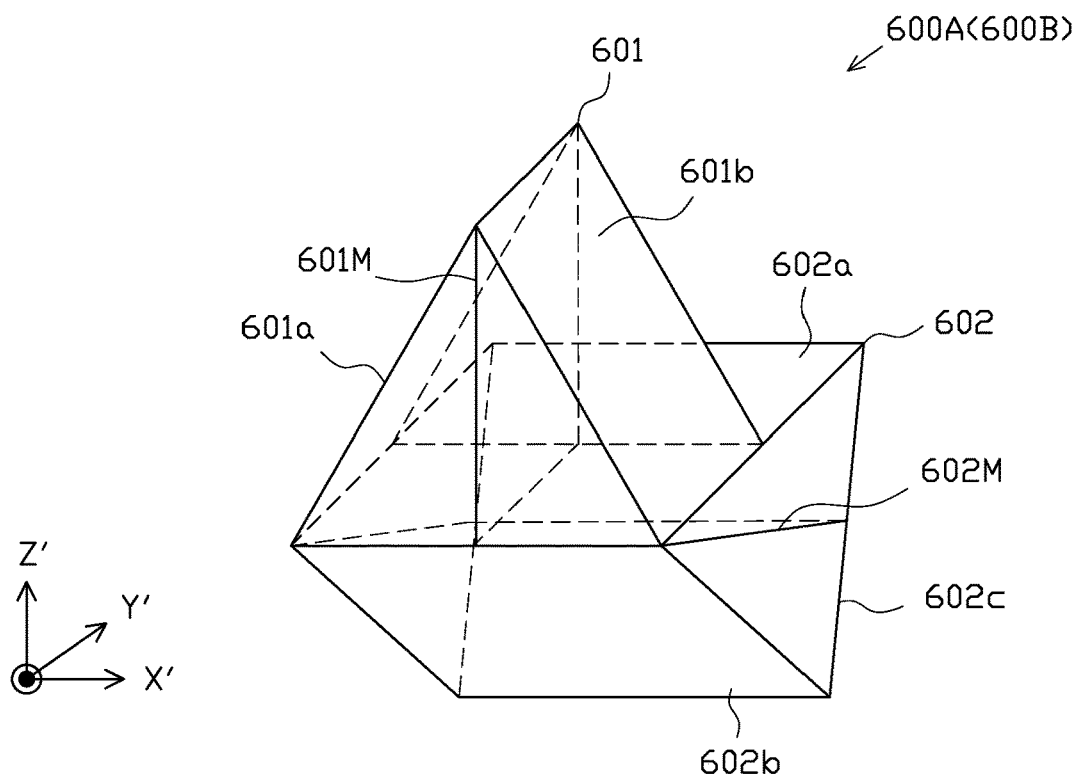
FIG. 12 is a perspective view illustrating the spectral optical system according to one or more embodiments.

The length in the X'-axis direction of the third surface 601c of the first prism 601 is equal to the length in the X'-axis direction of the first surface 602a of the second prism 602 (as shown in FIG. 9). The length in the Y'-axis direction of the third surface 601c of the first prism 601 is, on the other hand, half the length in the Y'-axis direction of the first surface 602a of the second prism 602 (as shown in FIGS. 10 and 11). The third surface 601c of the first prism 601 is joined along a line of intersection between the first surface 602a and the second surface 602b of the second prism 602 (as shown in, for example, FIG. 12).

Each of the prisms 601 and 602 is made of an optical material (for example, glass or acrylic resin) having a predetermined refractive index higher than the refractive index of the air. These prisms 601 and 602 may be made of an identical material or made of different materials. The material of each of the prisms 601 and 602 may be selected arbitrarily as long as the material satisfies the functions of the spectral optical system 600A (600B) described later.

The following describes the functions of the spectral optical system 600A and the spectral optical system 600B in detail with reference to the drawings. As described above, the spectral optical system 600A and the spectral optical system 600B respectively used in the first imaging system 4A and in the second imaging system 4B have identical configurations. Accordingly the following describes the spectral optical system 600A of the first imaging system 4A as an example, with omission of description on the spectral optical system 600B of the second imaging system 4B.

The spectral optical system 600A is arranged such that combined light F0 of the first light transmitted through the first non-polarizing beam splitter 13A vertically enters the first surface 601a of the first prism 601 (as shown in FIGS. 8 and 9). For the simplicity of illustration, however, the first imaging system 4A is illustrated in FIG. 8 in such a manner that the front surface of the spectral optical system 600A faces the front side.

The combined light F0 entering the first prism 601 through the first surface 601a is split in two different directions by the half mirror 601M. More specifically, the combined light F0 is split into a split light FA1 that is reflected by the half mirror 601M toward the first surface 601a and a split light FA2 that is transmitted through the half mirror 601M toward the second surface 601b.

The split light FA1 reflected by the half mirror 601M is totally reflected at the first surface 601a toward the third surface 601c and is emitted vertically from the third surface 601c. The split light FA2 transmitted through the half mirror 601M is, on the other hand, totally reflected at the second surface 601b toward the third surface 601c and is emitted vertically from the third surface 601c. The two parallel split lights FA1 and FA2 are accordingly emitted from the third surface 601c of the first prism 601.

The respective split lights FA1 and FA2 emitted from the third surface 601c of the first prism 601 vertically enter the first surface 602a of the second prism 602 (as shown in FIG. 10).

Each of the split lights FA1 and FA2 entering the second prism 602 through the first surface 602a is split in two different directions by the half mirror 602M.

More specifically, one split light FA1 is split into a split light FB1 that is reflected by the half mirror 602M toward the first surface 602a and a split light FB2 that is transmitted through the half mirror 602M toward the second surface 602b.

The other split light FA2 is split into a split light FB3 that is reflected by the half mirror 602M toward the first surface 602a and a split light FB4 that is transmitted through the half mirror 602M toward the second surface 602b.

The respective split lights FB1 and FB3 reflected by the half mirror 602M are totally reflected at the first surface 602a toward the third surface 602c and are emitted vertically from the third surface 602c. The respective split lights FB2 and FB4 transmitted through the half mirror 602M are, on the other hand, totally reflected at the second surface 602b toward the third surface 602c and are emitted vertically from the third surface 602c. The four lights FB1 to FB4 arrayed in two by two matrix are accordingly emitted in parallel from the third surface 602c of the second prism 602.

The four split lights FB1 to FB4 emitted from the spectral optical system 600A (from the third surface 602c of the second prism 602) are respectively converted into circularly polarized lights by the quarter wave plate 610A and enter the respective polarizers 126a to 126d arranged in matrix in the filter unit 615A.

The four split lights FB1 to FB4 transmitted through the filter unit 615A form interfering lights having phases that differ by 90 degrees each. The images of these four split lights FB1 to FB4 are simultaneously taken by the imaging element of the camera 633A. This results in obtaining four interference fringe images having phases that differ by 90 degrees each.

One or more embodiments described above in detail have similar functions and advantageous effects described above.

Additionally, one or more embodiments employ the prisms 601 and 602 that are Koester prisms as the means for splitting one light into two parallel lights in the spectral optical systems 600A and 600B, so that the two split lights have optically identical optical path lengths. As a result, there is no need to provide the optical path adjuster to adjust the optical path lengths of the two split lights, unlike the aforementioned embodiments. This configuration reduces the total number of components and achieves, for example, simplified configuration and downsizing of the device.

The light travels only in the optical members and is not exposed to the air until one light F0 entering the spectral optical system 600A or 600B is emitted as four split lights FB1 to FB4. This configuration reduces the effect of, for example, fluctuation of the air.

Figure 13:
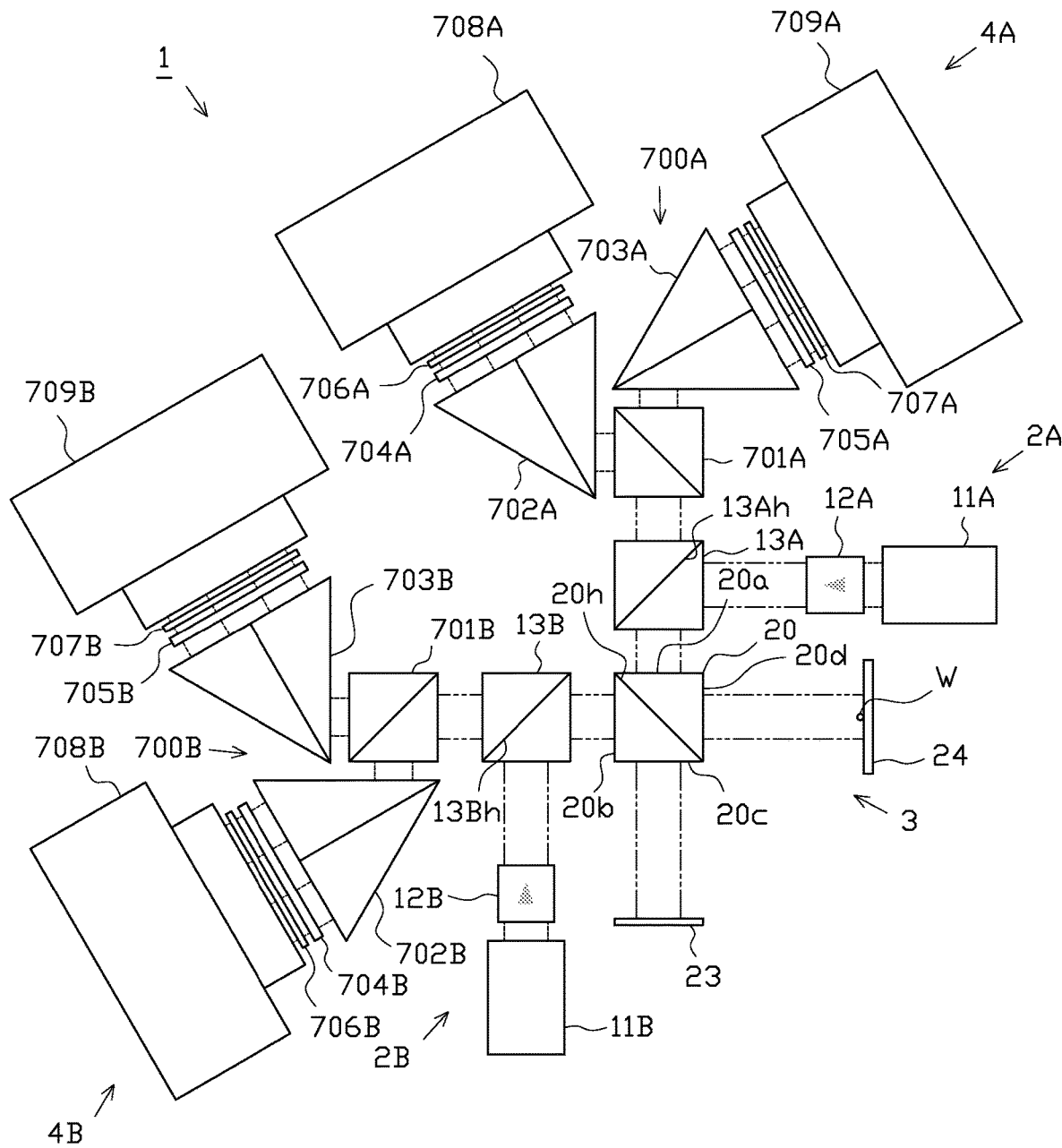
FIG. 13 is a schematic configuration diagram illustrating a three-dimensional measurement device according to one or more embodiments.

The following describes one or more embodiments with reference to the drawings. FIG. 13 is a diagram illustrating the schematic configuration of a three-dimensional measurement device according to one or more embodiments.

One or more embodiments include spectral optical systems different from those of the aforementioned embodiments and have a different configuration involved in the first imaging system 4A and the second imaging system 4B from that of the aforementioned embodiments that employ the optical configuration of the Michelson interferometer. Different components from those of the aforementioned embodiments are described in detail in one or more embodiments. The like components are expressed by the like reference signs, and their detailed description is omitted.

The first imaging system 4A according to one or more embodiments includes a spectral optical system 700A configured as the spectroscopic unit to split the combined light (reference light component and measurement light component) of the first light transmitted through the first non-polarizing beam splitter 13A into four split lights.

The spectral optical system 700A includes a non-polarizing beam splitter 701A configured to split the combined light of the first light transmitted through the first non-polarizing beam splitter 13A into two split lights, a first prism 702A configured to further split one of the two split lights split by the non-polarizing beam splitter 701A into two split lights, and a second prism 703A configured to further split the other of the two split lights split by the non-polarizing beam splitter 701A into two split lights.

The first imaging system 4A according to one or more embodiments also includes a quarter wave plate 704A configured to convert the respective two split lights split by the first prism 702A into circularly polarized lights, a quarter wave plate 705A configured to convert the respective two split lights split by the second prism 703A into circularly polarized lights, a filter unit 706A configured to selectively transmit predetermined components of the two split lights transmitted through the quarter wave plate 704A, a filter unit 707A configured to selectively transmit predetermined components of the two split lights transmitted through the quarter wave plate 705A, a camera 708A configured to take images of the two split lights transmitted through the filter unit 706A simultaneously and a camera 709A configured to take images of the two split lights transmitted through the filter unit 707A simultaneously.

The second imaging system 4B according to one or more embodiments, on the other hand, includes a spectral optical system 700B configured as the spectroscopic unit to split the combined light (reference light component and measurement light component) of the second light transmitted through the second non-polarizing beam splitter 13B into four split lights.

The spectral optical system 700B includes a non-polarizing beam splitter 701B configured to split the combined light of the second light transmitted through the second non-polarizing beam splitter 13B into two split lights, a first prism 702B configured to further split one of the two split lights split by the non-polarizing beam splitter 701B into two split lights, and a second prism 703B configured to further split the other of the two split lights split by the non-polarizing beam splitter 701B into two split lights.

The second imaging system 4B according to one or more embodiments also includes a quarter wave plate 704B configured to convert the respective two split lights split by the first prism 702B into circularly polarized lights, a quarter wave plate 705B configured to convert the respective two split lights split by the second prism 703B into circularly polarized lights, a filter unit 706B configured to selectively transmit predetermined components of the two split lights transmitted through the quarter wave plate 704B, a filter unit 707B configured to selectively transmit predetermined components of the two split lights transmitted through the quarter wave plate 705B, a camera 708B configured to take images of the two split lights transmitted through the filter unit 706B simultaneously and a camera 709B configured to take images of the two split lights transmitted through the filter unit 707B simultaneously.

The "non-polarizing beam splitter 701A" and the "non-polarizing beam splitter 701B" are cube-shaped known optical members, each being configured by joining right angle prisms together to be integrated, and a non-polarizing half mirror is provided on each joint surface.

The "first prism 702A" and the "second prism 703A" included in the first imaging system 4A and the "first prism 702B" and the "second prism 703B" included in the second imaging system 4B are known Koester prisms and have similar configurations to those of the "first prism 601" and the "second prism 602" according to the aforementioned embodiments, and their detailed description is omitted.

The "quarter wave plate 704A" and the "quarter wave plate 705A" included in the first imaging system 4A and the "quarter wave plate 704B" and the "quarter wave plate 705B" included in the second imaging system 4B have similar configurations to those of the "quarter wave plate 31A" and the "quarter wave plate 31B" according to the aforementioned embodiments, and their detailed description is omitted. Each of the "quarter wave plate 704A" and the like according to one or more embodiments is, however, configured corresponding to two split lights. A modified configuration may include quarter wave plates provided individually corresponding to the respective split lights.

The "filter unit 706A" and the "filter unit 707A" included in the first imaging system 4A and the "filter unit 706B" and the "filter unit 707B" included in the second imaging system 4B have similar configurations to that of the "filter unit 126" according to the aforementioned embodiments, and their detailed description is omitted. Each of the "filter unit 706A" and the like according to one or more embodiments is, however, configured corresponding to two split lights. For example, the first imaging system 4A may be configured such that the "filter unit 706A" includes "polarizers 126a and 126b" and that the filter unit 707A" includes "polarizers 126c and 126d" (the same applies to the second imaging system 4B). A modified configuration may include four polarizers (polarizers 126a, 126b, 126c and 126d) having transmission angle directions that differ by 45 degrees each, provided individually corresponding to the respective four split lights.

The configuration involved in the "camera 708A" and the camera "709A" included in the first imaging system 4A, the "camera 708B" and the "camera 709B" included in the second imaging system 4B, the control process with regard to these cameras, the image data storage device 54 and the like is similar to the configuration involved in the "first camera 33A", the "second camera 33B", and the like of the aforementioned embodiments, and their detailed description is omitted. Each of the "camera 708A (imaging element)" and the like according to one or more embodiments is, however, configured corresponding to two split lights. For example, the imaging system 4A may be configured such that the imaging region of the "camera 708A (imaging element)" is divided into two imaging areas (H1 and H2) corresponding to the "filter unit 706A (polarizers 126a and 126b)" and that the imaging region of the "camera 709A (imaging element)" is divided into two imaging areas (H3 and H4) corresponding to the "filter unit 707A (polarizers 126c and 126d)" (the same applies to the second imaging system 4B). This configuration provides imaging elements having the aspect ratio of 2 to 1, according to one or more embodiments.

The following describes the functions of the spectral optical system 700A and the spectral optical system 700B. As described above, the spectral optical system 700A and the spectral optical system 700B respectively used in the first imaging system 4A and in the second imaging system 4B have identical configurations. Accordingly, the following describes the spectral optical system 700A of the first imaging system 4A as an example, with omission of description on the spectral optical system 700B of the second imaging system 4B.

The combined light of the first light transmitted through the first non-polarizing beam splitter 13A first enters the non-polarizing beam splitter 701A of the spectral optical system 700A and is split in two different directions by the half mirror. The split light reflected by the half mirror enters the first prism 702A. The split light transmitted through the half mirror, on the other hand, enters the second prism 703A.

The split light entering a first surface of the first prism 702A is further split in two different directions by the half mirror. More specifically, the split light is further split into a split light that is reflected by the half mirror toward the first surface and a split light that is transmitted through the half mirror toward a second surface.

The split light reflected by the half mirror is totally reflected at the first surface toward a third surface and is emitted vertically from the third surface. The split light transmitted through the half mirror is, on the other hand, totally reflected at the second surface toward the third surface and is emitted vertically from the third surface. The two parallel split lights are accordingly emitted from the third surface of the first prism 702A.

Similarly, the split light entering a first surface of the second prism 703A is further split in two different directions by the half mirror. More specifically, the split light is further split into a split light that is reflected by the half mirror toward the first surface and a split light that is transmitted through the half mirror toward a second surface.

The split light reflected by the half mirror is totally reflected at the first surface toward a third surface and is emitted vertically from the third surface. The split light transmitted through the half mirror is, on the other hand, totally reflected at the second surface toward the third surface and is emitted vertically from the third surface. The two parallel split lights are accordingly emitted from the third surface of the second prism 703A.

The two split lights emitted from the first prism 702A are respectively converted into circularly polarized lights by the quarter wave plate 704A and enter the filter unit 706A (for example, polarizers 126a and 126b).

The two split lights transmitted through the filter unit 706A form, for example, an interfering light having a phase of "0 degrees" and an interfering light having a phase of "90 degrees". The images of these two split lights are taken simultaneously in two imaging areas of the camera 708A. This obtains, for example, an interference fringe image having the phase of "0 degrees" and an interference fringe image having the phase of "90 degrees".

Similarly, the two split lights emitted from the second prism 703A are respectively converted into circularly polarized lights by the quarter wave plate 705A and enter the filter unit 707A (for example, polarizers 126c and 126d).

The two split lights transmitted through the filter unit 707A form, for example, an interfering light having a phase of "180 degrees" and an interfering light having a phase of "270 degrees". The images of these two split lights are taken simultaneously in two imaging areas of the camera 709A. This obtains, for example, an interference fringe image having the phase of "180 degrees" and an interference fringe image having the phase of "270 degrees".

As a result, four different interference fringe images having phases that differ by 90 degrees each are obtained by the first imaging system 4A (by the camera 708A and the camera 709A).

As described above in detail, one or more embodiments have similar functions and advantageous effects to those of the aforementioned embodiments.

The following describes one or more embodiments. One or more embodiments are configured to allow for measurement using four different lights having different wavelengths by combining a configuration that causes two different lights that are emitted from two light sources and have different wavelengths to enter an interference optical system in an overlapped manner, performs wavelength separation of a light emitted from the interference optical system by an optical separator and individually takes images of interfering lights with regard to the lights of the respective wavelengths, with the aforementioned embodiments that employ the optical configuration of the Michelson interferometer.

Figure 14:
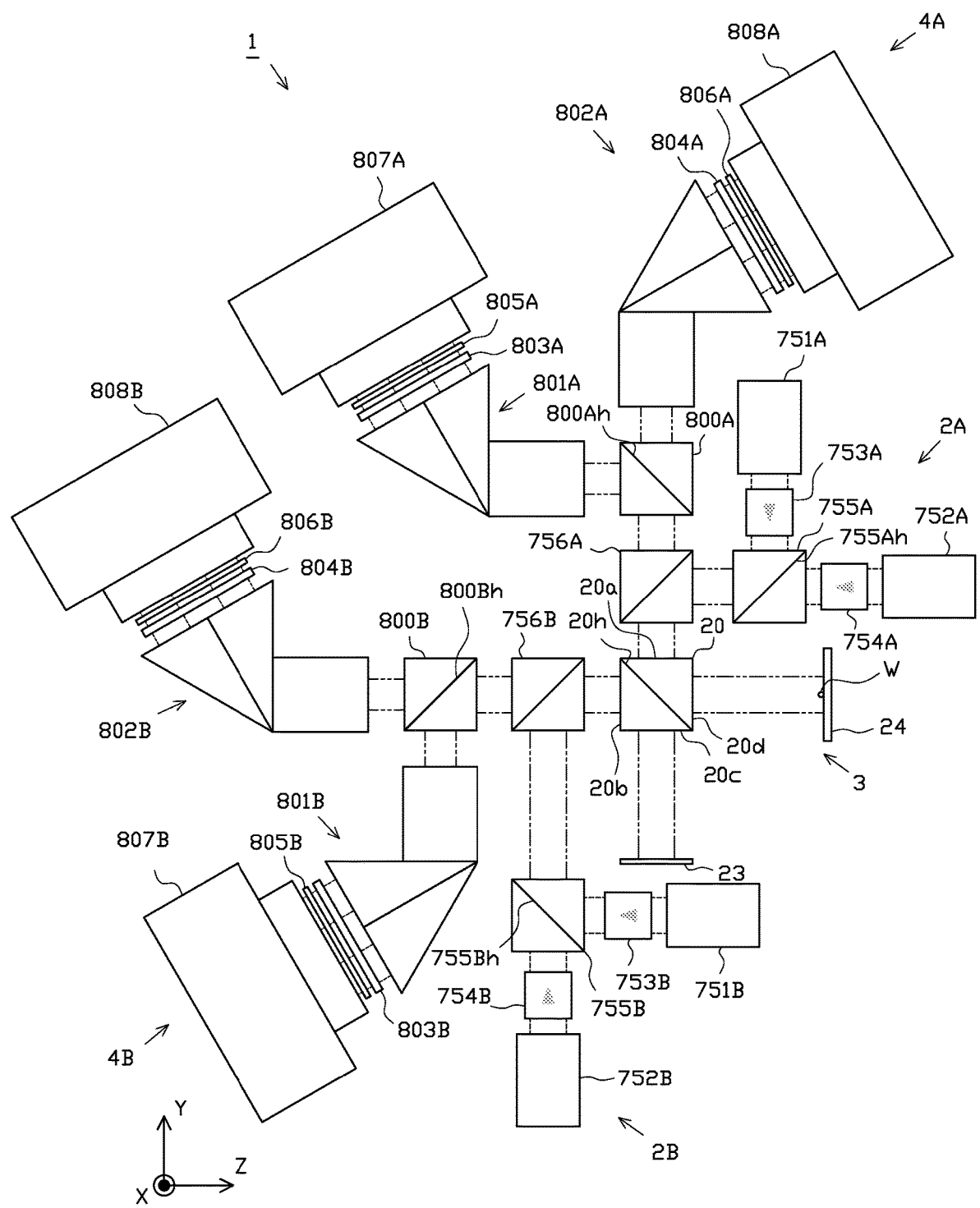
FIG. 14 is a schematic configuration diagram illustrating a three-dimensional measurement device according to one or more embodiments.

One or more embodiments are described in detail below with reference to the drawings. FIG. 14 is a diagram illustrating the schematic configuration of a three-dimensional measurement device according to one or more embodiments. One or more embodiments have a different configuration involved in the first projection optical system 2A, the second projection optical system 2B, the first imaging system 4A and the second imaging system 4B from the configurations of the above embodiments. Different components from those of the above embodiments are described in detail in one or more embodiments. The like components are expressed by the like reference signs, and their detailed description is omitted.

The first projection optical system 2A according to one or more embodiments includes, for example, two light emitters 751A and 752A, a light isolator 753A provided corresponding to the light emitter 751A, a light isolator 754A provided corresponding to the light emitter 752A, a dichroic mirror 755A and a non-polarizing beam splitter 756A.

The "light emitter 751A" and the "light emitter 752A" have similar configurations to that of the "first light emitter 11A", and their detailed description is omitted. The light emitters 751A and 752A are configured to emit lights of different wavelengths. For example, the light emitter 751A emits linearly polarized light having a first wavelength $\lambda_{c1}$ (for example, $\lambda_{c1}=491$ nm), and the light emitter 752A emits linearly polarized light having a second wavelength $\lambda_{c2}$ (for example, $\lambda_{c2}=540$ nm).

More specifically, the light emitter 751A is configured to emit linearly polarized light of the first wavelength $\lambda_{c1}$ having a polarizing direction that is a direction inclined at 45 degrees to the X-axis direction and the Z-axis direction (hereinafter referred to as "first wavelength light") downward in the Y-axis direction. The light emitter 752A is configured to emit linearly polarized light of the second wavelength $\lambda_{c2}$ having a polarizing direction that is a direction inclined at 45 degrees to the X-axis direction and the Y-axis direction (hereinafter referred to as "second wavelength light") leftward in the Z-axis direction.

The "light isolator 753A" and the "light isolator 754A" have similar configurations to that of the "first light isolator 12A", and their detailed description is omitted.

Under the above configuration, the first wavelength light emitted downward in the Y-axis direction from the light emitter 751A enters the dichroic mirror 755A via the light isolator 753A. Similarly, the second wavelength light emitted leftward in the Z-axis direction from the light emitter 752A enters the dichroic mirror 755A via the light isolator 754A.

The dichroic mirror 755A is a cube-shaped known optical member (dichroic prism) configured by joining right angle prisms together to be integrated, and a dielectric multilayer film is formed on its joint surface 755Ah.

The dichroic mirror 755A is arranged such that one of two surfaces adjoining to each other across the joint surface 755Ah is perpendicular to the Y-axis direction and the other of the two surfaces is perpendicular to the Z-axis direction. In other words, the joint surface 755Ah of the dichroic mirror 755A is arranged to be inclined at 45 degrees to the Y-axis direction and the Z-axis direction.

The dichroic mirror 755A according to one or more embodiments has a characteristic of reflecting at least the first wavelength light and transmitting the second wavelength light. In the arrangement configuration of one or more embodiments shown in FIG. 14, the first wavelength light and the second wavelength light entering the dichroic mirror 755A are combined with each other, and combined light is emitted leftward in the Z-axis direction toward the non-polarizing beam splitter 756A as linearly polarized light having a polarizing direction that is a direction inclined at 45 degrees to the X-axis direction and the Y-axis direction.

Hereinafter the combined light by combining the first wavelength light emitted from the light emitter 751A with the second wavelength light emitted from the light emitter 752A is called "first light". Accordingly, the "light emitters 751A and 752A", the "dichroic mirror 755A" and the like are configured as the "first irradiation unit" according to one or more embodiments. More specifically, the "light emitter 751A" is configured as the "first wavelength light emitter", the "light emitter 752A" is configured as the "second wavelength light emitter", and the "dichroic mirror 755A" is configured as the "first combining unit".

The "non-polarizing beam splitter 756A" has a similar configuration to that of the "first non-polarizing beam splitter 13A", and its detailed description is omitted. According to one or more embodiments, the non-polarizing beam splitter 756A is arranged to transmit part (half) of the first light that enters leftward in the Z-axis direction from the dichroic mirror 755A, leftward in the Z-axis direction and reflect the remaining part (remaining half) of the first light downward in the Y-axis direction.

The second projection optical system 2B according to one or more embodiments includes, for example, two light emitters 751B and 752B, a light isolator 753B provided corresponding to the light emitter 751B, a light isolator 754B provided corresponding to the light emitter 752B, a dichroic mirror 755B and a non-polarizing beam splitter 756B.

The "light emitter 751B" and the "light emitter 752B" have similar configurations to that of the "second light emitter 11B", and their detailed description is omitted. The light emitters 751B and 752B are configured to emit lights of different wavelengths. For example, the light emitter 751B emits linearly polarized light having a third wavelength $\lambda_{c3}$ (for example, 488 nm), and the light emitter 752B emits linearly polarized light having a fourth wavelength $\lambda_{c4}$ (for example, $\lambda_{c4}$=532 nm).

More specifically, the light emitter 751B is configured to emit linearly polarized light of the third wavelength $\lambda_{c3}$ having a polarizing direction that is a direction inclined at 45 degrees to the X-axis direction and the Y-axis direction (hereinafter referred to as "third wavelength light") leftward in the Z-axis direction. The light emitter 752B is configured to emit linearly polarized light of the fourth wavelength $\lambda_{c4}$ having a polarizing direction that is a direction inclined at 45 degrees to the X-axis direction and the Y-axis direction (hereinafter referred to as "fourth wavelength light") upward in the Y-axis direction.

The "light isolator 753B" and the "light isolator 754B" have similar configurations to that of the "second light isolator 12B", and their detailed description is omitted.

Under the above configuration, the third wavelength light emitted leftward in the Z-axis direction from the light emitter 751B enters the dichroic mirror 755B via the light isolator 753B. The fourth wavelength light emitted upward in the Y-axis direction from the light emitter 752B enters the dichroic mirror 755B via the light isolator 754B.

The dichroic mirror 755B is a cube-shaped known optical member (dichroic prism) configured by joining right angle prisms together to be integrated, and a dielectric multilayer film is formed on its joint surface 755Bh.

The dichroic mirror 755B is arranged such that one of two surfaces adjoining to each other across the joint surface 755Bh is perpendicular to the Y-axis direction and the other of the two surfaces is perpendicular to the Z-axis direction. In other words, the joint surface 755Bh of the dichroic mirror 755B is arranged to be inclined at 45 degrees to the Y-axis direction and the Z-axis direction.

The dichroic mirror 755B according to one or more embodiments has a characteristic of reflecting at least the third wavelength light and transmitting the fourth wavelength light. In the arrangement configuration of one or more embodiments shown in FIG. 20, the third wavelength light and the fourth wavelength light entering the dichroic mirror 755B are combined with each other, and combined light is emitted upward in the Y-axis direction toward the non-polarizing beam splitter 756B as linearly polarized light having a polarizing direction that is a direction inclined at 45 degrees to the X-axis direction and the Z-axis direction.

Hereinafter the combined light by combining the third wavelength light emitted from the light emitter 751B with the fourth wavelength light emitted from the light emitter 752B is called "second light". Accordingly, the "light emitters 751B and 752B", the "dichroic mirror 755B" and the like are configured as the "second irradiation unit" according to one or more embodiments. More specifically, the "light emitter 751B" is configured as the "third wavelength light emitter", the "light emitter 752B" is configured as the "fourth wavelength light emitter", and the "dichroic mirror 755B" is configured as the "second combining unit".

The "non-polarizing beam splitter 756B" has a similar configuration to that of the "second non-polarizing beam splitter 13B", and its detailed description is omitted. According to one or more embodiments, the non-polarizing beam splitter 756B is arranged to transmit part (half) of the second light that enters upward in the Y-axis direction from the dichroic mirror 755B, upward in the Y-axis direction and reflect the remaining part (remaining half) of the second light rightward in the Z-axis direction.

The first imaging system 4A according to one or more embodiments includes a dichroic mirror 800A configured to separate combined light of a reference light component and a measurement light component with regard to the first light (two-wavelength combined light of the first wavelength light and the second wavelength light) transmitted through the non-polarizing beam splitter 756A into a combined light (reference light component and measurement light component) with regard to the first wavelength light and a combined light (reference light component and measurement light component) with regard to the second wavelength light. The dichroic mirror 800A is described in detail below.

The dichroic mirror 800A is a cube-shaped known optical member (dichroic prism) configured by joining right angle prisms together to be integrated, and a dielectric multilayer film is formed on its joint surface 800Ah. The "dichroic mirror 800A" is configured as the "first separation unit" according to one or more embodiments.

The dichroic mirror 800A is arranged such that one of two surfaces adjoining to each other across the joint surface 800Ah is perpendicular to the Y-axis direction and the other of the two surfaces is perpendicular to the Z-axis direction. In other words, the joint surface 800Ah of the dichroic mirror 800A is arranged to be inclined at 45 degrees to the Y-axis direction and the Z-axis direction.

The dichroic mirror 800A according to one or more embodiments has a similar characteristic to that of the dichroic mirror 755A described above. More specifically, the dichroic mirror 800A has a characteristic of reflecting at least the first wavelength light and transmitting the second wavelength light.

In the arrangement configuration of one or more embodiments shown in FIG. 14, the combined light with regard to the first light entering the dichroic mirror 800A is separated into combined light with regard to the first wavelength light emitted leftward in the Z-axis direction and combined light with regard to the second wavelength light emitted upward in the Y-axis direction.

Furthermore, the first imaging system 4A according to one or more embodiments additionally includes a spectral optical system 801A configured to split the combined light with regard to the first wavelength light emitted leftward in the Z-axis direction from the dichroic mirror 800A into four split lights; a quarter wave plate 803A configured to convert the respective four split lights split by the spectral optical system 801A into circularly polarized lights; a filter unit 805A configured to selectively transmit predetermined components of the four split lights transmitted through the quarter wave plate 803A; and a camera 807A configured to simultaneously take images of the four split lights transmitted through the filter unit 805A. The "camera 807A" is configured as the "first wavelength light imaging unit" according to one or more embodiments.

Similarly, the first imaging system 4A according to one or more embodiments includes a spectral optical system 802A configured to split the combined light with regard to the second wavelength light emitted upward in the Y-axis direction from the dichroic mirror 800A into four split lights; a quarter wave plate 804A configured to convert the respective four split lights split by the spectral optical system 802A into circularly polarized lights; a filter unit 806A configured to selectively transmit predetermined components of the four split lights transmitted through the quarter wave plate 804A; and a camera 808A configured to simultaneously take images of the four split lights transmitted through the filter unit 806A. The "camera 808A" is configured as the "second wavelength light imaging unit" according to one or more embodiments.

The configurations of the "spectral optical system 801A", the "quarter wave plate 803A", the "filter unit 805A" and the "camera 807A" with regard to the first wavelength light and the configurations of the "spectral optical system 802A", the "quarter wave plate 804A", the "filter unit 806A" and the "camera 808A" with regard to the second wavelength light are respectively identical with the configurations of the "spectral optical system 600A", the "quarter wave plate 610A", the "filter unit 615A" and the "camera 633A" described in the above embodiments, and their detailed description is omitted.

The second imaging system 4B according to one or more embodiments includes a dichroic mirror 800B configured to separate a combined light of a reference light component and a measurement light component with regard to the second light (two-wavelength combined light of the third wavelength light and the fourth wavelength light) transmitted through the non-polarizing beam splitter 756B into a combined light (reference light component and measurement light component) with regard to the third wavelength light and a combined light (reference light component and measurement light component) with regard to the fourth wavelength light. The dichroic mirror 800B is described in detail below.

The dichroic mirror 800B is a cube-shaped known optical member (dichroic prism) configured by joining right angle prisms together to be integrated, and a dielectric multilayer film is formed on its joint surface 800Bh. The "dichroic mirror 800B" is configured as the "second separation unit" according to one or more embodiments.

The dichroic mirror 800B is arranged such that one of two surfaces adjoining to each other across the joint surface 800Bh is perpendicular to the Y-axis direction and the other of the two surfaces is perpendicular to the Z-axis direction. In other words, the joint surface 800Bh of the dichroic mirror 800B is arranged to be inclined at 45 degrees to the Y-axis direction and the Z-axis direction.

The dichroic mirror 800B according to one or more embodiments has a similar characteristic to that of the dichroic mirror 755B described above. More specifically, the dichroic mirror 800B has a characteristic of reflecting at least the third wavelength light and transmitting the fourth wavelength light.

In the arrangement configuration of one or more embodiments shown in FIG. 14, the combined light with regard to the second light entering the dichroic mirror 800B is separated into combined light with regard to the third wavelength light emitted downward in the Y-axis direction and combined light with regard to the fourth wavelength light emitted leftward in the Z-axis direction.

Furthermore, the second imaging system 4B according to one or more embodiments additionally includes a spectral optical system 801B configured to split the combined light with regard to the third wavelength light emitted downward in the Y-axis direction from the dichroic mirror 800B into four split lights, a quarter wave plate 803B configured to convert the respective four split lights split by the spectral optical system 801B into circularly polarized lights, a filter unit 805B configured to selectively transmit predetermined components of the four split lights transmitted through the quarter wave plate 803B, and a camera 807B configured to simultaneously take images of the four split lights transmitted through the filter unit 805B. The "camera 807B" is configured as the "third wavelength light imaging unit" according to one or more embodiments.

Similarly, the second imaging system 4B according to one or more embodiments includes a spectral optical system 802B configured to split the combined light with regard to the fourth wavelength light emitted leftward in the Z-axis direction from the dichroic mirror 800B into four split lights, a quarter wave plate 804B configured to convert the respective four split lights split by the spectral optical system 802B into circularly polarized lights, a filter unit 806B configured to selectively transmit predetermined components of the four split lights transmitted through the quarter wave plate 804B, and a camera 808B configured to simultaneously take images of the four split lights transmitted through the filter unit 806B. The "camera 808B" is configured as the "fourth wavelength light imaging unit" according to one or more embodiments.

The configurations of the "spectral optical system 801B", the "quarter wave plate 803B", the "filter unit 805B" and the "camera 807B" with regard to the third wavelength light and the configurations of the "spectral optical system 802B", the "quarter wave plate 804B", the "filter unit 806B" and the "camera 808B" with regard to the fourth wavelength light are respectively identical with the configurations of the "spectral optical system 600B", the "quarter wave plate 610B", the "filter unit 615B" and the "camera 633B" described in the above embodiments, and their detailed description is omitted.

The following describes a procedure of shape measurement process performed according to one or more embodiments. The control device 5 first drives and controls the first projection optical system 2A and the second projection optical system 2B to simultaneously perform radiation of the first wavelength light from the light emitter 751A, radiation of the second wavelength light from the light emitter 752A, radiation of the third wavelength light from the light emitter 751B, and radiation of the fourth wavelength light from the light emitter 752B.

This causes the first light that is the combined light of the first wavelength light and the second wavelength light to enter the first surface 20a of the polarizing beam splitter 20, while causing the second light that is the combined light of the third wavelength light and the fourth wavelength light to enter the second surface 20b of the polarizing beam splitter 20.

As a result, the combined light (reference light and measurement light) with regard to the first light is emitted from the first surface 20a of the polarizing beam splitter 20, while the combined light (reference light and measurement light) with regard to the second light is emitted from the second surface 20b of the polarizing beam splitter 20.

Part of the combined light with regard to the first light emitted from the first surface 20a of the polarizing beam splitter 20 enters the first imaging system 4A to be separated into combined light (reference light and measurement light) with regard to the first wavelength light and combined light (reference light and measurement light) with regard to the second wavelength light. The combined light with regard to the first wavelength light is split into four by the spectral optical system 801A and then enters the camera 807A via the quarter wave plate 803A and the filter unit 805A. Simultaneously, the combined light with regard to the second wavelength light is split into four by the spectral optical system 802A and then enters the camera 808A via the quarter wave plate 804A and the filter unit 806A.

Part of the combined light with regard to the second light emitted from the second surface 20b of the polarizing beam splitter 20, on the other hand, enters the second imaging system 4B to be separated into combined light (reference light and measurement light) with regard to the third wavelength light and combined light (reference light and measurement light) with regard to the fourth wavelength light. The combined light with regard to the third wavelength light is split into four by the spectral optical system 801B and then enters the camera 807B via the quarter wave plate unit 803B and the filter unit 805B. Simultaneously, the combined light with regard to the fourth wavelength light is split into four by the spectral optical system 802B and then enters the camera 808B via the quarter wave plate unit 804B and the filter unit 806B.

The control device 5 subsequently drives and controls the first imaging system 4A and the second imaging system 4B to simultaneously perform imaging with the camera 807A, imaging with the camera 808A, imaging with the camera 807B and imaging with the camera 808B.

As a result, the camera 807A (imaging areas H1 to H4 of the imaging element) obtains four interference fringe images with regard to the first wavelength light having the phases that differ by 90 degrees each, as one image data. The camera 808A (imaging areas H1 to H4 of the imaging element) obtains four interference fringe images with regard to the second wavelength light having the phases that differ by 90 degrees each, as one image data. The camera 807B (imaging areas H1 to H4 of the imaging element) obtains four interference fringe images with regard to the third wavelength light having the phases that differ by 90 degrees each, as one image data. The camera 808B (imaging areas H1 to H4 of the imaging element) obtains four interference fringe images with regard to the fourth wavelength light having the phases that differ by 90 degrees each, as one image data.

The control device 5 then divides one image data obtained from the camera 807A into four interference fringe image data (respective ranges corresponding to the imaging areas H1 to H4 of the imaging element) and stores the four interference fringe image data into first to fourth image memories provided in the image data storage device 54 corresponding to the camera 807A.

Simultaneously, the control device 5 executes the similar process with regard to the image data obtained respectively from the camera 808A, the camera 807B and the camera 808B, and stores interference fringe image data into first to fourth image memories corresponding to each of the cameras 808A, 807B and 808B.

The control device 5 subsequently measures the surface shape of the work W by a phase shift method, based on the four interference fringe image data with regard to the first wavelength light, the four interference fringe image data with regard to the second wavelength light, the four interference fringe image data with regard to the third wavelength light and the four interference fringe image data with regard to the fourth wavelength light stored in the image data storage device 54. More specifically, the control device 5 calculates height information at respective positions on the surface of the work W.

As described above in detail, one or more embodiments are configured to cause the first light that is the combined light of the first wavelength light and the second wavelength light to enter the first surface 20a of the polarizing beam splitter 20 and to cause the second light that is the combined light of the third wavelength light and the fourth wavelength light to enter the second surface 20b of the polarizing beam splitter 20. This configuration causes the reference light and the measurement light with regard to the first light and the reference light and the measurement light with regard to the second light to be respectively split into different polarized light components (P-polarized light and S-polarized light). The first light and the second light entering the polarizing beam splitter 20 accordingly do not interfere with each other but are separately emitted from the polarizing beam splitter 20.

This configuration enables two different polarized lights having wavelengths close to each other to be used as the polarized lights included in the first light (first wavelength light and/or second wavelength light) and the polarized lights included in the second light (third wavelength light and/or fourth wavelength light). As a result, this configuration further expands the measurement range in three-dimensional measurement by using the two different polarized lights having wavelengths close to each other. Especially, one or more embodiments may use four different lights having different wavelengths at most and thereby remarkably expands the measurement range.

One or more embodiments are configured to separate the combined light (reference light component and measurement light component) with regard to the first light emitted from the interference optical system 3 into the combined light with regard to the first wavelength light and the combined light with regard to the second wavelength light, to separate the combined light with regard to the second light emitted from the interference optical system 3 into the combined light with regard to the third wavelength light and the combined light with regard to the fourth wavelength light, and to individually and simultaneously perform imaging of the combined light with regard to the first wavelength light, imaging of the combined light with regard to the second wavelength light, imaging of the combined light with regard to the third wavelength light and imaging of the combined light with regard to the fourth wavelength light. This configuration shortens the total imaging time and improves the measurement efficiency.

Additionally, one or more embodiments are configured to split the combined light with regard to each wavelength light into four split lights by using the spectral optical system 801A and the like and to obtains four interfering lights having the phases that differ by 90 degrees each by using the filter unit 805A and the like. This configuration simultaneously obtains all the interference fringe images required for three-dimensional measurement by the phase shift method. More specifically, this configuration simultaneously obtains a total of sixteen (four by four) interference fringe images with regard to the four different polarized lights at most. As a result, this further enhances the functions and the advantageous effects described above.

Furthermore, one or more embodiments are configured to change over the measurement between, for example, measurement using two different polarized lights of the first wavelength light and the third wavelength light and measurement using two different polarized lights of the second wavelength light and the fourth wavelength light according to the type of the work W. The configuration of one or more embodiments accordingly enables the type (wavelength) of light to be changed over according to the type of the work W, while expanding the measurement range by using the two different polarized lights having wavelengths close to each other. As a result, this improves the convenience and the versatility.

For example, a work W such as a wafer substrate for which red color light is not suitable, may be subjected to measurement using two different polarized lights of the first wavelength light and the third wavelength light (for example, two blue color lights of 491 nm and 488 nm), whereas a work W such as copper for which blue color light is not suitable, may be subjected to measurement using two different polarized lights of the second wavelength light and the fourth wavelength light (for example, two green color lights of 540 nm and 532 nm).

The present invention is not limited to the descriptions of the above embodiments but may also be implemented, for example, by configurations described below. The present invention may further be implemented by other applications and other modifications that are not specifically described below.

(a) The above embodiments do not specifically refer to concrete examples of the work W. The measurement object may be, for example, solder paste printed on a printed circuit board or a solder bump formed on a wafer substrate.

The following describes the principle of height measurement of, for example, a solder bump. As shown in FIG. 15, a height HB of a bump 503 relative to an electrode 501 (substrate 500) is determined by subtracting an absolute height hr of the electrode 501 in the periphery of the bump 503 from an absolute height ho of the bump 503 [HB=ho−hr]. For example, an absolute height at any one point on the electrode 501 or an average value of absolute heights in a predetermined range on the electrode 501 may be used as the absolute height hr of the electrode 501. The "absolute height ho of the bump 503" and the "absolute height hr of the electrode 501" may be determined as the height information $z(\xi,\eta)$ according to the embodiments described above.

A solder printing inspection apparatus or a solder bump inspection apparatus equipped with an inspection unit configured to inspect the quality of solder paste or a solder bump according to preset quality criteria may be configured to include the three-dimensional measurement device 1.

The three-dimensional measurement device 1 employing the optical configuration of the Michelson interferometer is suitable for reflection works. Using the phase shift method allows for measurement with exclusion of zero dimension (transmitted light).

According to the above embodiments, the placement structure 24 on which the work W is placed may be configured to be movable. The surface of the work W may be divided into a plurality of measurement areas, and shape measurement of the entire work W may be performed by performing shape measurement multiple times for the respective measurement areas by successively changing the measurement area.

(b) The configuration of the interference optical system (predetermined optical system) is not limited to those of the embodiments described above. For example, the above embodiments employ the optical configuration of the Michelson interferometer as the interference optical system 3. This is, however, not restrictive, but any other optical configuration may be employed to divide incident light into reference light and measurement light and perform shape measurement of the work W.

According to the embodiments described above, a cube-type polarizing beam splitter configured by joining right angle prisms together to be integrated is employed for the polarizing beam splitter 20. This is, however, not restrictive. For example, a plate-type polarizing beam splitter may be employed.

The polarizing beam splitter 20 is configured to transmit the P-polarized light component and reflect the S-polarized light component. This is, however, not restrictive. According to a modification, the polarizing beam splitter may be configured to reflect the P-polarized light component and transmit the S-polarized light component. The "S-polarized light" may correspond to the "polarized light having the first polarizing direction", and the "P-polarized light" may correspond to the "polarized light having the second polarizing direction".

(c) The configurations of the projection optical systems 2A and 2B are not limited to those of the embodiments described above. For example, the wavelengths of the respective lights emitted from the projection optical systems 2A and 2B are not limited to those described in the above embodiments. In one or more embodiments, the smaller wavelength difference between the light radiated by the first projection optical system 2A and the light radiated by the second projection optical system 2B is adopted in order to further expand the measurement range.

In one or more embodiments, the first wavelength light and the second wavelength light radiated by the first projection optical system 2A are polarized lights having wavelengths separate from each other such as to be separable by the dichroic mirror 800A. Similarly, in one or more embodiments, the third wavelength light and the fourth wavelength light radiated by the second projection optical system 2B are polarized lights having wavelengths separate from each other such as to be separable by the dichroic mirror 800B.

The first projection optical system 2A and the second projection optical system 2B may be configured to radiate lights of an identical wavelength.

As described above, the three-dimensional measurement device (interferometer) using laser light has conventionally been known as the three-dimensional measurement device configured to measure the shape of a measurement object. This three-dimensional measurement device is, however, likely to decrease the measurement accuracy due to the effects of, for example, fluctuation of the output light from the laser light source.

For example, in the case where a measurement object is relatively small and only one light (one wavelength) is sufficient for the measurement range, the configuration of radiating lights of an identical wavelength from two different light sources and performing three-dimensional measurement using these two lights achieves improvement of the measurement accuracy.

In three-dimensional measurement using two lights, however, there is a need to take an image of the output light with regard to the first light and take an image of the output light with regard to the second light at different timings. This is likely to decrease the measurement efficiency.

For example, in three-dimensional measurement by the phase shift method, when the phase is changed in four different levels, there is a need to obtain four different image data. In the configuration using two lights, a required imaging time is accordingly for four imaging processes at different timings, i.e., for a total of eight imaging processes.

One or more embodiments of the present invention that radiate two lights of an identical wavelength take into account the above circumstances. One or more embodiments of the present invention provide a three-dimensional measurement device that achieves improvement of the measurement efficiency by using two lights.

One or more embodiments of the present invention enable imaging of the output light with regard to the first light and imaging of the output light with regard to the second light to be performed simultaneously and thereby obtains a total of eight interference fringe images (or six interference fringe images) with regard to the two lights in an imaging time for a total of four imaging processes (or three imaging processes). As a result, this shortens the total imaging time and improves the measurement efficiency.

According to the above embodiments, the projection optical systems 2A and 2B are configured with the light isolators 12A and 12B and the like. The projection optical systems 2A and 2B may, however, be configured without the light isolators 12A and 12B and the like.

In the above embodiments, the positions of the first projection optical system 2A and the first imaging system 4A that are placed across the first non-polarizing beam splitter 13A and the like may be exchanged. The positions of the second projection optical system 2B and the second imaging system 4B that are placed across the second non-polarizing beam splitter 13B and the like may be exchanged.

In one or more embodiments, the positions of the light emitter 751A and the light emitter 752A of the first projection optical system 2A that are placed across the dichroic mirror 755A may be exchanged. The positions of the light emitter 751B and the light emitter 752B of the second projection optical system 2B that are placed across the dichroic mirror 755B may be exchanged.

The configuration of the light guiding unit is not limited to the non-polarizing beam splitters 13A and 13B and the like of the above embodiments. Another configuration may be employed as long as the configuration causes at least part of the first light (second light) emitted from the first irradiation unit (second irradiation unit) to enter the first input-output element (second input-output element) and causes at least part of the output light with regard to the first light (output light with regard to the second light) emitted from the first input-output element (second input-output element) to enter the first imaging unit (second imaging unit).

In other words, another configuration may be employed in one or more embodiments as long as the configuration causes the first light (second light) radiated from the first projection optical system 2A (second projection optical system 2B) to enter the first surface 20a (second surface 20b) of the polarizing beam splitter 20 and causes the output light with regard to the first light (output light with regard to the second light) emitted from the first surface 20a (second surface 20b) of the polarizing beam splitter 20 to enter the first imaging system 4A (second imaging system 4B).

According to the embodiments described above, a cube-type non-polarizing beam splitter configured by joining right angle prisms together to be integrated is employed for the non-polarizing beam splitters 13A and 13B and the like. This is, however, not restrictive. For example, a plate-type predetermined half mirror may be employed.

In one or more embodiments, a cube-type dichroic mirror configured by joining right angle prisms together to be integrated is employed for the dichroic mirrors 755A and 755b and for the dichroic mirrors 800A and 800B. This is, however, not restrictive. For example, a plate-type predetermined dichroic mirror may be employed.

(d) The above embodiments are configured to perform the phase shift method, based on the four different interference fringe image data having different phases. This is, however, not essential. For example, a modified configuration may perform the phase shift method, based on two or three different interference fringe image data having different phases.

Another configuration may employ another technique different from the phase shift method, for example, the Fourier transform method, for three-dimensional measurement.

(e) In one or more embodiments, the polarizers 32A and 32B arranged to make their transmission axis directions changeable are employed as the phase shift unit. In one or more embodiments, the filter unit 126 including four polarizers having different transmission axis directions or the like is employed as the phase shift unit.

The configuration of the phase shift unit is, however, not limited to these embodiments. For example, one or more embodiments may employ a configuration that moves the reference surface 23 along the optical axis by means of a piezoelectric element or the like so as to physically change the optical path length.

The above method using the rotary polarizer as the phase shift unit, however, needs to perform imaging at multiple different timings, in order to obtain all the image data required for three-dimensional measurement. In one or more embodiments that employ the configuration of moving the reference surface 23 as the phase shift unit, there is a need to provide different operation amounts (phase shift amounts) of the reference surface with regard to multiple lights having different wavelengths. This results in failing to take images of the multiple lights simultaneously. In terms of shortening the imaging time, the filter unit 126 or the like is employed to enable all the image data to be taken at only one timing, like the embodiments described above.

(f) The above embodiments are configured to determine the height information $z(\xi,\eta)$ according to the computational expression in the two-wavelength phase shift method. This configuration is, however, not essential, but a modified configuration may store a numerical table or table data representing the correspondence relationship of the phases $\phi_1$ and $\phi_2$ and the fringe orders $m_1$ and $m_2$ to the height information z and refer to the numerical table or table data to obtain the height information z. In this modified configuration, it is not necessary to specify the fringe orders.

(g) The configuration of the spectroscopic unit is not limited to the embodiments described above. For example, the spectral optical system 125 according to the above embodiments is configured to split the light entering from the interference optical system 3 into four split lights. This is, however, not essential, but the configuration may split the incident light into at least a required number of split lights required for measurement by the phase shift method, for example, into three split lights.

The above embodiments are configured to split the incident combined light L0 or the like into the four lights LB1 to LB4 or the like having the optical paths arrayed in matrix on the plane perpendicular to the traveling direction of light. In a configuration that uses a plurality of cameras to take the images of the respective split lights LB1 to LB4 or the like, it is not necessary to split the light into split lights arrayed in matrix.

The above embodiments employ the spectral optical system 125 or the like configured by assembling and integrating a plurality of optical members (prisms) as the spectroscopic unit. This is, however, not restrictive, but a diffraction grating may be employed as the spectroscopic unit.

(h) The configuration of the filter unit is not limited to the above embodiments. For example, according to the embodiments described above, the filter unit 126 is configured to include the first polarizer 126a having the transmission axis direction of 0 degree, the second polarizer 126b having the transmission axis direction of 45 degrees, the third polarizer 126c having the transmission axis direction of 90 degrees and the fourth polarizer 126d having the transmission axis direction of 135 degrees. The filter unit 126 is configured to obtain four different interference fringe images having phases that differ by 90 degrees each by using these four polarizers 126a to 26d having the transmission axis directions that differ by 45 degrees each and perform the shape measurement by the phase shift method based on the four interference fringe images.

Figure 16:
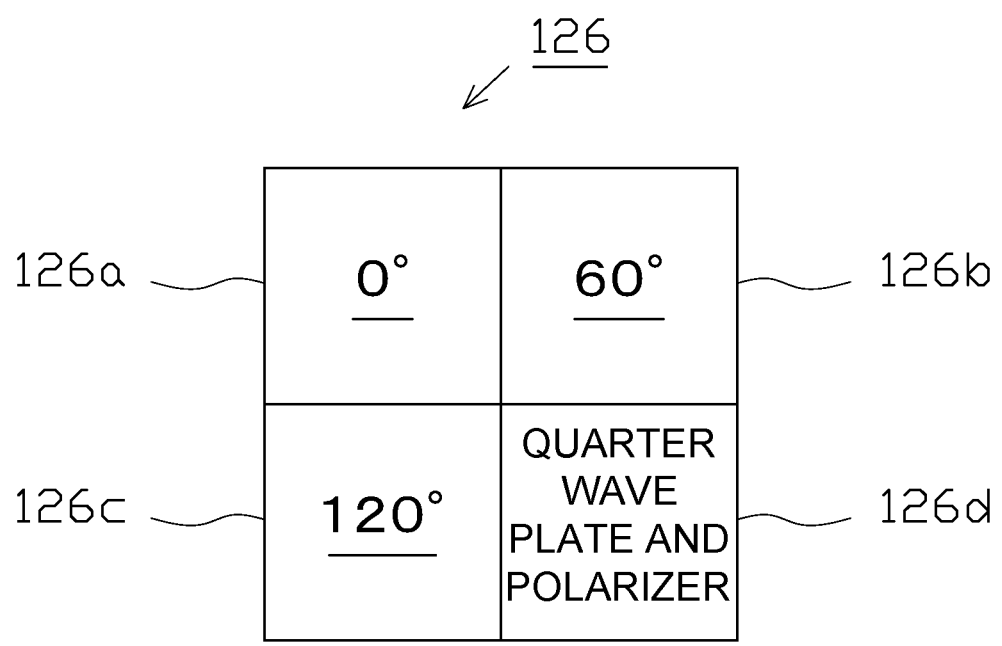
FIG. 16 is a schematic configuration diagram illustrating a filter unit according to one or more embodiments.

The following configuration may be employed in place of the above configuration to perform shape measurement by the phase shift method based on three different interference fringe images having different phases. For example, as shown in FIG. 16, the first polarizer 126a, the second polarizer 126b, the third polarizer 126c and the fourth polarizer 126d of the filter unit 126 may be respectively configured by a polarizer having a transmission axis direction of 0 degree, a polarizer having a transmission axis direction of 60 degrees (or 45 degrees), a polarizer having a transmission axis direction of 120 degrees (or 90 degrees), and a combination of a quarter wave plate configured to convert the measurement light (for example, clockwise circularly polarized light) and the reference light (for example, counterclockwise circularly polarized light) into linearly polarized lights with a polarizer configured to selectively transmit the linearly polarized light of the measurement light. The combination of the "quarter wave plate" and the "polarizer" may be replaced by a "circularly polarizing plate".

This configuration enables a luminance image of the work W, in addition to three different interference fringe images having phases that differ by 120 degrees each (or by 90 degrees each) to be obtained by one imaging process using one imaging element. This allows for measurement based on the luminance image in combination with the shape measurement by the phase shift method based on the three different interference fringe images. This configuration allows for, for example, mapping with respect to three-dimensional data obtained by the shape measurement by the phase shift method or for extraction of a measurement area. As a result, this configuration allows for comprehensive evaluation by combination of a plurality of different measurements and further improves the measurement accuracy.

In the illustrated example of FIG. 16, the combination of the quarter wave plate configured to convert the circularly polarized light into the linearly polarized light and the polarizer configured to selectively transmit the linearly polarized light of the measurement light is employed as the fourth polarizer 126d. This is, however, not essential, but another configuration may be employed as long as the configuration allows for selective transmission of only the measurement light.

Furthermore, another modified configuration may omit the fourth polarizer 126d. More specifically, this modified configuration may cause images of three lights that are respectively transmitted through the first polarizer 126a, the second polarizer 126b and the third polarizer 126c of the filter unit 126 and an image of one light which directly enters without passing through the filter unit 126 (polarizer) to be taken simultaneously by using one imaging element.

This configuration has similar functions and advantageous effects to those of the above configuration that employs the combination of the "quarter wave plate" and the "polarizer" as the fourth polarizer 126d. More specifically, this configuration enables a luminance image of the work W, in addition to three different interference fringe images having phases that differ by 120 degrees each (or by 90 degrees each) to be obtained by one imaging process using one imaging element.

Even in the case where the images of the measurement light (for example, clockwise circularly polarized light) and the reference light (for example, counterclockwise circularly polarized light) are taken directly, since the reference light is known (or is determinable in advance by measurement) and is uniform, the signal of the measurement light may be extracted by a post process after imaging, for example, a process of removing this reference light component or a process of removing the uniform light.

The configuration with omission of the fourth polarizer 126d advantageously reduces the number of optical components by omission of the "quarter wave plate" and the "polarizer" and thereby achieves, for example, the simplified configuration and suppression of an increase in total number of components, compared with the configuration that employs the combination of the "quarter wave plate" and the "polarizer" as the fourth polarizer 126d.

(i) The configuration of the imaging systems 4A and 4B is not limited to those of the embodiments described above. For example, the above embodiments use the cameras equipped with lenses. The lens is, however, not essential. A focused image may be obtained by calculation, for example, according to the relational expression of [Math. 6] given above even when a camera without lens is used.

In one or more embodiments, the positions of the "spectral optical system 801A, the quarter wave plate 803A, the filter unit 805A and the camera 807A" and the positions of the "spectral optical system 802A, the quarter wave plate 804A, the filter unit 806A and the camera 808A" of the first imaging system 4A that are placed across the dichroic mirror 800A may be exchanged. The positions of the "spectral optical system 801B, the quarter wave plate 803B, the filter unit 805B and the camera 807B" and the positions of the "spectral optical system 802B, the quarter wave plate 804B, the filter unit 806B and the camera 808B" of the second imaging system 4B that are placed across the dichroic mirror 800B may be exchanged.

(j) The above embodiments are configured to simultaneously use four wavelength lights, i.e., "first wavelength light", "second wavelength light", "third wavelength light" and "fourth wavelength light". More specifically, the above embodiments are configured to simultaneously emit the four wavelength lights, simultaneously take interference fringe images with regard to these four wavelength lights, and perform three-dimensional measurement based on these images. This configuration is, however, not restrictive, but another configuration may be employed.

For example, another configuration may simultaneously emit three wavelength lights, for example, the "first wavelength light", the "second wavelength light" and the "third wavelength light" without emitting the "fourth wavelength light" out of the four wavelength lights, the "first wavelength light", the "second wavelength light", the "third wavelength light" and the "fourth wavelength light", simultaneously take interference fringe images with regard to these three wavelength lights, and perform three-dimensional measurement based on these images.

Similarly, another configuration may simultaneously emit two wavelength lights, for example, the "first wavelength light" and the "third wavelength light" without emitting the "second wavelength light" and the "fourth wavelength light" out of the four wavelength lights, the "first wavelength light", the "second wavelength light", the "third wavelength light" and the "fourth wavelength light", simultaneously take interference fringe images with regard to these two wavelength lights, and perform three-dimensional measurement based on these images.

At least the configuration of simultaneously emitting the first light ("first wavelength light" and/or "second wavelength light") and the second light ("third wavelength light" and/or "fourth wavelength light") from the first projection optical system 2A and the second projection optical system 2B and simultaneously taking interference fringe images with regard to these lights shortens the total imaging time and improves the measurement efficiency, compared with the prior art.

In other words, when shortening the imaging time is not essential, the configuration may not necessarily use the four wavelength lights, the "first wavelength light", the "second wavelength light", the "third wavelength light" and the "fourth wavelength light", simultaneously. Another configuration may simultaneously emit two wavelength lights, for example, the "first wavelength light" and the "third wavelength light" without emitting the "second wavelength light" and the "fourth wavelength light", simultaneously take interference fringe images with regard to these two wavelength lights, then simultaneously emit two wavelength lights, "second wavelength light" and "fourth wavelength light" without emitting the "first wavelength light" and the "third wavelength light", and simultaneously take interference fringe images with regard to these two wavelength lights.

(k) When at most three wavelength lights or two wavelength lights are used as described above in (j), the three-dimensional measurement device 1 may be configured with omission of the emission mechanism and the imaging mechanism of the unused wavelength light from the above embodiments.

For example, when the second wavelength light is not used, the first projection optical system 2A may be configured with omission of the emission mechanism of emitting the second wavelength light (light emitter 752A and the light isolator 754A) and the combining mechanism of combining two wavelength lights (dichroic mirror 755A). When the second wavelength light is not used, the first imaging system 4A may also be configured with omission of the separating mechanism of causing the predetermined output light to be subjected to wavelength separation (dichroic mirror 800A) and the imaging mechanism of imaging the output light with regard to the second wavelength light (spectral optical system 802A, quarter wave plate 804A, filter unit 806A and camera 808A).

(l) As described above in (j), when the first projection optical system 2A and/or the second projection optical system 2B are configured to continually switch over the wavelength light that is to be emitted (for example, when the first projection optical system 2A is configured to emit only either one of the "first wavelength light" and the "second wavelength light"), the first imaging system 4A may be configured with omission of the separating mechanism of causing the predetermined output light to be subject to wavelength separation (dichroic mirror 800A) and may be configured to share either one of the imaging mechanism of imaging the output light with regard to the first wavelength light and the imaging mechanism of imaging the output light with regard to the second wavelength light with omission of the other.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . three-dimensional measurement device, 2A . . . first projection optical system, 2B . . . second projection optical system, 3 . . . interference optical system, 4A . . . first imaging system, 4B . . . second imaging system, 5 . . . control device, 11A . . . first light emitter, 11B . . . second light emitter, 12A . . . first light isolator, 12B . . . second light isolator, 13A . . . first non-polarizing beam splitter, 13B . . . second non-polarizing beam splitter, 20 . . . polarizing beam splitter, 20a . . . first surface, 20b . . . second surface, 20c . . . third surface, 20d . . . fourth surface, 23 . . . reference surface, 24 . . . placement structure, 31A . . . quarter wave plate, 31B . . . quarter wave plate, 32A . . . first polarizer, 32 B . . . second polarizer, 33A . . . first camera, 33B . . . second camera, W . . . work

The invention claimed is:

1. A three-dimensional measurement device comprising:
a first irradiator that emits, in a first direction, first light including first polarized light;
a second irradiator that emits, in a second direction, second light including second polarized light;
a first beam splitter that reflects, in a perpendicular direction to the first direction, at least part of the first light emitted from the first irradiator;
a second beam splitter that reflects, in a perpendicular direction to the second direction, at least part of the second light emitted from the second irradiator;
an interference optical system that:
  comprises a first surface and a second surface,
  receives via the first surface the reflected light from the first beam splitter as first incident light, splits the first incident light into two lights by reflecting part of the first incident light, radiates one of the two lights as first measurement light to a measurement object and another of the two lights as first reference light to a reference surface, and recombines the two lights to emit combined light as first output light, and
  receives via the second surface the reflected light from the second beam splitter as second incident light, splits the second incident light into two lights by reflecting part of the second incident light, radiates one of the two lights as second measurement light to the measurement object and another of the two lights as second reference light to the reference surface, and recombines the two lights to emit combined light as second output light;
a first imaging system that comprises a first camera and receives the first output light emitted from the first surface of the interference optical system when at least part of the first light enters the first surface;
a second imaging system that comprises a second camera and receives the second output light emitted from the second surface of the interference optical system when at least part of the second light enters the second surface; and an image processor that performs three-dimensional measurement of the measurement object based on interference fringe images obtained by the first imaging system and the second imaging system, wherein the first camera obtains an image of the first output light obtained from the part of the first light emitted from the first irradiator, and simultaneously, the second camera obtains an image of the second output light obtained from the part of the second light emitted from the second irradiator, and the images obtained by the first and second cameras are used as the interference fringe images.

2. The three-dimensional measurement device according to claim 1, wherein the interference optical system:
splits the first incident light into the first reference light that is polarized light having a first polarizing direction and the first measurement light that is polarized light having a second polarizing direction, and
splits the second incident light into the second reference light that is polarized light having the second polarizing direction and the second measurement light that is polarized light having the first polarizing direction.

3. The three-dimensional measurement device according to claim 2, wherein the first beam splitter causes at least part of the first output light emitted from the first surface to enter the first imaging system; and
the second beam splitter causes at least part of the second output light emitted from the second surface to enter the second imaging system.

4. The three-dimensional measurement device according to claim 3, wherein each of the first and second irradiators comprises:
a light isolator that transmits light in one direction out of the emitted light and blocks light in a reverse direction.

5. The three-dimensional measurement device according to claim 2, wherein the first irradiator:
comprises at least one of: a first wavelength light emitter that emits first wavelength light including polarized light of a first wavelength; and a second wavelength light emitter that emits second wavelength light including polarized light of a second wavelength, and
emits the first light including at least one of the polarized light of the first wavelength and the polarized light of the second wavelength,
the second irradiator:
comprises at least one of: a third wavelength light emitter that emits third wavelength light including polarized light of a third wavelength; and a fourth wavelength light emitter that emits fourth wavelength light including polarized light of a fourth wavelength, and
emits the second light including at least one of the polarized light of the third wavelength and the polarized light of the fourth wavelength,
the first imaging system comprises as the first camera at least one of:
a first wavelength light imager that takes an image of output light with regard to the polarized light of the first wavelength included in the first output light emitted from the first surface when the first light including the polarized light of the first wavelength enters the first surface; and
a second wavelength light imager that takes an image of output light with regard to the polarized light of the second wavelength included in the first output light emitted from the first surface when the first light including the polarized light of the second wavelength enters the first surface, and
the second imaging system comprises as the second camera at least one of:
a third wavelength light imager that takes an image of output light with regard to the polarized light of the third wavelength included in the second output light emitted from the second surface when the second light including the polarized light of the third wavelength enters the second surface; and
a fourth wavelength light imager that takes an image of output light with regard to the polarized light of the fourth wavelength included in the second output light emitted from the second surface when the second light including the polarized light of the fourth wavelength enters the second surface.

6. The three-dimensional measurement device according to claim 5, wherein the first irradiator comprises:
a first combining mirror that combines the first wavelength light emitted from the first wavelength light emitter and the second wavelength light emitted from the second wavelength light emitter, as the first light,
the second irradiator comprises:
a second combining mirror that combines the third wavelength light emitted from the third wavelength light emitter and the fourth wavelength light emitted from the fourth wavelength light emitter, as the second light,
the first imaging system comprises:
a first separation mirror that separates the first output light emitted from the first surface into the output light with regard to the polarized light of the first wavelength and the output light with regard to the polarized light of the second wavelength, when the first light including the polarized light of the first wavelength and the polarized light of the second wavelength is emitted from the first irradiator, and
the second imaging system comprises:
a second separation mirror that separates the second output light emitted from the second surface into the output light with regard to the polarized light of the third wavelength and the output light with regard to the polarized light of the fourth wavelength, when the second light including the polarized light of the third wavelength and the polarized light of the fourth wavelength is emitted from the second irradiator.

7. The three-dimensional measurement device according to claim 2, when the measurement object is arranged to be flush with the reference surface, a polarizing direction of polarized light included in the first light that enters the first surface is identical with a polarizing direction of polarized light included in the first output light emitted from the first surface, and
a polarizing direction of polarized light included in the second light that enters the second surface is identical with a polarizing direction of polarized light included in the second output light emitted from the second surface.

8. The three-dimensional measurement device according to claim 2, wherein when an incident direction of the first light that enters the first surface is aligned with an incident direction of the second light that enters the second surface on a plane including both the incident directions, a polarizing direction of polarized light included in the first light differs from a polarizing direction of polarized light included in the second light by 90 degrees.

9. The three-dimensional measurement device according to claim 2, wherein polarized light included in the first light or measurement light or reference light of the first light and polarized light included in the second light or measurement light or reference light of the second light that travel in an identical direction on an identical axis line have polarizing directions that different from each other by 90 degrees.

10. The three-dimensional measurement device according to claim 2, further comprising:
a polarizer that gives a relative phase difference between the reference light and the measurement light, wherein
the image processor performs the three-dimensional measurement of the measurement object by a phase shift method, based on obtained multiple different interference fringe images of each of the first and second output lights subjected to multiple phase shifts by the polarizer.

11. The three-dimensional measurement device according to claim 10, further comprising:
a spectral optical system that splits each of the first and second output lights into a plurality of split lights; and
a filter unit that comprises the polarizer and gives respectively different phase differences to at least a required number of split lights for measurement by the phase shift method, out of the plurality of split lights split by the spectral optical system, wherein
each of the imaging systems simultaneously takes images of the plurality of split lights that are transmitted through the filter unit.

12. The three-dimensional measurement device according to claim 11, wherein
the spectral optical system comprises:
a first triangular prism that has a triangular sectional shape along a first plane, comprises three surfaces along a direction perpendicular to the first plane, and comprises a first half mirror arranged along a plane passing through an intersection line between a first surface and a second surface out of the three surfaces and orthogonal to a third surface; and
a second triangular prism that has a triangular sectional shape along a second plane orthogonal to the first plane, comprises three surfaces along a direction perpendicular to the second plane, and comprises a second half mirror arranged along a plane passing through an intersection line between a first surface and a second surface out of the three surfaces and orthogonal to a third surface, wherein
the third surface of the first triangular prism is arranged to be opposed to the first surface of the second triangular prism to:
make light entering the first surface of the first triangular prism split in two directions by the first half mirror, make split light that was reflected by the first half mirror reflected at the first surface toward the third surface, make split light that was transmitted through the first half mirror reflected at the second surface toward the third surface, and emit two parallel split lights from the third surface; and
make the two split lights that were emitted from the third surface of the first triangular prism enter the first surface of the second triangular prism, make each of the two split lights split in two directions by the second half mirror, make two split lights that were reflected by the second half mirror reflected at the first surface toward the third surface, make two split lights that were transmitted through the second half mirror reflected at the second surface toward the third surface, and emit four parallel split lights from the third surface.

13. The three-dimensional measurement device according to claim 12, wherein each of the imaging systems simultaneously takes images of the plurality of split lights transmitted through the filter unit, by a single imaging sensor.

14. The three-dimensional measurement device according to claim 11, wherein each of the imaging systems simultaneously takes images of the plurality of split lights transmitted through the filter unit, by a single imaging sensor.

15. The three-dimensional measurement device according to claim 2, wherein the measurement object is either solder paste printed on a printed circuit board or a solder bump formed on a wafer substrate.

16. The three-dimensional measurement device according to claim 1, wherein
the first beam splitter causes at least part of the first output light emitted from the first surface to enter the first imaging system; and
the second beam splitter causes at least part of the second output light emitted from the second surface to enter the second imaging system.

17. The three-dimensional measurement device according to claim 16, wherein
each of the first and second irradiators comprises:
a light isolator that transmits light in one direction out of the emitted light and blocks light in a reverse direction.

18. The three-dimensional measurement device according to claim 1, wherein
the first irradiator:
comprises at least one of: a first wavelength light emitter that emits first wavelength light including polarized light of a first wavelength; and a second wavelength light emitter that emits second wavelength light including polarized light of a second wavelength, and
emits the first light including at least one of the polarized light of the first wavelength and the polarized light of the second wavelength,
the second irradiator:
comprises at least one of: a third wavelength light emitter that emits third wavelength light including polarized light of a third wavelength; and a fourth wavelength light emitter that emits fourth wavelength light including polarized light of a fourth wavelength, and
emits the second light including at least one of the polarized light of the third wavelength and the polarized light of the fourth wavelength,
the first imaging system comprises as the first camera at least one of:
a first wavelength light imager that takes an image of output light with regard to the polarized light of the first wavelength included in the first output light emitted from the first surface when the first light including the polarized light of the first wavelength enters the first surface; and a second wavelength light imager that takes an image of output light with regard to the polarized light of the second wavelength included in the first output light emitted from the first surface when the first light including the polarized light of the second wavelength enters the first surface, and the second imaging system comprises as the second camera at least one of:

a third wavelength light imager that takes an image of output light with regard to the polarized light of the third wavelength included in the second output light emitted from the second surface when the second light including the polarized light of the third wavelength enters the second surface; and a fourth wavelength light imager that takes an image of output light with regard to the polarized light of the fourth wavelength included in the second output light emitted from the second surface when the second light including the polarized light of the fourth wavelength enters the second surface.

19. The three-dimensional measurement device according to claim 18, wherein the first irradiator comprises:

a first combining mirror that combines the first wavelength light emitted from the first wavelength light emitter and the second wavelength light emitted from the second wavelength light emitter, as the first light, the second irradiator comprises:

a second combining mirror that combines the third wavelength light emitted from the third wavelength light emitter and the fourth wavelength light emitted from the fourth wavelength light emitter, as the second light, the first imaging system comprises:

a first separation mirror that separates the first output light emitted from the first surface into the output light with regard to the polarized light of the first wavelength and the output light with regard to the polarized light of the second wavelength, when the first light including the polarized light of the first wavelength and the polarized light of the second wavelength is emitted from the first irradiator, and the second imaging system comprises:

a second separation mirror that separates the second output light emitted from the second surface into the output light with regard to the polarized light of the third wavelength and the output light with regard to the polarized light of the fourth wavelength, when the second light including the polarized light of the third wavelength and the polarized light of the fourth wavelength is emitted from the second irradiator.

20. The three-dimensional measurement device according to claim 1, when the measurement object is arranged to be flush with the reference surface, a polarizing direction of polarized light included in the first light that enters the first surface is identical with a polarizing direction of polarized light included in the first output light emitted from the first surface, and a polarizing direction of polarized light included in the second light that enters the second surface is identical with a polarizing direction of polarized light included in the second output light emitted from the second surface.

21. The three-dimensional measurement device according to claim 1, wherein when an incident direction of the first light that enters the first surface is aligned with an incident direction of the second light that enters the second surface on a plane including both the incident directions, a polarizing direction of polarized light included in the first light differs from a polarizing direction of polarized light included in the second light by 90 degrees.

22. The three-dimensional measurement device according to claim 1, wherein polarized light included in the first light or measurement light or reference light of the first light and polarized light included in the second light or measurement light or reference light of the second light that travel in an identical direction on an identical axis line have polarizing directions that different from each other by 90 degrees.

23. The three-dimensional measurement device according to claim 1, further comprising:

a polarizer that gives a relative phase difference between the reference light and the measurement light, wherein the image processor performs the three-dimensional measurement of the measurement object by a phase shift method, based on obtained multiple different interference fringe images of each of the first and second output lights subjected to multiple phase shifts by the polarizer.

24. The three-dimensional measurement device according to claim 23, further comprising:

a spectral optical system that splits each of the first and second output lights into a plurality of split lights; and a filter unit that comprises the polarizer and gives respectively different phase differences to at least a required number of split lights for measurement by the phase shift method, out of the plurality of split lights split by the spectral optical system, wherein each of the imaging systems simultaneously takes images of the plurality of split lights that are transmitted through the filter unit.

25. The three-dimensional measurement device according to claim 24, wherein the spectral optical system comprises:

a first triangular prism that has a triangular sectional shape along a first plane, comprises three surfaces along a direction perpendicular to the first plane, and comprises a first half mirror arranged along a plane passing through an intersection line between a first surface and a second surface out of the three surfaces and orthogonal to a third surface; and a second triangular prism that has a triangular sectional shape along a second plane orthogonal to the first plane, comprises three surfaces along a direction perpendicular to the second plane, and comprises a second half mirror arranged along a plane passing through an intersection line between a first surface and a second surface out of the three surfaces and orthogonal to a third surface, wherein the third surface of the first triangular prism is arranged to be opposed to the first surface of the second triangular prism to:

make light entering the first surface of the first triangular prism split in two directions by the first half mirror, make split light that was reflected by the first half mirror reflected at the first surface toward the third surface, make split light that was transmitted through the first half mirror reflected at the second surface toward the third surface, and emit two parallel split lights from the third surface; and make the two split lights that were emitted from the third surface of the first triangular prism enter the first surface of the second triangular prism, make each of the two split lights split in two directions by the second half mirror, make two split lights that were reflected by the second half mirror reflected at the first surface toward the third surface, make two split lights that were transmitted through the second half mirror reflected at the second surface toward the third surface, and emit four parallel split lights from the third surface.

26. The three-dimensional measurement device according to claim 25, wherein each of the imaging systems simultaneously takes images of the plurality of split lights transmitted through the filter unit, by a single imaging sensor.

27. The three-dimensional measurement device according to claim 24, wherein each of the imaging systems simultaneously takes images of the plurality of split lights transmitted through the filter unit, by a single imaging sensor.

28. The three-dimensional measurement device according to claim 1, wherein the measurement object is either solder paste printed on a printed circuit board or a solder bump formed on a wafer substrate.

29. A three-dimensional measurement device comprising:
a first irradiator that emits, in a first direction, first light including first polarized light;
a second irradiator that emits, in a second direction, second light including second polarized light;
a first beam splitter that reflects, in a perpendicular direction to the first direction, at least part of the first light emitted from the first irradiator;
a second beam splitter that reflects, in a perpendicular direction to the second direction, at least part of the second light emitted from the second irradiator;
a polarizing beam splitter that:
  comprises a first surface and a second surface adjacent to the first surface across a boundary surface,
  receives via the first surface the reflected light from the first beam splitter as first incident light, splits the first incident light into two polarized lights having polarizing directions orthogonal to each other by reflecting part of the first incident light, radiates one of the split polarized lights as first measurement light to a measurement object and another of the split polarized lights as first reference light to a reference surface, and recombines the split polarized lights to emit combined light as first output light, and
  receives via the second surface the reflected light from the second beam splitter as second incident light, splits the second incident light into two polarized lights having polarizing directions orthogonal to each other by reflecting part of the second incident light, radiates one of the split polarized lights as second measurement light to the measurement object and another of the split polarized lights as second reference light to the reference surface, and recombines the split polarized lights to emit combined light as second output light;
a first imaging system that comprises a first camera and receives the first output light emitted from the first surface of the polarizing beam splitter when at least part of the first light enters the first surface;
a second imaging system that comprises a second camera and receives the second output light emitted from the second surface of the polarizing beam splitter when at least part of the second light enters the second surface; and
an image processor that performs three-dimensional measurement of the measurement object based on interference fringe images obtained by the first imaging system and the second imaging system, wherein
the first camera obtains an image of the first output light obtained from the part of the first light emitted from the first irradiator, and simultaneously, the second camera obtains an image of the second output light obtained from the part of the second light emitted from the second irradiator, and
the images obtained by the first and second cameras are used as the interference fringe images.

30. The three-dimensional measurement device according to claim 29, wherein
the first beam splitter causes at least part of the first output light emitted from the first surface to enter the first imaging system; and
the second beam splitter causes at least part of the second output light emitted from the second surface to enter the second imaging system.

31. The three-dimensional measurement device according to claim 30, wherein
each of the first and second irradiators comprises:
  a light isolator that transmits light in one direction out of the emitted light and blocks light in a reverse direction.

32. The three-dimensional measurement device according to claim 29, wherein
the first irradiator:
  comprises at least one of: a first wavelength light emitter that emits first wavelength light including polarized light of a first wavelength; and a second wavelength light emitter that emits second wavelength light including polarized light of a second wavelength, and
  emits the first light including at least one of the polarized light of the first wavelength and the polarized light of the second wavelength,
the second irradiator:
  comprises at least one of: a third wavelength light emitter that emits third wavelength light including polarized light of a third wavelength; and a fourth wavelength light emitter that emits fourth wavelength light including polarized light of a fourth wavelength, and
  emits the second light including at least one of the polarized light of the third wavelength and the polarized light of the fourth wavelength,
the first imaging system comprises as the first camera at least one of:
  a first wavelength light imager that takes an image of output light with regard to the polarized light of the first wavelength included in the first output light emitted from the first surface when the first light including the polarized light of the first wavelength enters the first surface; and
  a second wavelength light imager that takes an image of output light with regard to the polarized light of the second wavelength included in the first output light emitted from the first surface when the first light including the polarized light of the second wavelength enters the first surface, and
the second imaging system comprises as the second camera at least one of:
  a third wavelength light imager that takes an image of output light with regard to the polarized light of the third wavelength included in the second output light emitted from the second surface when the second light including the polarized light of the third wavelength enters the second surface; and
a fourth wavelength light imager that takes an image of output light with regard to the polarized light of the fourth wavelength included in the second output light emitted from the second surface when the second light including the polarized light of the fourth wavelength enters the second surface.

33. The three-dimensional measurement device according to claim 32, wherein
the first irradiator comprises:
a first combining mirror that combines the first wavelength light emitted from the first wavelength light emitter and the second wavelength light emitted from the second wavelength light emitter, as the first light,
the second irradiator comprises:
a second combining mirror that combines the third wavelength light emitted from the third wavelength light emitter and the fourth wavelength light emitted from the fourth wavelength light emitter, as the second light,
the first imaging system comprises:
a first separation mirror that separates the first output light emitted from the first surface into the output light with regard to the polarized light of the first wavelength and the output light with regard to the polarized light of the second wavelength, when the first light including the polarized light of the first wavelength and the polarized light of the second wavelength is emitted from the first irradiator, and
the second imaging system comprises:
a second separation mirror that separates the second output light emitted from the second surface into the output light with regard to the polarized light of the third wavelength and the output light with regard to the polarized light of the fourth wavelength, when the second light including the polarized light of the third wavelength and the polarized light of the fourth wavelength is emitted from the second irradiator.

34. The three-dimensional measurement device according to claim 29, when the measurement object is arranged to be flush with the reference surface,
a polarizing direction of polarized light included in the first light that enters the first surface is identical with a polarizing direction of polarized light included in the first output light emitted from the first surface, and
a polarizing direction of polarized light included in the second light that enters the second surface is identical with a polarizing direction of polarized light included in the second output light emitted from the second surface.

35. The three-dimensional measurement device according to claim 29, wherein when an incident direction of the first light that enters the first surface is aligned with an incident direction of the second light that enters the second surface on a plane including both the incident directions, a polarizing direction of polarized light included in the first light differs from a polarizing direction of polarized light included in the second light by 90 degrees.

36. The three-dimensional measurement device according to claim 29, wherein polarized light included in the first light or measurement light or reference light of the first light and polarized light included in the second light or measurement light or reference light of the second light that travel in an identical direction on an identical axis line have polarizing directions that different from each other by 90 degrees.

37. The three-dimensional measurement device according to claim 29, further comprising:
a polarizer that gives a relative phase difference between the reference light and the measurement light, wherein
the image processor performs the three-dimensional measurement of the measurement object by a phase shift method, based on obtained multiple different interference fringe images of each of the first and second output lights subjected to multiple phase shifts by the polarizer.

38. The three-dimensional measurement device according to claim 37, further comprising:
a spectral optical system that splits each of the first and second output lights into a plurality of split lights; and
a filter unit that comprises the polarizer and gives respectively different phase differences to at least a required number of split lights for measurement by the phase shift method, out of the plurality of split lights split by the spectral optical system, wherein
each of the imaging systems simultaneously takes images of the plurality of split lights that are transmitted through the filter unit.

39. The three-dimensional measurement device according to claim 38, wherein
the spectral optical system comprises:
a first triangular prism that has a triangular sectional shape along a first plane, comprises three surfaces along a direction perpendicular to the first plane, and comprises a first half mirror arranged along a plane passing through an intersection line between a first surface and a second surface out of the three surfaces and orthogonal to a third surface; and
a second triangular prism that has a triangular sectional shape along a second plane orthogonal to the first plane, comprises three surfaces along a direction perpendicular to the second plane, and comprises a second half mirror arranged along a plane passing through an intersection line between a first surface and a second surface out of the three surfaces and orthogonal to a third surface, wherein
the third surface of the first triangular prism is arranged to be opposed to the first surface of the second triangular prism to: such
make light entering the first surface of the first triangular prism split in two directions by the first half mirror, make split light that was reflected by the first half mirror reflected at the first surface toward the third surface, make split light that was transmitted through the first half mirror reflected at the second surface toward the third surface, and emit two parallel split lights from the third surface; and
make the two split lights that were emitted from the third surface of the first triangular prism enter the first surface of the second triangular prism, make each of the two split lights split in two directions by the second half mirror, make two split lights that were reflected by the second half mirror reflected at the first surface toward the third surface, make two split lights that were transmitted through the second half mirror reflected at the second surface toward the third surface, and emit four parallel split lights from the third surface.

40. The three-dimensional measurement device according to claim 39, wherein each of the imaging systems simultaneously takes images of at least the plurality of split lights that are transmitted through the filter unit, by a single imaging sensor.

41. The three-dimensional measurement device according to claim 38, wherein each of the imaging systems simultaneously takes images of the plurality of split lights transmitted through the filter unit, by a single imaging sensor.

42. The three-dimensional measurement device according to claim 29, wherein the measurement object is either solder paste printed on a printed circuit board or a solder bump formed on a wafer substrate.

* * * * *